US012565458B2

(12) United States Patent
Balige

(10) Patent No.: US 12,565,458 B2
(45) Date of Patent: Mar. 3, 2026

(54) GRANULATED AGRICULTURAL COMPOSITION COMPRISING MACRO- AND MICRONUTRIENTS, AND RELATED METHODS

(71) Applicant: YPF SOCIEDAD ANÓNIMA, Ciudad Autónoma de Buenos Aires (AR)

(72) Inventor: Marcela Balige, Ciudad Autónoma de Buenos Aires (AR)

(73) Assignee: YPF SOCIEDAD ANONIMA, Buenos Aires (AR)

( * ) Notice: Subject to any disclaimer, the term of this patent is extended or adjusted under 35 U.S.C. 154(b) by 842 days.

(21) Appl. No.: 17/698,375

(22) Filed: Mar. 18, 2022

(65) Prior Publication Data

US 2022/0306549 A1     Sep. 29, 2022

Related U.S. Application Data

(60) Provisional application No. 63/162,787, filed on Mar. 18, 2021.

(51) Int. Cl.
| | |
|---|---|
| *C05G 1/00* | (2006.01) |
| *A01C 21/00* | (2006.01) |
| *C05B 1/02* | (2006.01) |
| *C05B 7/00* | (2006.01) |
| *C05C 9/00* | (2006.01) |
| *C05D 9/02* | (2006.01) |

(Continued)

(52) U.S. Cl.
CPC ................ *C05G 1/00* (2013.01); *A01C 21/00* (2013.01); *C05B 1/02* (2013.01); *C05B 7/00* (2013.01); *C05C 9/005* (2013.01); *C05D 9/02* (2013.01); *C05G 5/12* (2020.02); *C05G 5/40* (2020.02)

(58) Field of Classification Search
CPC ... C05G 1/00; C05G 5/12; C05G 5/40; C05G 5/30; A01C 21/00; C05B 1/02; C05B 7/00; C05C 9/005; C05D 9/02
See application file for complete search history.

(56) References Cited

U.S. PATENT DOCUMENTS

| | | | |
|---|---|---|---|
| 3,353,949 A | 11/1967 | Nau et al. | |
| 3,423,199 A | 1/1969 | Phillen et al. | |
| 3,523,019 A | 8/1970 | Phillen et al. | |

(Continued)

FOREIGN PATENT DOCUMENTS

| | | | | | |
|---|---|---|---|---|---|
| BR | 102018002415 A2 | * | 8/2019 | ............... | C05B 1/00 |
| GB | 2127004 A | * | 4/1984 | ............... | C05G 5/30 |

(Continued)

OTHER PUBLICATIONS

"Soil boron fertilization: The role of nutrient sources and rootstocks in citrus production." Mattos et al, Journal of Integrative Agriculture. (Year: 2017).*

(Continued)

*Primary Examiner* — Amber R Orlando
*Assistant Examiner* — Heather Elise Rainbow
(74) *Attorney, Agent, or Firm* — Muncy, Geissler, Olds & Lowe, P.C.

(57)     ABSTRACT

The present disclosure provides integral nutrients to provide to crops in order to increase their yield. More particularly, the disclosure provides a granulated agricultural composition comprising a macronutrient in combination with a micronutrient, as well as methods for its preparation and use.

13 Claims, 36 Drawing Sheets

(51) Int. Cl.
    *C05G 5/12*          (2020.01)
    *C05G 5/40*          (2020.01)

(56)                     References Cited

U.S. PATENT DOCUMENTS

| | | |
|---|---|---|
| 3,941,578 A | 3/1976 | Tucker et al. |
| 4,494,976 A | 1/1985 | Backlund |
| 4,563,208 A | 1/1986 | Backlund |
| 5,152,821 A | 10/1992 | Walter |

FOREIGN PATENT DOCUMENTS

| | | | | | |
|---|---|---|---|---|---|
| JP | 10291882 A | * | 11/1998 | ........... | C05G 3/0029 |
| WO | WO2015/132258 | | 9/2015 | | |
| WO | WO-2018058194 A1 | * | 4/2018 | .............. | C05C 1/02 |

OTHER PUBLICATIONS

"Boric Acid." Etimine USA, Snapshot dated Apr. 23, 2019.*
Translation of Yamada (JP-10291882-A).*
Translation of Veloso (BR-102018002415-A2).*
Translation of Yamada (JP-10291882-A) (Year: 1998).*
Translation of Veloso (BR-102018002415-A2) (Year: 2019).*

* cited by examiner

GRANULATED AGRICULTURAL COMPOSITION COMPRISING MACRO- AND MICRONUTRIENTS, AND RELATED METHODS

TECHNICAL FIELD OF THE INVENTION

The present invention relates to the field of integral nutrients for supplying crops in order to increase their yield. More particularly, the invention is related to a granulated agricultural composition comprising a macronutrient in combination with a micronutrient.

DESCRIPTION OF PRIOR ART

The current agricultural model seeks to maximize crop yields, usually expressed as weight of harvested crop per unit of harvested area. Considering this model, the contribution of traditional nutrients known as macronutrients to crops, which are incorporated through organic and inorganic compounds, are often insufficient and do not achieve the expected results. Thus, it is necessary to incorporate other nutrients known as micronutrients, which are essential to achieve yield optimization objectives.

Micronutrients are nutrients that are extracted over time from the soil by crops, which, although absorbed at a low rate, they become deficient over the years, requiring their replenishment. Particularly in La Pampa region (PAR) micronutrient deficiencies, especially boron (B) and zinc (Zn), have started to be observed in certain extensive crops, such as sunflower, corn, wheat and alfalfa. The OM and nutrient levels in some areas represent only 50% of the original level (Lavado, R. 2006. *La region Pampeana: Historia, características y use de sus suelos. En: Materia Orgánica "Valor Agronómico y Dinámica en Suelos Pampeanos"* (ed. R Alvarez). Editorial. Facultad de Agronomia, Universidad de Buenos Aires. pp. 1-12). In the case of soybean, there is evidence that B, Cobalt-Molybdenum (CoMo), Manganese (Mn) and Zn could potentially be limiting in La Pampa region of Argentina and other regions of the world.

In particular, Zinc (Zn) is a microelement whose relevance and notoriety has notably increased in recent years. Its main function is that of enzyme activator, catalyzing innumerable reactions in metabolic processes such as respiration, chlorophyll and protein synthesis. It is also a precursor of tryptophan and indole acetic acid (Fancelli, A L. 2006. Micronutrientes en la fisiologia de las plantas. pp 11-27. En: M Vázquez (ed). Micronutrientes en la agricul-ture. Asociación Argentina de la Ciencia del Suelo. Buenos Aires, Argentina. pp 207).

Zn deficiency is a worldwide problem in almost all crops. Accurately evaluated through soil analysis, grasses are particularly sensitive to Zn deficiency. Nearly 50% of soils used for cereal production have low levels of Zn availability, which not only reduces crop yields but also their nutritional value (Graham, R. D. and R. M. Welch. 1996. Breeding for staple-food crops with high micronutrient density. Agricultural Strategies for Micronutrients. pp 1-72. Working Paper No. 3. Washington, D.C.: International Food Policy Research Institute). International literature mentions critical thresholds in the range of 0.5 to 1 mg kg$^{-1}$, depending on the author and region. Below this range, availability may be considered low and vice versa. The traditional way of application consists of seed and foliar treatments. Foliar applications could serve as a vehicle to incorporate other relevant elements, such as nitrogen (N), which is the key element in determining yield and quality.

These traditional ways of application often show restrictions in logistics and practicality of use. Seed treatments have shown to be efficient, allowing yield increases at low doses, with nutrients being available from the beginning of culture process. However, there is only one specific time for application, after which this practice is not possible. Foliar treatments may require an additional cost, if they do not concur in time with the application of a phytosanitary product. Thus, it is important to develop alternative ways of application, in order to broaden the range of possibilities available to the user.

Another micronutrient that is suspected to be deficient in La Pampa region of Argentina is Boron (B). The concentration of B in soils ranges from 2 to 100 mg kg$^{-1}$, but the most frequent range is from 7 to 80 mg kg$^{-1}$. In soil, B exists in two forms: adsorbed on the surface of clays and/or Fe and Al hydroxides bound to organic matter, and as boric acid ($H_3BO_3$) in soil solution (Goldberg, S., H. S. Forster, and E. L. Heick. (1993). *Boron adsorption mechanisms on oxides, clay minerals, and soils inferred from ionic strength effects.* Soil Sci. Soc. Am. J. 57:704-708). The adsorption of B usually increases with increasing pH, temperature, ionic strength and the nature of the adsorbed ions. At pH lower than 7, the predominant species in the soil solution is $H_3BO_3$. This species is easily leached, so B is considered a mobile micronutrient. On the contrary, at pH higher than 7, the concentration of $[B(OH)_4]-$, which is adsorbed on Fe and Al sesquioxides, Mg hydroxide, calcium carbonates, organic matter and, to a lesser extent, on silicate clays, increases. Anionic competition in B uptake is low, and follows the order P>Mo>S.

Due to its mobility, soils with water excess can suffer leaching of boric acid ($H_3BO_3$). Similarly, under water stress, plants cannot absorb it from the soil solution. Both situations have been reported as causes of induced nutrient deficiencies. The concentration of B in soil could be a reference indicator, although its dynamics and mobility in soil determine the need to adjust depth and seasonality in sampling. Unlike Zn, visual deficiency symptoms are unlikely to be observed in PAR, even though the nutrient could potentially be deficient.

In sandy soils of western Buenos Aires, B responses in sunflower were associated with the level of extractable B in soil, in petioles and situations of drought or excess water. It is considered that 80% of the area cultivated with sunflower in the Pampean Prairie could present B deficiencies (Ratto, S. E. 2006. *Los microelementos en el sistema productivo del área pampeana.* En: M Vázquez (Ed.) Micronutrientes en la agriculture. AACS, Argentina. pp 79-111). This crop has shown the highest level of response among the extensive agricultural species in the PAR. Taking into account experimental results, B is probably the main limiting micronutrient in alfalfa production. (Fontanetto, H., O. Keller, D. Giailevra, L. Belotti y C. Negro 2010. *Manejo de la fertilización de la alfalfa en la región central de Santa Fe.* Available on line. www.inta.gov.ar/rafaela). As it happens with other highly mobile nutrients, B deficiency could be induced by the demand of a high yielding crop, which would rapidly deplete the nutrient level in the soil inducing the expression of response. This was observed in General Arenales (Argentina), in a high yielding soybean crop on a loam soil with no physical or other nutrient impedances, but with moderate organic matter content and initial fertility due to its texture. (Ferraris, G., L. Couretot y J. Ponsa. 2005. *Evaluación de la utilización de molibdeno, cobalto, boro y otros nutrientes en*

*soja de primers*. En: Soja. Resultados de Unidades dem-
ostrativas del Proyecto Regional Agricola, año 2005. CER-
BAN. Áreas de Desarrollo Rural EEA INTA Pergamino y
General Villegas. pp 62-65).

There exist in the prior art compositions comprising
combinations of macronutrients and micronutrients, in par-
ticular in the form of macronutrient granules coated with
micronutrients.

The U.S. Pat. No. 3,941,578 patent is directed to a
fertilizer based on urea particles coated with zinc oxide as a
micronutrient, which may contain other metal oxides.

The U.S. Pat. No. 3,353,949 patent is directed to a method
for preparing a primary granular fertilizer having micronu-
trients uniformly distributed on the surface.

The U.S. Pat. Nos. 3,423,199 and 3,523,019 patents are
directed to obtaining granules of hygroscopic fertilizer salts
coated with micronutrient powders.

The U.S. Pat. Nos. 4,494,976 and 4,563,208 patents are
directed to urea particles coated with metal oxides, e.g.
Micronutrients.

The U.S. Pat. No. 5,152,821 patent is directed to the
preparation of a granular fertilizer coated with micronutri-
ents.

The WO 2015/13225 patent application is directed to a
method for incorporating micronutrients into an outer layer
of a urea-based particle.

However, there is a need to provide new fertilizer com-
positions that serve as integral nutrients containing both
macronutrients and micronutrients, in order to optimize the
yield of the crops of interest.

BRIEF DESCRIPTION OF THE INVENTION

Correspondingly, it is an aspect of this invention to
provide a granulated agricultural composition comprising:
   i—a macronutrient in granulated form;
   ii—a micronutrient; and
   iii—at least a coadjuvant for the process of integrating the
      macronutrient and the micronutrient;
   wherein the at least one coadjuvant and the micronutrient
      form a coating over the granules of the macronutrient.

In a particular embodiment, the macronutrient is selected
from the group consisting of Urea, MAP (Monoammonium
Phosphate), SSP (Single Superphosphate), Triple Super-
phosphate, DAP (Diammonium Phosphate), Calcium Car-
bonate, potassium chloride, potassium sulfate, magnesium
sulfate, potassium nitrate, sulfur, potassium, calcium,
ammonium sulfate, potassium sulfate, phosphorus pentox-
ide, potassium dioxide, and magnesium dioxide.

In another particular embodiment of the invention, the
micronutrient is selected from the group consisting of a
boron (B) source, a chlorine (Cl) source, a cobalt (Co)
source, a copper (Cu) source, an iron (Fe) source, a man-
ganese (Mn) source, a molybdenum (Mo) source and a zinc
(Zn) source. Preferably, the micronutrient is selected from
the group consisting of a B source and a Zn source.

In another particular embodiment of the invention, the at
least one coadjuvant comprises a compound selected from
the group consisting of minerals of the alumina silicate
family, iron, calcium, magnesium and alkaline minerals,
such as mica derivatives, and/or polymeric materials of the
plastomer type and pigments derived from resins, titanium
dioxide, cobalt oxides, copper oxides and carbazoles, and
mixtures thereof.

Preferably, the composition of the invention comprises a
mixture of coadjuvants, in particular, comprising a mineral
of the mica family, a polymeric material of the plastomer type, titanium dioxide and pigments derived from resins.
More preferably, the plastomer-type polymeric material is a
polyolefin.

In a particularly preferred embodiment, the mixture of
coadjuvants comprises titanium dioxide, a mineral of the
mica family, polyethylene and a mixture of pigments derived
from resins.

In another particular embodiment of the invention the
macronutrient and the micronutrient are present in an
amount ratio of between 200:1 and 5:1.

Another aspect of this invention is to provide a method for
preparing a granulated agricultural composition in accor-
dance with the present invention, comprising:
   i) providing a macronutrient to a mixing tank;
   ii) adding 50% of the total amount of the at least one
      coadjuvant;
   iii) adding the micronutrient; and
   iv) adding the remaining 50% of the at least one coadju-
      vant.

It is another aspect of this invention to provide a method
for increasing the yield of a crop comprising applying to said
crop an effective amount of a granulated agricultural com-
position in accordance with the present invention.

Figure 32:
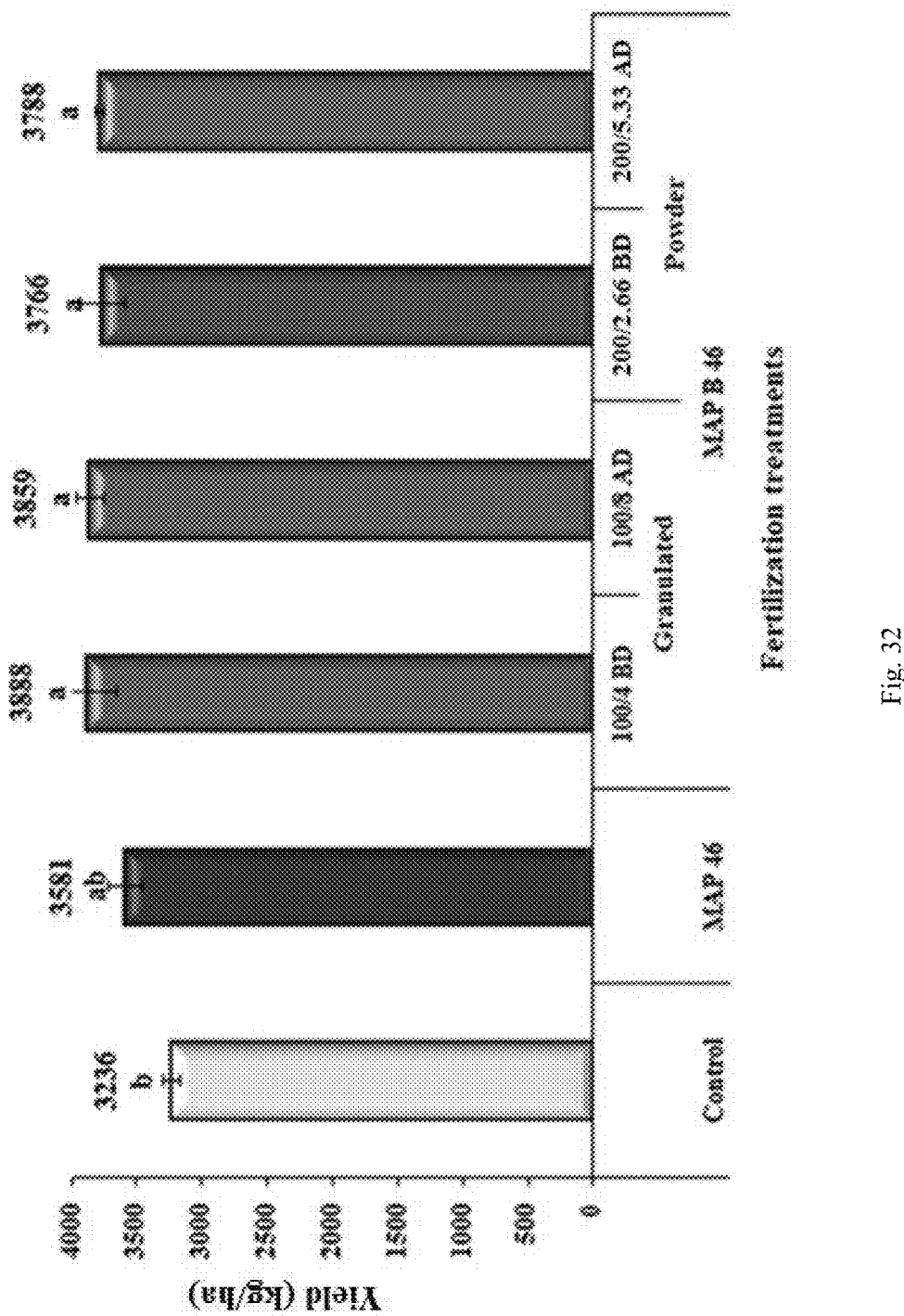

FIG. 32: Grain yield according to fertilization treatments evaluating Boron impregnation over phosphorus sources in soybean. The error bars indicate the standard deviation of the mean. INTA EEA Pergamino, season 2017/18.

Figure 33:
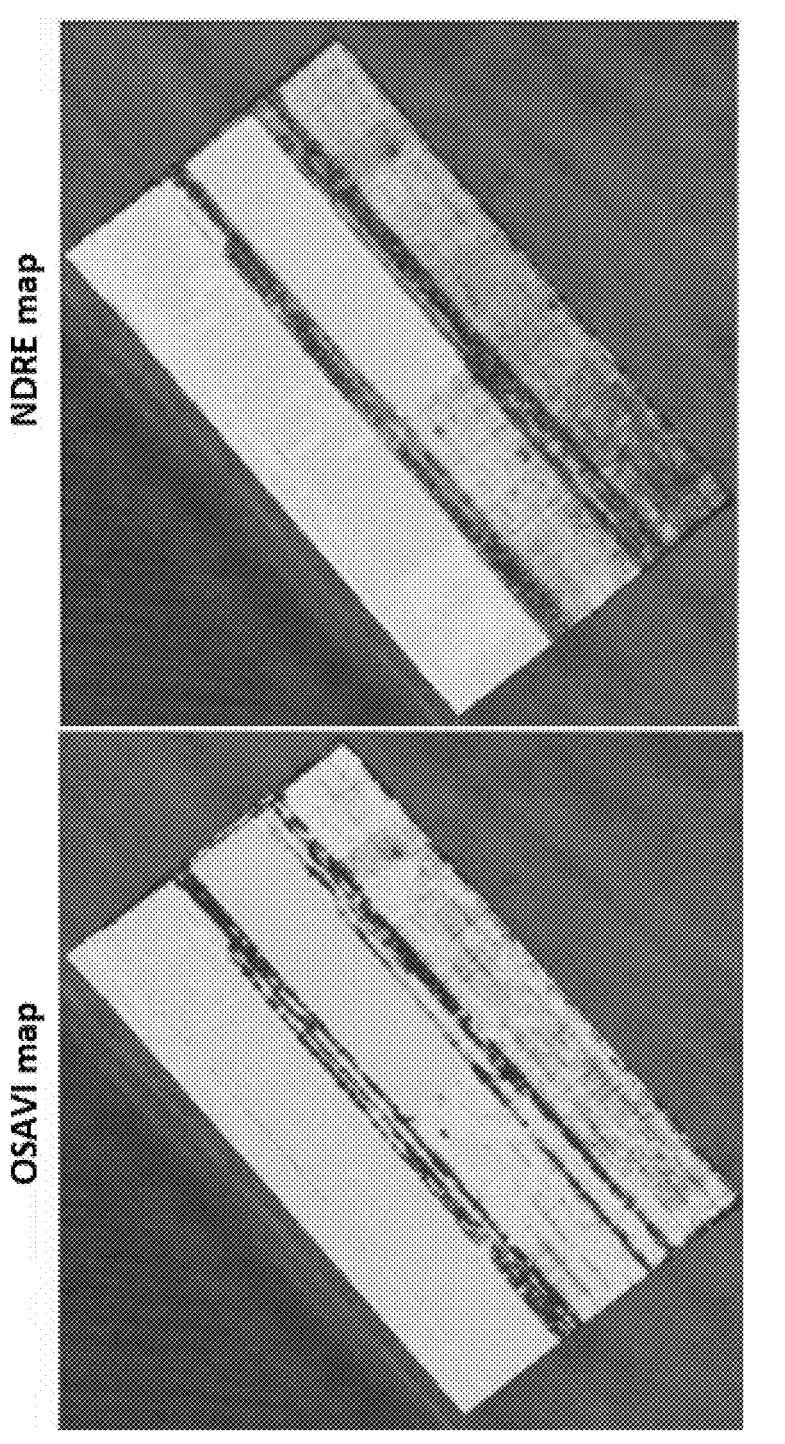

FIG. 33: Calculation of the OSAVI (left) and NDRE (right) indexes in R3-R4, full critical period. Soybean, 2018/19 season.

Figure 34:
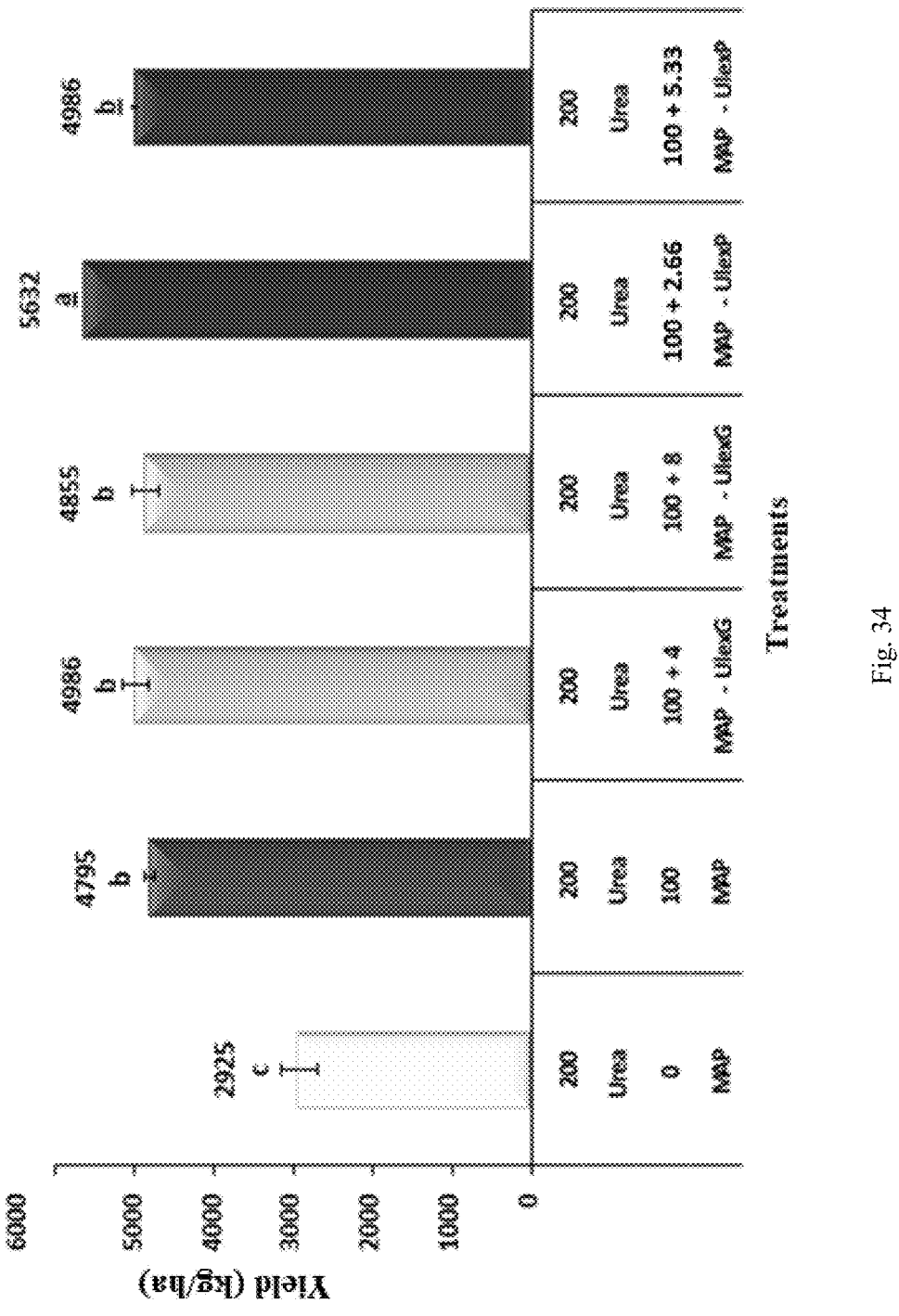

FIG. 34: Average wheat grain yield according to sources and doses for boron-ulexite impregnation on MAP. Different letters above the columns represent statistically significant differences between treatments (LSD a=0.05; MSD=443 kg ha$^{-1}$). The error bars indicate the standard deviation of the mean. INTA Pergamino, year 2018.

Figure 35:
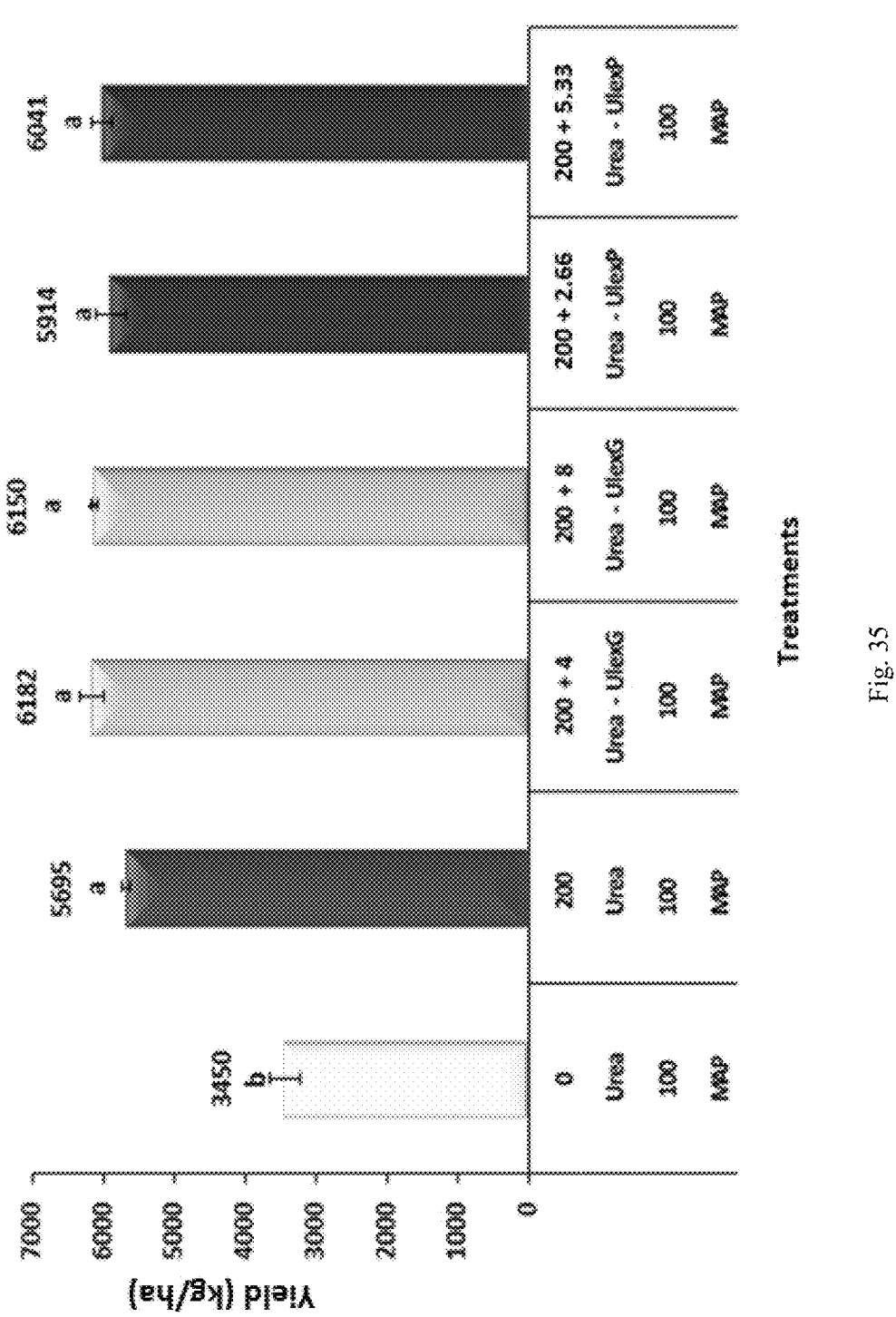

FIG. 35: Average wheat grain yield according to sources and doses for boron-ulexite impregnation on Urea. Different letters above the columns represent statistically significant differences between treatments (LSD a=0.05; MSD=694 kg ha$^{-1}$). The error bars indicate the standard deviation of the mean. INTA Pergamino, year 2018.

Figure 36:
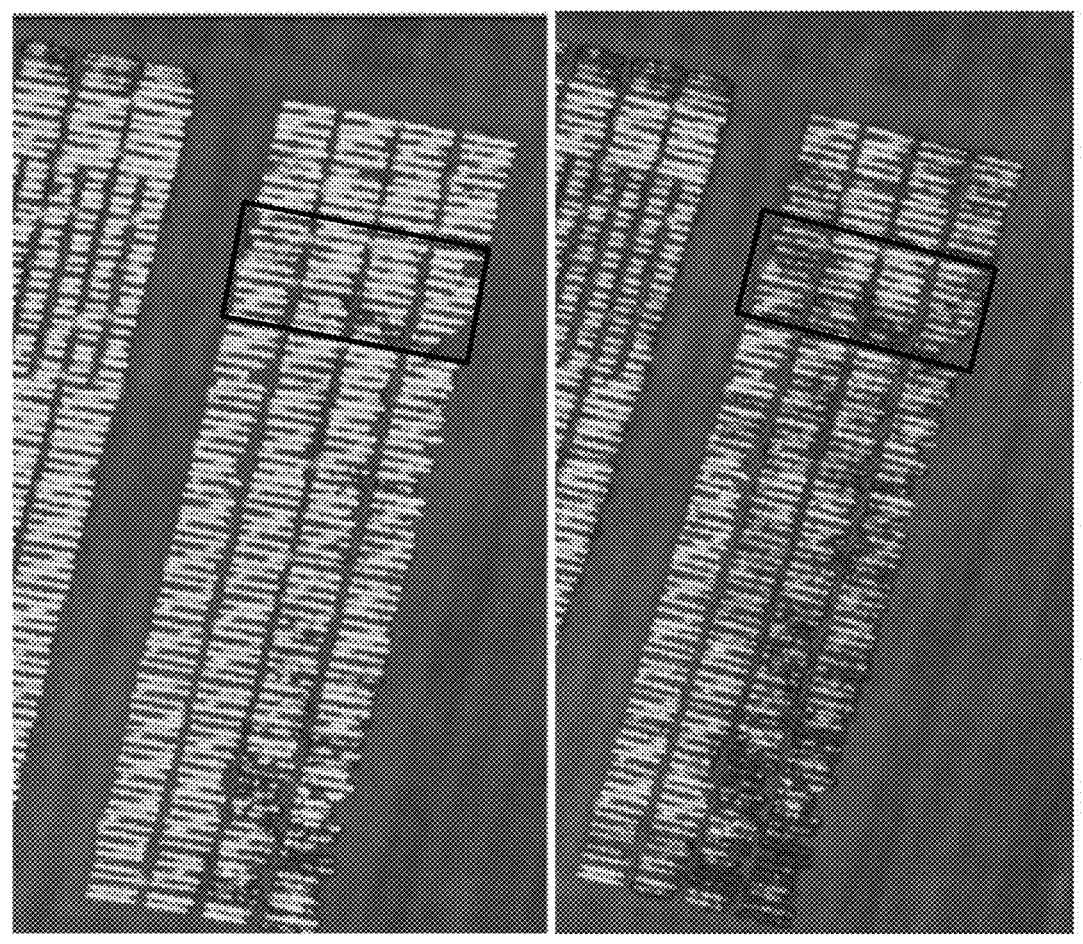

FIG. 36: Calculation of the OSAVI (left) and TCARI (right) indexes around anthesis. The squares show the plots of the present experiment.

DETAILED DESCRIPTION OF THE INVENTION

The present invention is related to a technology for homogeneously and effectively integrating traditional and non-traditional sources in integral nutrients, which is practical, efficient, effective, and differentiating, allowing to achieve a demonstrated and significant crop growth, impacting on yield increases versus the application of traditional nutrients and micronutrients separately.

The invention is versatile allowing to combine nutrients adapting in types and dosages according to their availability in the soil, to maximize crop growth, making feasible the incorporation of other components such as growth hormones and plant growth promoting microorganisms.

Although in general crops already respond positively to traditional nutrition, improving their growth, photosynthetic efficiency and grain yield, the inventors have found through field studies that an improved and enhanced response is obtained when using granulated agricultural compositions prepared through impregnation treatments of traditional sources with accompanying elements (micronutrients), forming integral nutrients, which enter the soil and are better used by crops.

It is therefore an object of the present invention to provide a granulated agricultural composition comprising:
    i—a macronutrient in granulated form;
    ii—a micronutrient; and
    iii—at least a coadjuvant for the process of integrating the macronutrient and the micronutrient;
wherein the at least one coadjuvant and the micronutrient form a coating over the granules of the macronutrient.

The term "macronutrient" refers to any compound traditionally used to fertilize a crop. The term includes, but is not limited to, a nitrogen (N) source, a phosphorus (P) source, a potassium (K) source, a sulfur (S) source, a calcium (Ca) source, or a magnesium (Mg) source. The macronutrient must be a compound that can effectively and efficiently deliver the above elements to the crops.

Preferably, the macronutrient is selected from the group consisting of Urea, MAP (Monoammonium Phosphate), SSP (Single Superphosphate), Triple Superphosphate, DAP (Diammonium Phosphate), Calcium Carbonate, potassium chloride, potassium sulfate, magnesium sulfate, potassium nitrate, sulfur, potassium, calcium, ammonium sulfate, potassium sulfate, phosphorus pentoxide, potassium dioxide, and magnesium dioxide. More preferably, the macronutrient is selected from the group consisting of Urea, MAP and SSP.

In a particular embodiment of the invention, the granulated agricultural composition comprises a second macronutrient, which is not coated with the mixture of micronutrient and coadjuvant.

The term "micronutrient" is used in this description as it is usually understood in the field of agriculture, to denote those elements essential for crops that occur in extremely low concentrations in soils and plant tissues. The low requirement of micronutrients broadens the spectrum in terms of sources and forms of application.

Preferably, the micronutrient is selected from the group consisting of a boron (B) source, a chlorine (Cl) source, a cobalt (Co) source, a copper (Cu) source, an iron (Fe) source, a manganese (Mn) source, a molybdenum (Mo) source and a zinc (Zn) source. Preferably, the micronutrient is selected from the group consisting of a B source and a Zn source.

A particularly preferred source of B is the mineral ulexite, which is a hydrated sodium calcium borate, of formula $NaCaB_5O_9.8H_2O$, while a particularly preferred source of Zn is zinc oxysulfate.

The micronutrient is preferably incorporated into the composition in solid form, which may be a granular or powdered form.

The amounts of each nutrient to be applied will depend on the size and type of crop, among other factors. The technical expert will know how to determine these quantities in order to optimize the yield of the crop in question. Although the absolute amounts depend on the application situation, preferably the macronutrient and micronutrient are present in an amount ratio of between 200:1 and 5:1, more preferably between 100:1 and 10:1. In particular embodiments of the invention, the macronutrient and micronutrient are present in an amount ratio selected from 100:1, 50:1, 40:1, 25:1, 12.5:1 and 10:1.

The coadjuvants are components that are introduced during the process of obtaining the compositions of the invention, and which act as adhesives, dust suppressants, biocides and colorants, since they contain pigments that provide coloring to the nutrients, allowing differentiation of the different combinations of macro and micronutrients. Therefore, they function on the one hand as indicators of both the appropriate mixing of the compounds to obtain the formulations, and of the recommended homogeneous distribution on the fertilized surfaces.

According to the present invention, different coating, damp barrier, dust control and adhesive coadjuvants can be used, which may contain minerals of the alumina silicate family, iron, calcium, magnesium and alkaline minerals, such as mica derivatives, and/or plastomer-type polymeric materials and pigments derived from resins, titanium dioxide, cobalt oxides, copper oxides, carbazoles, as colorants that can provide a complete range of colors required to identify the final products.

In a particular embodiment, the composition of the invention comprises a mixture of coadjuvants comprising a mineral of the mica family, a polymeric material of the plastomer type, titanium dioxide and pigments derived from resins. Preferably, the plastomer-type polymeric material is a polyolefin. More preferably, the mixture of coadjuvants comprises titanium dioxide, a mineral of the mica family, polyethylene and a mixture of pigments derived from resins. The mixture of pigments can be adapted according to the combination of macronutrients and micronutrients used, to differentiate between different combinations.

Additionally, the mixture of coadjuvants may also contain some additional component, such as preservatives normally used in the technique.

The coadjuvants are present in the composition of the invention in such quantities as to permit adequate adhesion and impregnation of the micronutrient on the macronutrient granules. Preferably, the coadjuvants are present in the composition in an amount of between 0.5 and 2.0 L/ton of composition.

In a particularly preferred embodiment of the invention, the composition comprises a mixture of coadjuvants comprising titanium dioxide in a concentration of less than 10% w/w, a mineral of the mica family in a concentration of less than 10% w/w, polyethylene in a concentration of less than 5% w/w, and a mixture of pigments, the concentration of which the person skilled in the art will know how to adapt according to the pigments used.

In a particularly preferred embodiment, the granulated agricultural composition of the invention comprises:
 MAP and urea as granulated macronutrients;
 a micronutrient selected from zinc oxysulfate and ulexite; and
 a mixture of coadjuvants comprising titanium dioxide, a mineral of the mica family, polyethylene and a mixture of pigments derived from resins;
where the mixture of coadjuvants and the micronutrient form a coating on the granules of one of the macronutrients.

In another particularly preferred embodiment, the granulated agricultural composition of the invention comprises:
 urea as a granulated macronutrient;
 a micronutrient selected from zinc oxysulfate and ulexite; and
 a mixture of coadjuvants comprising titanium dioxide, a mineral of the mica family, polyethylene and a mixture of pigments derived from resins;
where the mixture of coadjuvants and the micronutrient form a coating on the macronutrient granules.

In another particularly preferred embodiment, the granulated agricultural composition of the invention comprises:
 SPS as a granulated macronutrient;
 a micronutrient selected from zinc oxysulfate and ulexite; and
 a mixture of coadjuvants comprising titanium dioxide, a mineral of the mica family, polyethylene and a mixture of pigments derived from resins;
where the mixture of coadjuvants and the micronutrient form a coating on the macronutrient granules.

Another aspect of the present invention relates to a method for preparing a granulated agricultural composition in accordance with the present invention. The method comprises the steps of:
 i) providing a macronutrient to a mixing tank;
 ii) adding 50% of the total amount of the at least one coadjuvant;
 iii) adding the micronutrient; and
 iv) adding the remaining 50% of the at least one coadjuvant.

Production batch sizes are defined according to the needs of the areas where field applications will be made. These sizes are variable; in general, at least 1000 kg are required.

According to the preparation method of the invention, the macronutrients are introduced into a mixer type tank with constant centrifugal agitation. The time required to homogenize the mixture can range from 20 to 40 minutes.

The coadjuvants are applied in two stages by means of injectors, preferably electronic injectors. The coadjuvants are incorporated at a time-dependent flow rate depending on the product density, preferably dissolved in a suitable solvent system, which any expert in the art will be able to determine. A preferred solvent system for incorporating the coadjuvants into the composition is a mixture of methanol and propylene glycol. Preferably, the final incorporation of the coadjuvants is done by microdroplet spraying (similar to a sprayer) in the last minute of homogenization of the mixture prior to final packaging.

Another aspect of the present invention relates to a method for improving the yield of a crop comprising applying an effective amount of the granulated agricultural composition of the invention to said crop.

The application of the composition can be done at different times of the crop cycle. Preferably, the application is made at the time of sowing.

In a particular embodiment of the invention, the crop to which the composition is applied is selected from the group consisting of corn, wheat, soybean and sunflower.

By means of the present invention, granulated agricultural compositions are provided that offer numerous advantages over traditional compositions, such as:
 crop efficiency is improved, with a significant increase in the yield obtained;
 nutrient losses by washing are reduced as they are protected by the coadjuvants, making their gradual release feasible;
 nutrient deficiencies or excesses are avoided, ensuring their optimal availability throughout the entire growth cycle of the crop;
 by not having to split nutrient applications separately, savings in operating costs and labor are realized;
 more precise doses can be applied, avoiding salt accumulation and groundwater contamination.

The following examples of embodiments evidence the improvements obtained by means of the present invention.

EXAMPLES

In all the examples below the granulated agricultural compositions evaluated were prepared using a mixture of coadjuvants with the following formulation (where the concentrations are expressed as a function of the total weight of the granulated agricultural composition).
 Mixture of pigments
 Methanol Content (W/W): <4%.
 1,2-benzisothiazole-3(2H)-one Content (w/w): <0.05%.
 Rutile (TiO2) Content (W/W): <10%.
 Mineral of the mica family Content (W/W): <10%.
 Polyethylene Content (W/W): <5%.
 1,2-propylene glycol Content (W/W): <5%.

Example 1—Zinc Impregnated in Phosphorus and Nitrogen Macronutrients for Corn; 2017-2018 Season

Materials and Methods

A field experiment was carried out at the EEA INTA Pergamino, on a Pergamino Series soil, typical Argiudol, (USDA-Soil Taxonomy V. 2006), use capacity: I; IP=85. The trial was planted on October 4th and was spaced at 0.7 m between rows, achieving a final density of 75,000 plants·ha$^{-1}$. The chosen cultivar was Nidera Ax 7822 VT3P. Good productive conditions were ensured, keeping the crop free of weeds, pests and diseases. Impregnation treatments with Zn powder are evaluated over traditional sources such as MAP or urea. The design corresponded to randomized complete blocks with 4 replications and 6 treatments, as shown in Table 1.

TABLE 1

Powder and granular Zn fertilization
treatments applied in the experiment.

| | Alternative application | Dose | Application state |
|---|---|---|---|
| T0 | Absolute control | | |
| T1 | MAP | 100 kg ha$^{-1}$ | sowing |
| | Urea | 200 kg ha$^{-1}$ | |
| T2 | MAP (treated with 50% zinc oxysulfate powder) | 100 + 2 kg ha$^{-1}$ | sowing |
| | Urea | 200 kg ha$^{-1}$ | |
| T3 | MAP | 100 kg ha$^{-1}$ | sowing |
| | Urea (treated with 50% zinc oxysulfate powder) | 200 kg ha$^{-1}$ + 2 kg ha$^{-1}$ | |
| T4 | MAP (treated with 50% zinc oxysulfate powder) | 100 + 4 kg ha$^{-1}$ | sowing |
| | Urea | 200 kg ha$^{-1}$ | |
| T5 | MAP | 100 kg ha$^{-1}$ | sowing |
| | Urea (treated with 50% zinc oxysulfate powder) | 200 kg ha$^{-1}$ + 4 kg ha$^{-1}$ | |
| T0 | Absolute control | | |
| T1 | MAP | 100 kg ha$^{-1}$ | sowing |
| | Urea | 200 kg ha$^{-1}$ | |
| T2 | MAP (treated with 20% granulated zinc oxysulfate) | 100 + 5 kg ha$^{-1}$ | sowing |
| | Urea | 200 kg ha$^{-1}$ | |
| T3 | MAP | 100 kg ha$^{-1}$ | sowing |
| | Urea (treated with 20% granulated zinc oxysulfate) | 200 kg ha$^{-1}$ + 5 kg ha$^{-1}$ | |
| T4 | MAP (treated with 20% granulated zinc oxysulfate) | 100 + 10 kg ha$^{-1}$ | sowing |
| | Urea | 200 kg ha$^{-1}$ | |
| T5 | MAP | 100 kg ha$^{-1}$ | sowing |
| | Urea (treated with 20% granulated zinc oxysulfate) | 200 kg ha$^{-1}$ + 10 kg ha$^{-1}$ | |

TABLE 2

Soil analysis carried out at planting time

| Depth | Organic matter % | Total N | Extractable phosphorus | N-Nitrates 0-20 cm ppm | N-Nitrates soil 0-60 cm kg ha$^{-1}$ |
|---|---|---|---|---|---|
| | | | mg kg$^{-1}$ | | |
| 0-20 cm | 2.16 | 0.108 | 9.8 | 13.5 | 75.9 |
| | very low | very low | very low | high | high |
| Prof | S-Sulfates soil | Zinc | Boron | pH | Water in soil |
| | mg kg$^{-1}$ | mg kg$^{-1}$ | mg kg$^{-1}$ | water 1:2.5 | 150 cm - sowing |
| 0-20 cm | 8.0 | 1.29 | 0.45 | 5.6 | 150 mm |
| | intermediate | high | intermediate | Slightly acid | normal |

In the V10 state, NDVI was determined by means of the Green seeker sensor. At flowering, accumulated dry matter, number of photosynthetically active leaves, vigor, cover, plant height and green index by Spad were measured. At harvest, yield components, number of spikes·m$^{-2}$ (NS), grains·spike$^{-1}$ (GS), number of grains·m$^{-2}$ (NG) and weight (WGx1000) of grains were determined. Harvesting was done manually, with stationary threshing of the samples. For the study of the results, analysis of variance and mean comparisons were performed.

Environmental Conditions During the Season

Figure 1:
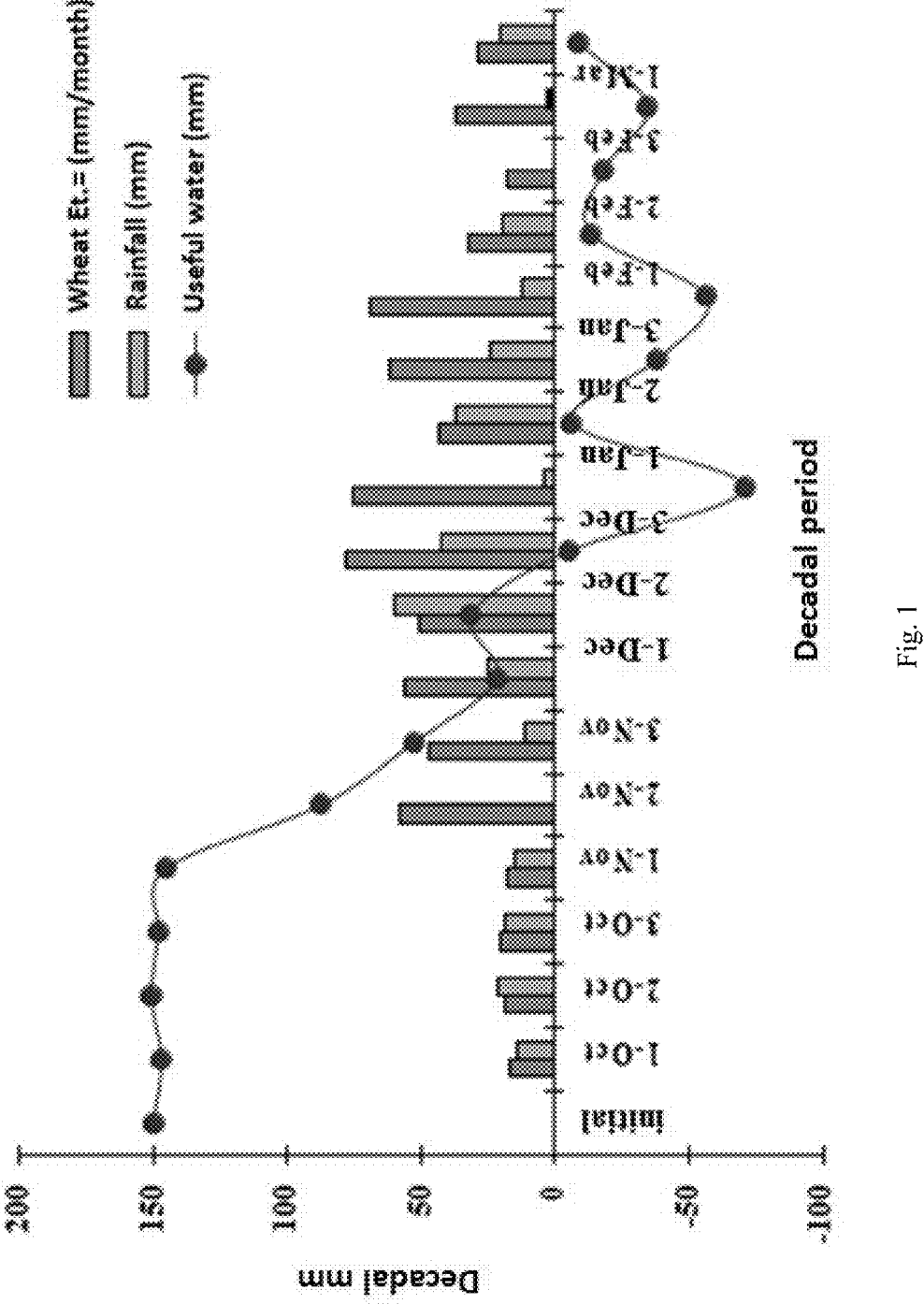
FIG. 1: Precipitation, evapotranspiration and storage level
(positive values) or deficit (negative) accumulated (mm) in
the experimental site. Pergamino, Buenos Aires, Argentina,
2017/18 corn season. Initial available water in the soil (150
cm): 150 mm. Total rainfall in the cycle: 328 mm. Cumu-
lative evapotranspiration deficit: 251 mm.
Figure 2:
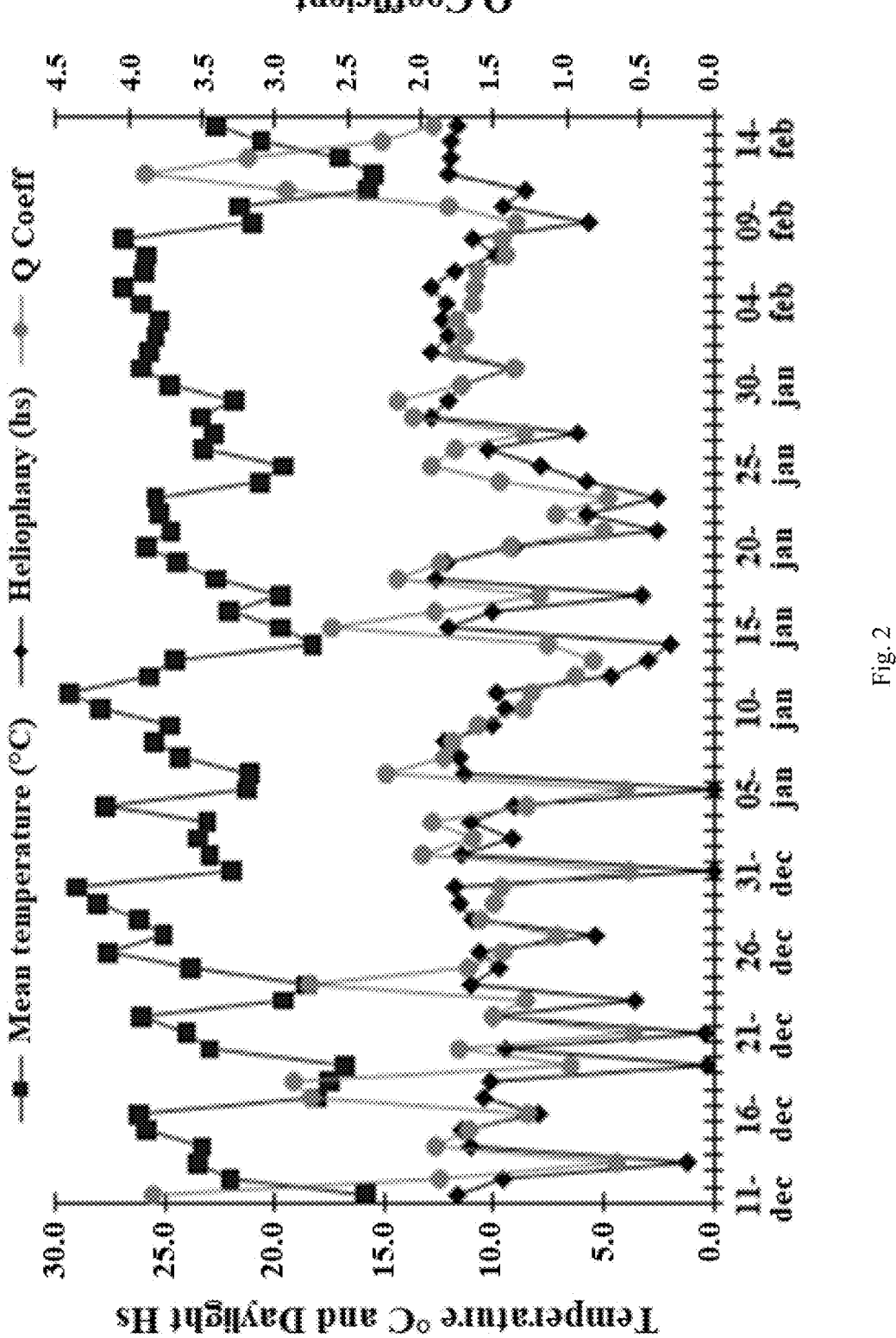
FIG. 2: Insolation (in hours and tenths of an hour) and
average daily temperature (° C.) for the period December
10-February 14, during which the critical stage of flowering
and the beginning of grain filling took place. Data taken
from the weather station of the EEA INTA Pergamino,
Buenos Aires, Argentina, 2017/18 corn season.
Figure 3:
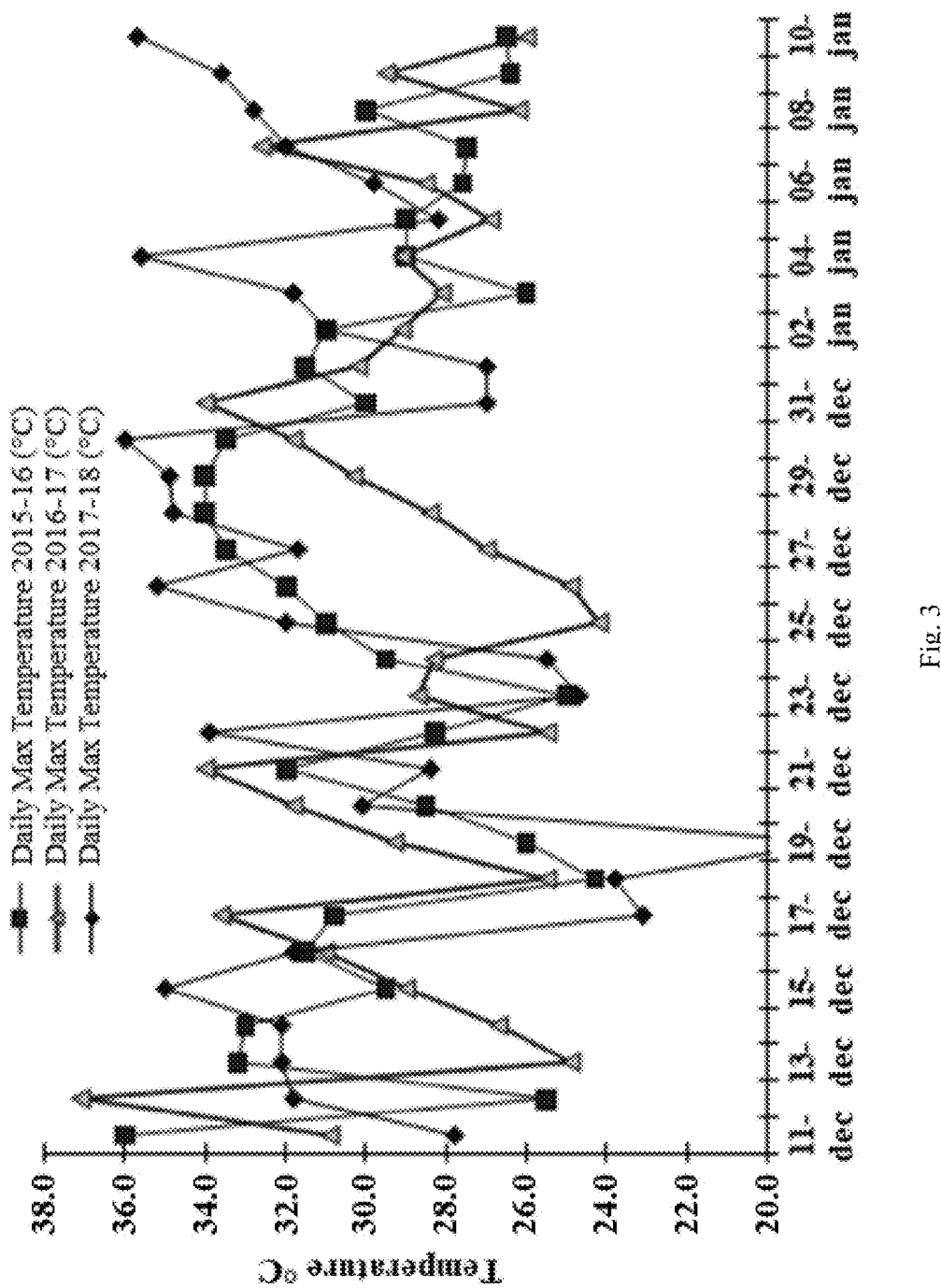
FIG. 3: Daily maximum temperatures during the 2015/16,
2016/17 and 2017/18 corn seasons. Data taken from the
weather station of the EEA INTA Pergamino, Buenos Aires,
Argentina.

FIG. 1 shows the precipitation of the site during the crop cycle, and FIG. 2 shows the temperatures, daylight hours and photothermal coefficient (Q), with data from the EEA Pergamino. The stage between December 10th and February 15th was considered, which covers the critical period of flowering and grain filling in all the materials. In FIG. 3, the maximum temperatures of this cycle are compared with those of previous cycles.

The season was drier and cooler than the last three seasons. All months, from September to March, had nights with absolute minimum temperatures close to zero, measured outdoors at 5 cm above the ground (Source: Climatología INTA EEA Pergamino). Rainfall was especially low during November, January, February and March. The low spring temperatures and low rainfall in November resulted in a low crop size, with limited biomass, which would have conditioned yields.

A medium productivity corn crop requires a consumptive use of approximately 550 mm of water. During the cycle, the present received 328 mm of rainfall and contained 150 mm of usable water at 1.5 m depth. This means that the crop would have maximized the use of reserves and rainwater, in a very tight water balance especially at the end of the cycle. The antecedent moisture from the previous cycle and the very timely rainfall in December explain the good yields and the efficient use of water.

Light conditions were average. The photothermal quotient (Q) (December 11-January 10) was 1.65, lower than in the preceding El Nino years (2015/16: 1.72; 2014/15: 1.70) but nevertheless much higher than in warm years (2013/14: 1.35; 2016/17: 1.58) (FIG. 2). Average temperatures were cool during December, and especially high during the January-February transition (FIG. 3). A large thermal amplitude was observed, with very low punctual records in the minimum temperature.

Results
A) Zn Powder

Figure 4:
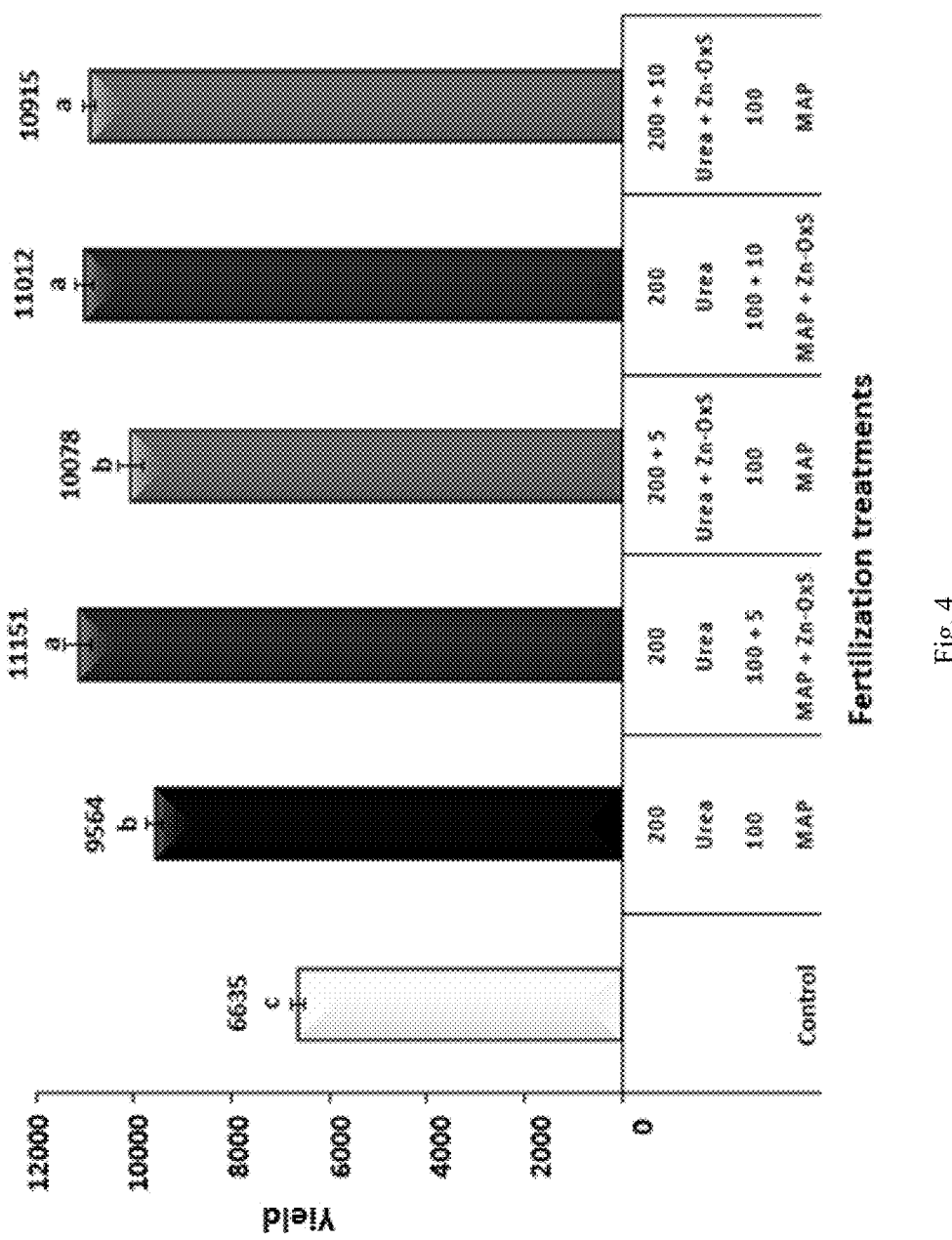
FIG. 4: Corn yield according to fertilization strategies
with phosphorus, nitrogen and zinc powder by impregnation
of traditional sources by zinc powder. 2017/18 cycle. Dif-
ferent letters above the columns represent statistically sig-
nificant differences between treatments (LSD a=0.05).
MSD=629 kg/ha. The error bars indicate the standard devia-
tion of the mean.

In Table 3 the morphological and physiological crop variables and yield components are presented, while in FIG. 4 the yields and their statistical significance are shown.

TABLE 3

Morphological parameters and yield components: Dry matter in R1, plant and spike insertion height, radiation interception at flowering, green intensity determined by Spad and NDVI by Green seeker, vigor, yield and its numerical components: spikes · m$^{-2}$ (NS), grains · spike$^{-1}$ (GS), number of grains · m$^{-2}$ (NG) and weight (WG × 1000) of grains. Zinc fertilization strategies by impregnation from traditional sources in traditionally dated corn. INTA Pergamino, 2017/18 season.

| Tr | Description | Dry M R1 (g m$^{-2}$) | Plant height (cm) | Insertion height (cm) | Spad R1 | Coverage R1 (%) | Vigor (1-5) |
|----|-------------|-----------------------|-------------------|-----------------------|---------|-----------------|-------------|
| T0 | Control | 1648.0 | 190 | 55 | 49.8 | 78.2 | 3.0 |
| T1 | Map 100 + Urea 200 | 1957.4 | 205 | 70 | 53.1 | 81.9 | 3.4 |
| T2 | Map – OxZn 100 + 2 + Urea 200 | 1794.4 | 203 | 68 | 54.1 | 92.4 | 3.8 |
| T3 | Map 100 + Urea- OxZn 200 + 2 | 1717.6 | 195 | 68 | 54.6 | 87.2 | 3.7 |
| T4 | Map – OxZn 100 + 4 + Urea 200 | 1762.5 | 195 | 65 | 52.2 | 93.7 | 3.8 |
| T5 | Map 100 + Urea- OxZn 200 + 4 | 1933.5 | 205 | 70 | 56.8 | 83.4 | 3.7 |
| $R_2$ vs yield | | 0.25 | 0.38 | 0.69 | 0.55 | 0.25 | 0.38 |

| Tr | Description | Green seeker V10 | NS | GS | NG | WG × 1000 | Yield (kg ha$^{-1}$) |
|----|-------------|------------------|-----|-----|-----|-----------|----------------------|
| T1 | Control | 0.66 | 5.0 | 406.2 | 2031.0 | 326.7 | 6634.5 |
| T2 | Map 100 + Urea 200 | 0.70 | 5.9 | 519.6 | 3052.5 | 313.3 | 9564.4 |
| T3 | Map – OxZn 100 + 2 + Urea 200 | 0.71 | 5.3 | 812.8 | 4267.0 | 261.3 | 11151.1 |
| T4 | Map 100 + Urea- OxZn 200 + 2 | 0.68 | 6.1 | 576.6 | 3531.9 | 285.3 | 10077.6 |
| T5 | Map – OxZn 100 + 4 + Urea 200 | 0.68 | 6.5 | 622.8 | 4048.4 | 272.0 | 11011.7 |
| T6 | Map 100 + Urea- OxZn 200 + 4 | 0.70 | 5.9 | 688.1 | 4042.7 | 270.0 | 10915.3 |
| $R_2$ vs yield | | 0.55 | 0.35 | 0.57 | 0.88 | 0.75 | |
| Stat. Sign (P=) | | | | | | | <0.0001 |
| VQ (%) | | | | | | | 5.18 |

Vigor Index: 1 minimum 5-maximum

B) Granulated Zn

Figure 5:
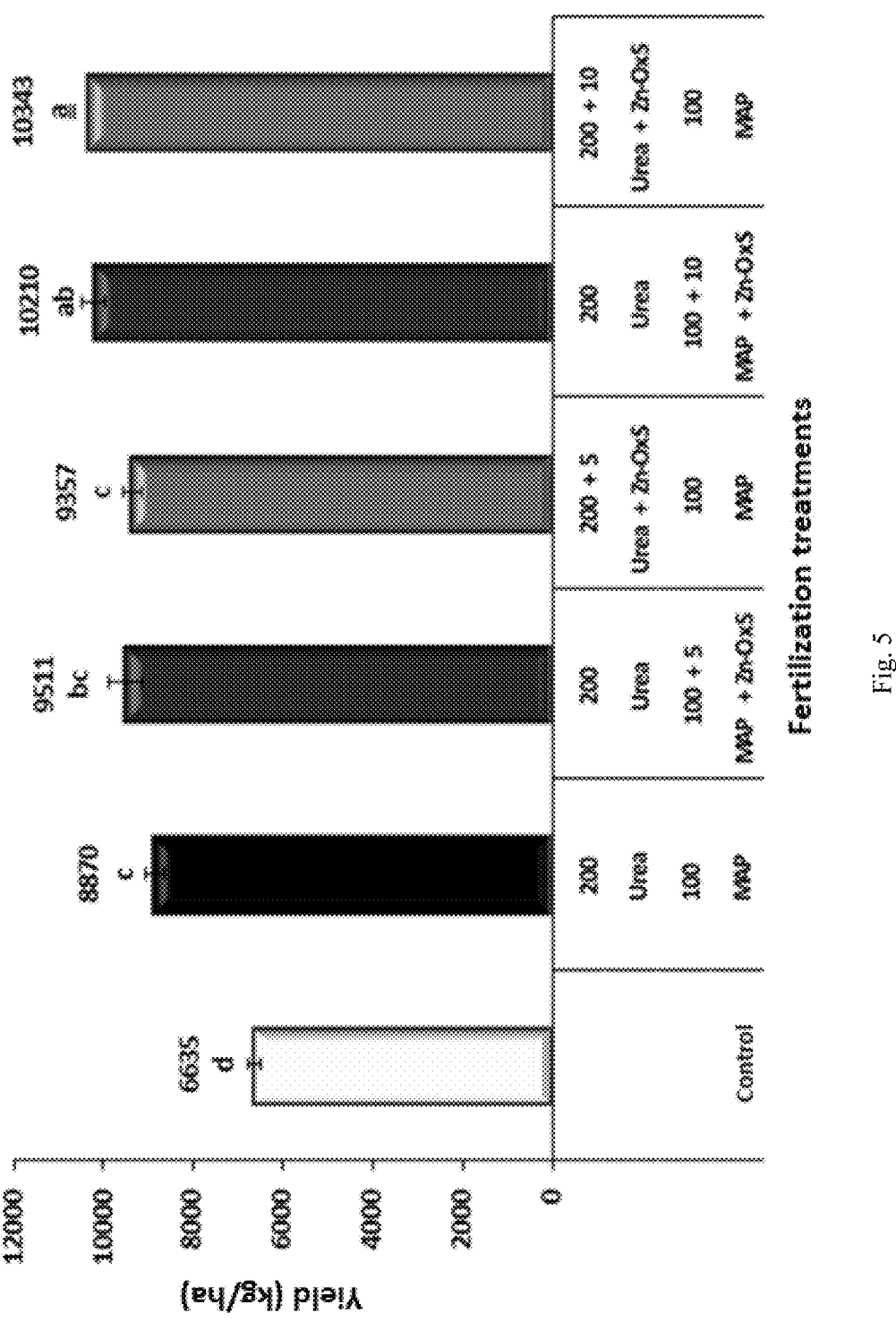
FIG. 5: Corn yield according to phosphorus, nitrogen and
zinc fertilization strategies by impregnation of traditional
sources by granular zinc. 2017/18 cycle. Different letters
above the columns represent statistically significant differ-
ences between treatments (LSD a=0.05). MSD=714. The
error bars indicate the standard deviation of the mean.

In Table 4 the morphological and physiological crop variables and yield components are presented, while in FIG. 5 the yields and their statistical significance are shown.

Discussion and Conclusions

A) Zn Powder

Yields reached an average of 9892.4 kg ha$^{-1}$, being slightly higher than in its analog treated with Zn powder. The

TABLE 4

Morphological parameters and yield components: Dry matter in R1, plant and spike insertion height, radiation interception at flowering, green intensity determined by Spad and NDVI by Green seeker, vigor, yield and its numerical components: spikes · m$^{-2}$ (NS), grains · spike$^{-1}$ (GS), number of grains · m$^{-2}$ (NG) and weight (WG × 1000) of grains. Zinc fertilization strategies by impregnation from traditional sources in traditionally dated corn. INTA Pergamino, 2017/18 season.

| Tr | Description | Dry M R1 (g m$^{-2}$) | Plant height (cm) | Insertion height (cm) | Spad R1 | Coverage R1 (%) | Vigor (1-5) |
|----|-------------|-----------------------|-------------------|-----------------------|---------|-----------------|-------------|
| T0 | Control | 1648.0 | 190 | 55 | 49.8 | 78.2 | 3.0 |
| T1 | Map 100 + Urea 200 | 1724.1 | 205 | 70 | 54.2 | 83.2 | 3.5 |
| T2 | Map – OxZn 100 + 5 + Urea 200 | 1634.5 | 205 | 70 | 54.3 | 79.1 | 4.0 |
| T3 | Map 100 + Urea- OxZn 200 + 5 | 1844.9 | 203 | 68 | 56.6 | 93.6 | 3.7 |
| T4 | Map – OxZn 100 + 10 + Urea 200 | 1769.1 | 195 | 58 | 54.4 | 89.8 | 3.9 |
| T5 | Map 100 + Urea- OxZn 200 + 10 | 1967.1 | 195 | 60 | 54.0 | 90.3 | 3.7 |
| $R_2$ vs yield | | 0.37 | 0.12 | 0.08 | 0.60 | 0.44 | 0.79 |

| Tr | Description | Green seeker V10 | NS | GS | NG | WG × 1000 | Yield (kg ha$^{-1}$) |
|----|-------------|------------------|-----|-----|-----|-----------|----------------------|
| T1 | Control | 0.66 | 5.0 | 406.2 | 2031.0 | 326.7 | 6634.5 |
| T2 | Map 100 + Urea 200 | 0.71 | 6.8 | 407.3 | 2748.9 | 322.7 | 8869.9 |
| T3 | Map – OxZn 100 + 5 + Urea 200 | 0.72 | 6.6 | 472.2 | 3128.6 | 304.0 | 9510.8 |
| T4 | Map 100 + Urea- OxZn 200 + 5 | 0.75 | 6.4 | 495.9 | 3161.2 | 296.0 | 9357.2 |
| T5 | Map – OxZn 100 + 10 + Urea 200 | 0.72 | 7.0 | 511.2 | 3578.2 | 285.3 | 10209.8 |
| T6 | Map 100 + Urea- OxZn 200 + 10 | 0.73 | 5.8 | 624.6 | 3591.3 | 288.0 | 10342.9 |
| $R_2$ vs yield | | 0.71 | 0.45 | 0.57 | 0.97 | 0.76 | |
| Stat. Sign (P=) | | | | | | | <0.0001 |
| VQ (%) | | | | | | | 5.18 |

Vigor Index: 1 minimum 5-maximum acceptable level achieved is mainly explained by the initial reserves in the soil and the good rainfall in December (FIG. 1). The yields of the control without P show the nutritional deficiency to which an early sown crop is subjected in a soil typical of the region (Table 3).

Differences in yield were statistically significant (P<0.0001; VQ=4.2%). A strong response to P was verified, as well as to Zn. In contrast to what was observed with the granulated formulation, in this experiment the MAP treatments seemed to show a better performance than the Urea treatments, especially at low doses. The higher dose of 4 kg ha$^{-1}$ increased yields with respect to its lower alternative, especially the impregnation on Urea.

The variables with the highest relationship with yields were NG (r$^2$=0.88), WGx1000 (r$^2$=0.75), AIE (r2=0.69), GS (r$^2$=0.69), leaf N content estimated by Spad (r$^2$=0.55) and NDVI measured by Green Seeker (r$^2$=0.55).

The results obtained show a statistical response to the use of phosphorus and zinc, of great magnitude in the case of phosphorus and significant for the micronutrient. The low fertility of the site, observed in the similar experiment carried out with the granulated formulation, is reaffirmed.

The source of Zn used was effective in increasing yields, and the impregnation was an appropriate medium to transport it. The average yields of this experiment were higher than the one conducted with the alternative formulation. However, it seems to be more sensitive to the source on which the impregnation is performed, with better performance in those performed on MAP. Probably the in-line location would favor the performance of this one over Urea, applied in coverage. Likewise, there was a dose effect, with the best results in the higher dose, especially when the impregnation is on Urea.

B) Granulated Zn

Yields averaged 9154.2 kg ha$^{-1}$. They were conditioned by the level of degradation of the lot, low spring temperatures and lack of rainfall. However, the soil had good reserves and rainfall in the key month of December was acceptable. The yields of the control without P show the nutritional deficiency to which an early sown crop is subjected in a soil typical of the region (Table 4).

Significant differences were found between treatments (P<0.0001; VQ=5.1%). Response to P and Zn was verified. In Zn, not only response to the nutrient was determined, but also to doses of this element, reaching the maximum yield in T4 and T5, which provided 10 kg ha$^{-1}$ Zn oxysulfate. In contrast, no differences were found between MAP or Urea impregnation, even though the latter was applied in full coverage.

The most representative variables with the highest correlation with yields were NG (r$^2$=0.97), subjective vigor rating (r$^2$=0.79), WGx1000 (r$^2$=0.76), NDVI by Green Seeker (r$^2$=0.71), Leaf N content estimated by Spad (r$^2$=0.60), GS (r$^2$=0.57), NS (r$^2$=0.45) and Light interception at flowering (r$^2$=0.44).

The results obtained show a statistical response to the use of phosphorus and zinc. The site proves to be very poor in these elements. On the other hand, the source of Zn used was effective in increasing yields, and the impregnation was an appropriate medium to transport it. There was also a dose effect, with the best results at the higher dose. In contrast, there was no difference between MAP or Urea impregnation.

Example 2—Zinc Impregnated in Phosphorus and Nitrogen Macronutrients for Corn; 2018-2019 Season

Materials and Methods

During the year 2018, two field experiments were conducted at EEA INTA Pergamino, on a soil Serie Pergamino, Class I-2, typical Argiudol, fine family, illitic, thermal (USDA-Soil Taxonomy V. 2006). The trial was planted on October 2nd and was spaced at 0.7 m between rows, achieving a final density of 80,000 plants ha-1. The chosen cultivar was Dow Next 22.6 PW. Good productive conditions were ensured, keeping the crop free of weeds, pests and diseases. In the experiment, a randomized complete block design with 4 replications was used, whose treatments are detailed in Table 5. In addition, in Table 6, the soil data of the experiment are presented.

Impregnation treatments with Zn oxysulfate, in its granulated and powdered physical forms, were evaluated at two doses of Zn for each of them, respectively. In Experiment 1 a granular source was evaluated, and in Experiment 2 the same source in powder form, impregnated on MAP or Urea (Table 5). The MAP treatments were applied in-line incorporated, while in the case of using Urea as a substrate, they were applied on the surface.

TABLE 5

Powder and granular Zn fertilization treatments applied in the experiment. 2018/19 season.

| | Alternative application | Dose | | Application state |
|---|---|---|---|---|
| T1 | Absolute control | | | |
| T2 | MAP | 100 | kg ha$^{-1}$ | Sowing |
| | Urea | 200 | kg ha$^{-1}$ | |
| T3 | MAP (treated with 20% granulated zinc oxysulfate) | 100 + 5 | kg ha$^{-1}$ | Sowing |
| | Urea | 200 | kg ha$^{-1}$ | |
| T4 | MAP | 100 | kg ha$^{-1}$ | Sowing |
| | Urea (treated with 20% granulated zinc oxysulfate) | 200 + 5 | kg ha$^{-1}$ | |
| T5 | MAP (treated with 20% granulated zinc oxysulfate) | 100 + 10 | kg ha$^{-1}$ | Sowing |
| | Urea | 200 | kg ha$^{-1}$ | |
| T6 | MAP | 100 | kg ha$^{-1}$ | Sowing |
| | Urea (treated with 20% granulated zinc oxysulfate) | 200 + 10 | kg ha$^{-1}$ | |
| T1 | Absolute control | | | |
| T2 | MAP | 100 | kg ha$^{-1}$ | sowing |
| | Urea | 200 | kg ha$^{-1}$ | |
| T3 | MAP (treated with 50% zinc oxysulfate powder) | 100 + 2 | kg ha$^{-1}$ | sowing |
| | Urea | 200 | kg ha$^{-1}$ | |
| T4 | MAP | 100 | kg ha$^{-1}$ | sowing |
| | Urea (treated with 50% zinc oxysulfate powder) | 200 + 2 | kg ha$^{-1}$ | |
| T5 | MAP (treated with 50% zinc oxysulfate powder) | 100 + 4 | kg ha$^{-1}$ | sowing |
| | Urea | 200 | kg ha$^{-1}$ | |
| T6 | MAP | 100 | kg ha$^{-1}$ | sowing |
| | Urea (treated with 50% zinc oxysulfate powder) | 200 + 4 | kg ha$^{-1}$ | |

TABLE 6

| | Soil analysis carried out at planting time | | | | |
|---|---|---|---|---|---|
| Depth | Organic matter % | Total N | Extractable phosphorus mg kg$^{-1}$ | N-Nitrates (0-20) cm ppm | N-Nitrates soil 0-60 cm kg ha$^{-1}$ |
| Pergamino | 3.38 high | 0.169 high | 15.2 intermediate | 8.4 low | 33.9 Very low |
| Depth | S-Sulfates soil mg kg$^{-1}$ | Zinc mg kg$^{-1}$ | Boron mg kg$^{-1}$ | pH water 1:2.5 | Water in soil 150 cm - sowing |
| Pergamino | 7.0 low | 0.65 low | 0.33 low | 5.7 Slightly acid | 130 mm moderat. dry |

Environmental Conditions During the Season

Figure 6:
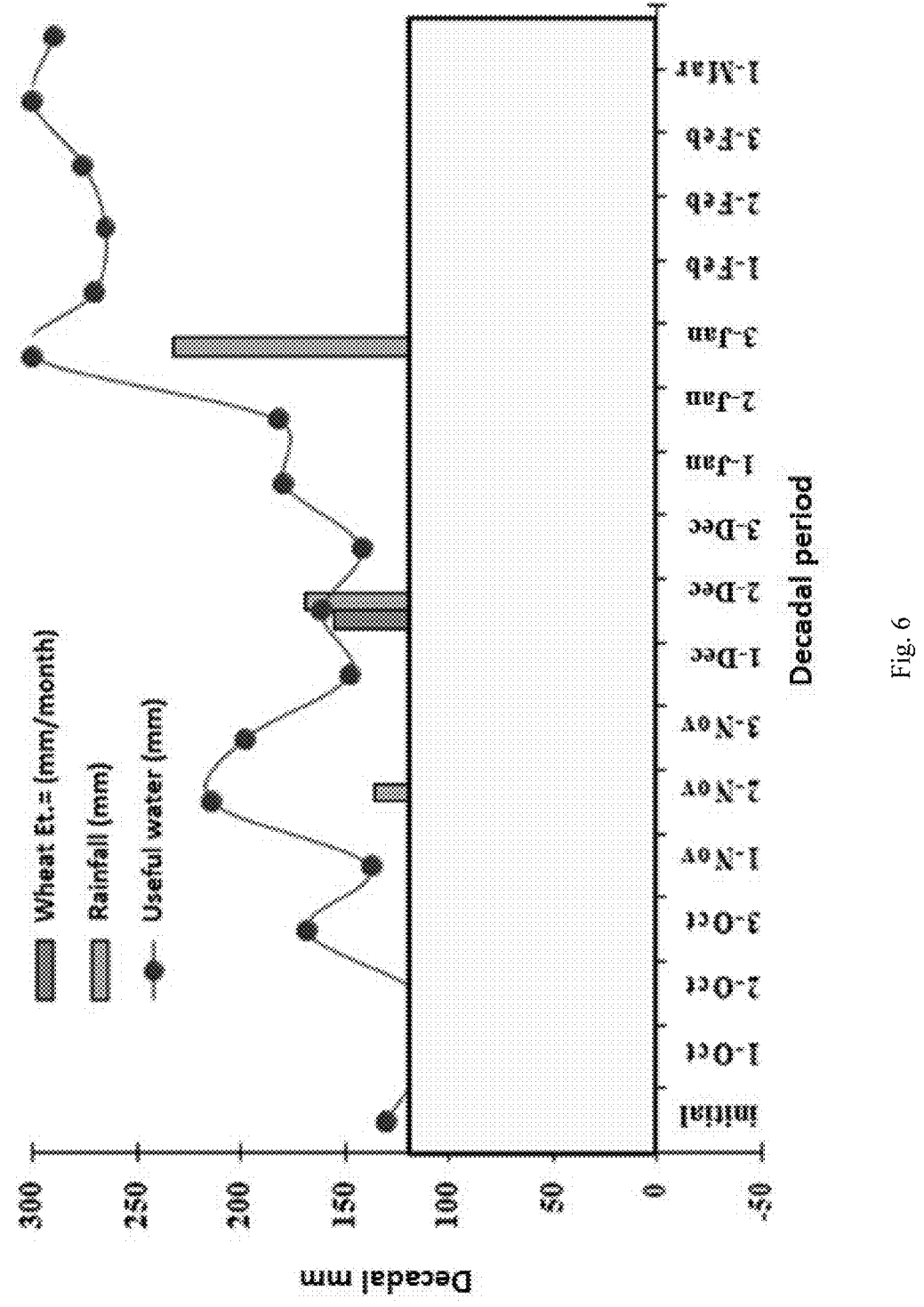
FIG. 6: Precipitation, evapotranspiration and storage level
(positive values) or deficit (negative) accumulated (mm) in
the experimental site. Pergamino, Buenos Aires, Argentina.
Initial available water in the soil (150 cm): 130 mm. Total
rainfall in the cycle: 987 mm. 2018/19 corn season. Very
slight evapotranspiration deficits were determined. The rect-
angle indicates the water level below which consumptive
use could be suboptimal.
Figure 7:
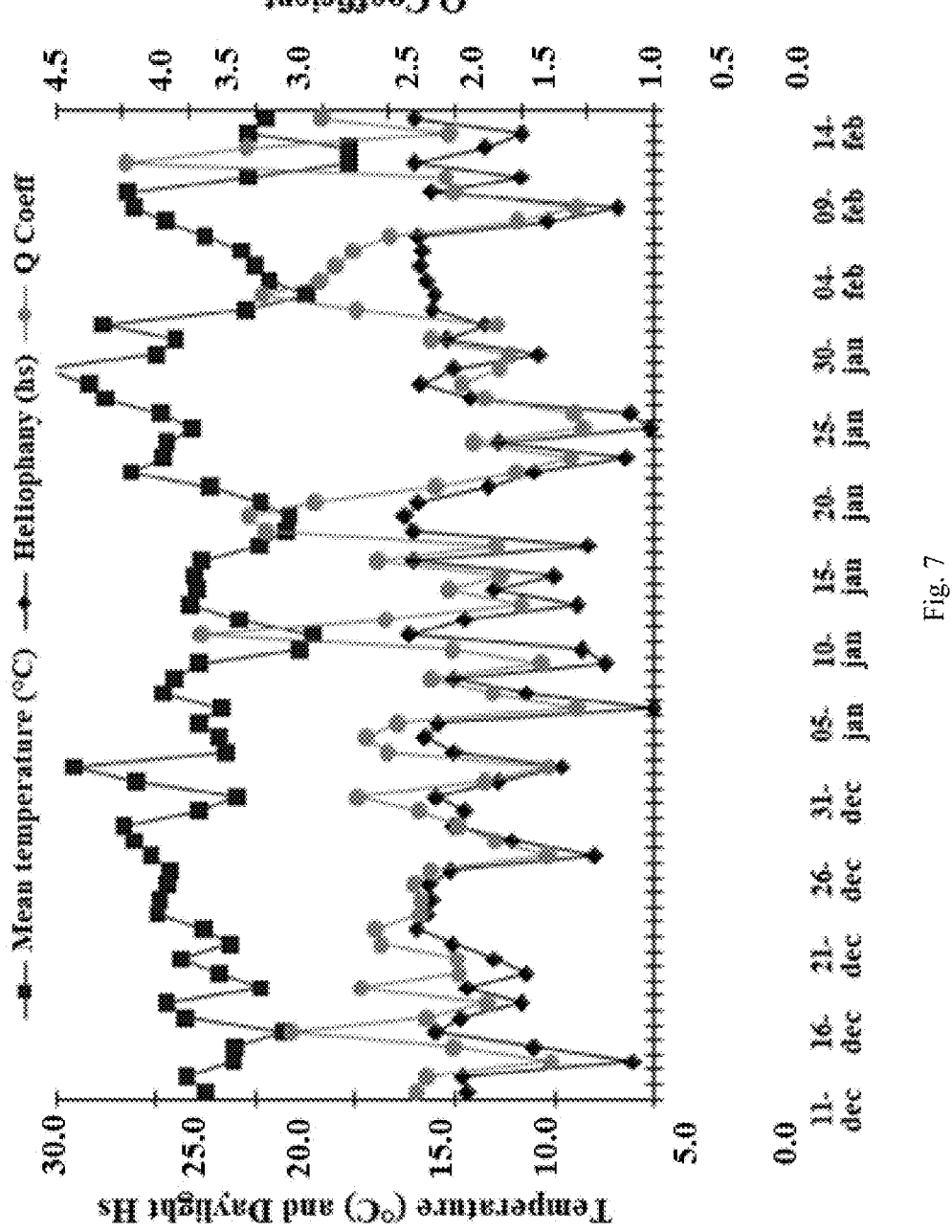
FIG. 7: Insolation (in hours and tenths of an hour) and
average daily temperature (° C.) for the period December
10-February 14, during which the critical stage of flowering
and the beginning of grain filling took place. Data taken from the weather station of the EEA INTA Pergamino, Buenos Aires, Argentina, corn season 2018/19.
Figure 8:
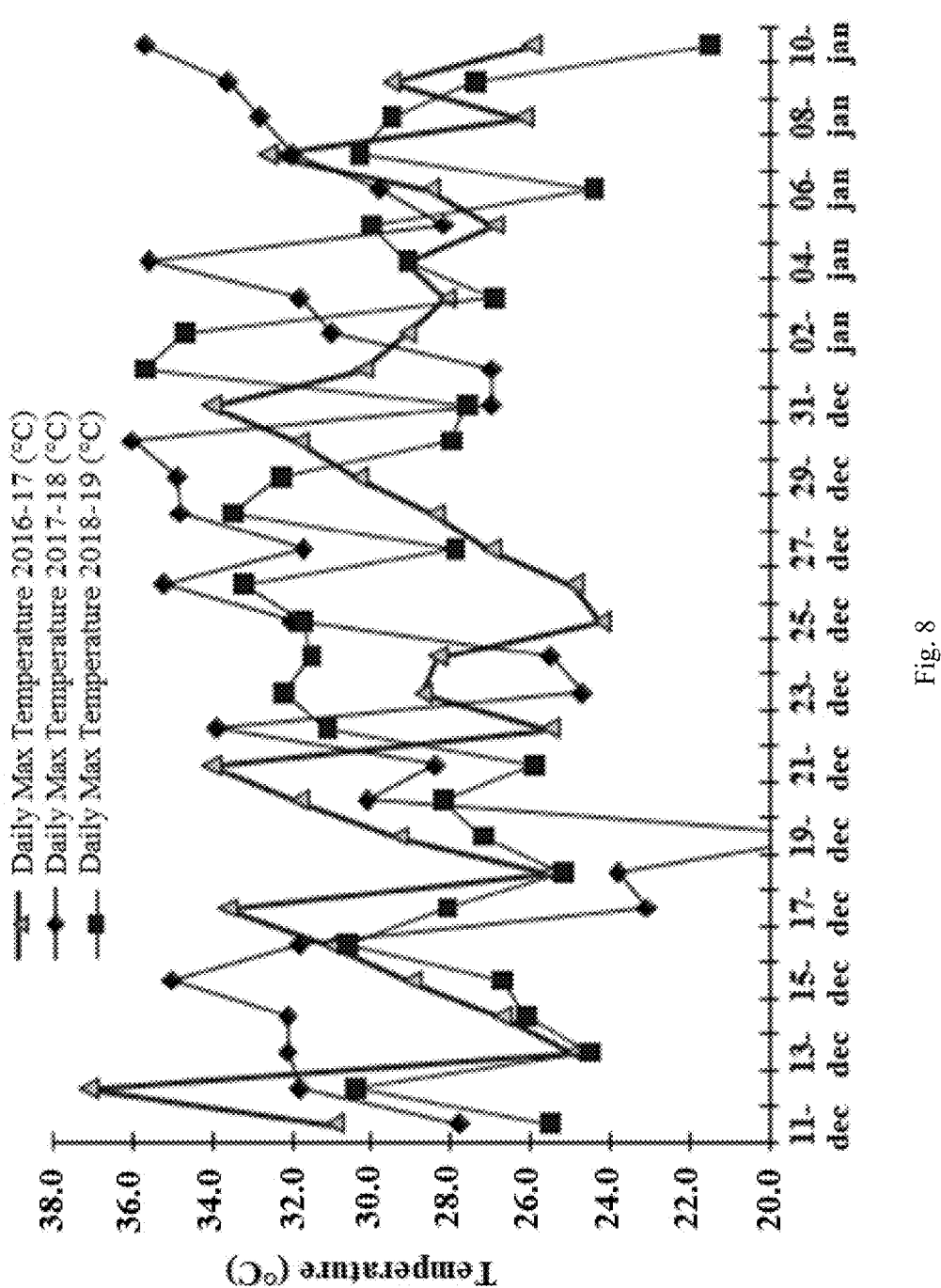
FIG. 8: Daily maximum temperatures during the 2016/17, 2017/18 and 2018/19 corn seasons. Data taken from the weather station of the EEA INTA Pergamino, Buenos Aires, Argentina.

FIG. 6 shows the precipitation of the sites during the crop cycle, and FIG. 7 shows the temperatures, daylight hours and photothermal coefficient (Q), with data from EEA Pergamino. The stage between December 10th and February 15th was considered, which covers the critical period of flowering and grain filling in all the materials. In FIG. 8, the maximum temperatures of this cycle are compared with the previous ones.

The season was very favorable, although somewhat excessive in rainfall, which was concentrated in short periods of time (FIG. 6) that would have caused leaching of N. As a mitigating factor, the rains were relatively late, especially since mid-December. A large number of cloudy days with low radiation were recorded, due to frequent rainfall (FIG. 7). Average temperatures were cool and lower than 2017/18, especially in the January-February transition during grain filling (FIG. 8), although higher than 2016/17. The photothermal quotient (Q) (December 11-January 10) was 1.59, lower than in the preceding years (2017/18: 1.65; 2015/16: 1.72; 2014/15: 1.70) but nevertheless higher than the warm cycles (2013/14: 1.35; 2016/17: 1.58) (FIG. 7).

Results

Figure 9:
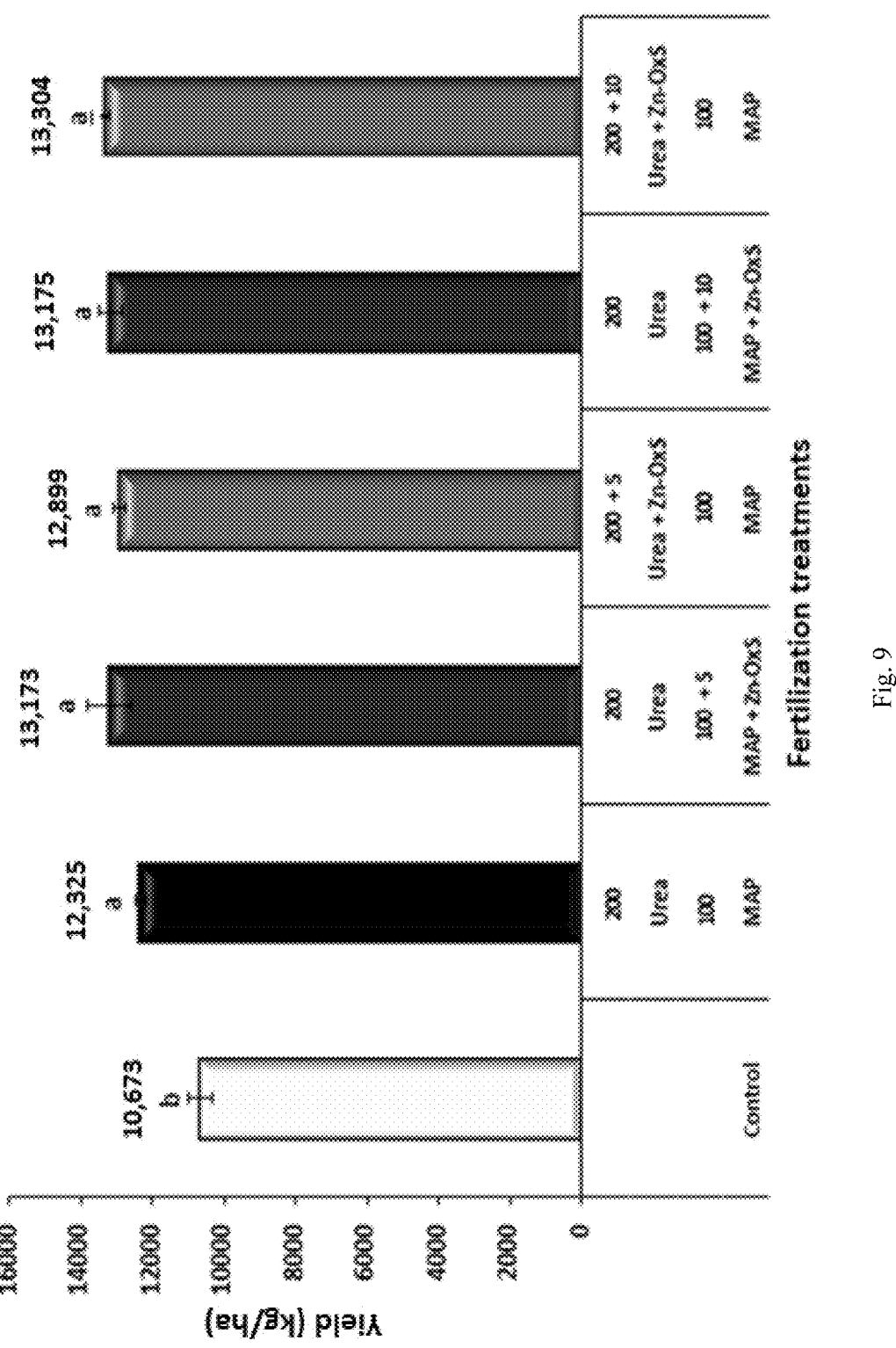
FIG. 9: Corn yield according to impregnation strategies with granular Zn over phosphorus or nitrogen sources. Pergamino, traditionally sowing corn, 2018/19 cycle. Different letters above the columns represent statistically significant differences between treatments (LSD a=0.05; MSD=1086 kg ha$^{-1}$). The error bars indicate the standard deviation of the mean.
Figure 10:
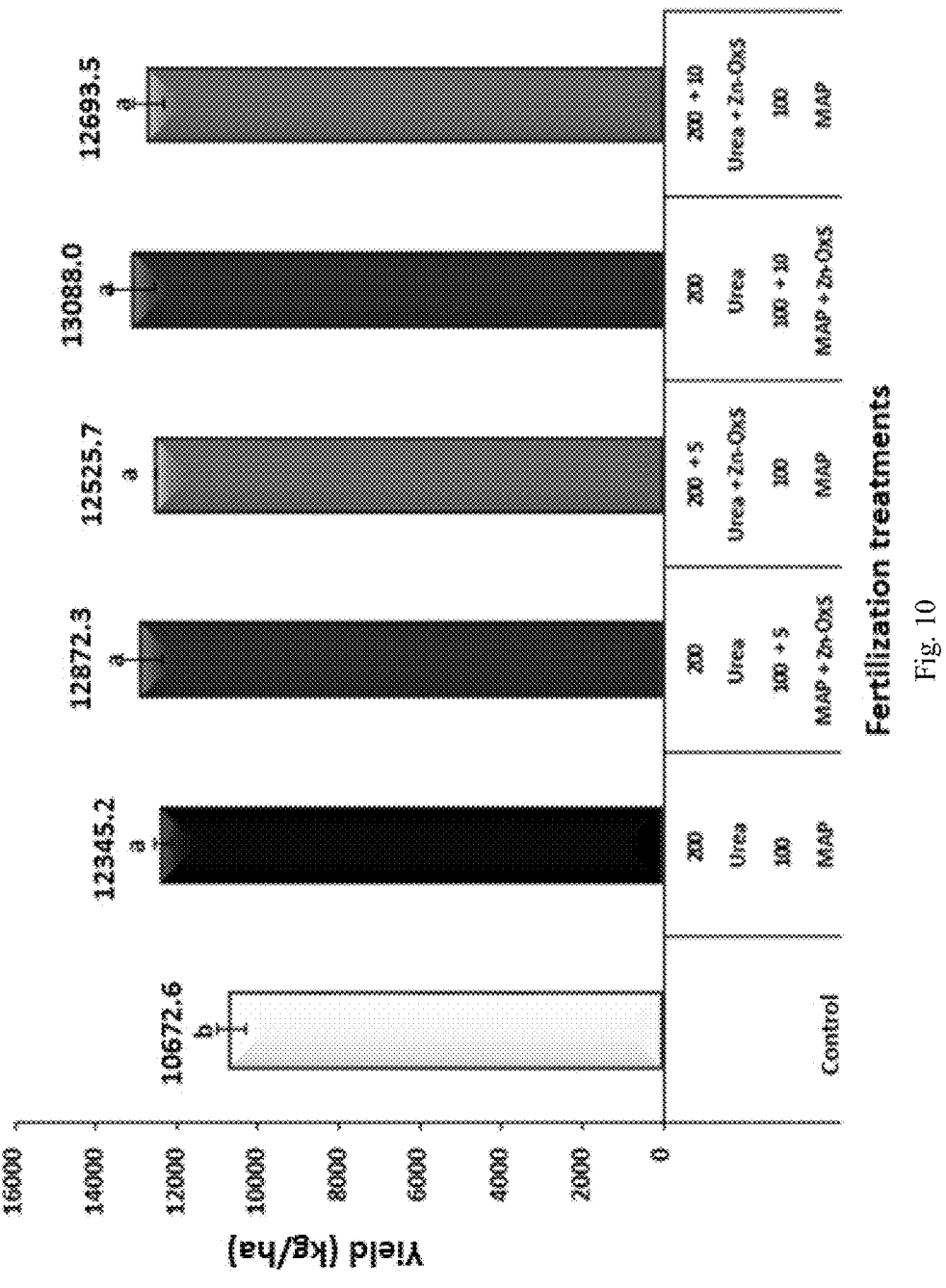
FIG. 10: Corn yield according to Zn powder impregnation strategies over phosphorus or nitrogen sources. Pergamino, traditionally sowing corn, 2018/19 cycle. Different letters above the columns represent statistically significant differences between treatments (LSD a=0.05; MSD=1110 kg ha$^{-1}$). The error bars indicate the standard deviation of the mean.

In Tables 7 and 8, data from observations taken during the crop cycle are presented, while in FIGS. 9 and 10, grain yields grouped by treatment are presented.

TABLE 7

Morphological parameters and yield components: Dry matter in V5, plant height and spikelet insertion, radiation interception at flowering, green intensity determined by Spad and NDVI by Green seeker, vigor, yield and its numerical components: spikes · m$^{-2}$ (NS), grains · spike$^{-1}$ (GS), number of grains · m$^{-2}$ (NG) and weight of grain (WG × 1000). Treatments with granulated Zn on MAP or Urea on traditionally dated corn. INTA Pergamino, 2018/19 season.

| Tr | Description | Dry M V6 (g m$^{-2}$) | Plant height (cm) | Insertion height (cm) | Coverage R1 (%) | Spad V6 | Spad V10 |
|---|---|---|---|---|---|---|---|
| T1 | Control | 2160 | 212 | 85 | 78.1 | 47.1 | 43.2 |
| T2 | Map 100 + Urea 200 | 2690 | 241 | 100 | 93.2 | 46.9 | 45.1 |
| T3 | Map – OxZn 100 + 5 + Urea 200 | 2710 | 249 | 102 | 95.0 | 48.5 | 45.0 |
| T4 | Map 100 + Urea-OxZn 200 + 5 | 2450 | 259 | 101 | 94.8 | 48.3 | 46.9 |
| T5 | Map – OxZn 100 + 10 + Urea 200 | 2610 | 242 | 103 | 95.0 | 48.1 | 44.9 |
| T6 | Map 100 + Urea-OxZn 200 + 10 | 2620 | 244 | 100 | 95.6 | 48.9 | 46.0 |
| R$_2$ vs yield | | 0.68 | 0.75 | 0.90 | 0.94 | 0.60 | 0.56 |

| Tr | Description | Vigor V9 (1-5) | Green seeker V9 | NS | GS | NG | WG × 1000 | Yield (kg ha$^{-1}$) |
|---|---|---|---|---|---|---|---|---|
| T1 | Control | 3.0 | 0.70 | 7.0 | 465.2 | 3267.1 | 326.7 | 10672.6 |
| T2 | Map 100 + Urea 200 | 3.6 | 0.70 | 8.4 | 454.0 | 3819.6 | 322.7 | 12324.6 |
| T3 | Map – OxZn 100 + 5 + Urea 200 | 4.0 | 0.71 | 8.1 | 500.7 | 4053.1 | 325.0 | 13172.6 |
| T4 | Map 100 + Urea-OxZn 200 + 5 | 3.9 | 0.71 | 7.1 | 562.6 | 4018.3 | 321.0 | 12898.8 |
| T5 | Map – OxZn 100 + 10 + Urea 200 | 3.8 | 0.71 | 8.6 | 471.5 | 4041.5 | 326.0 | 13175.5 |
| T6 | Map 100 + Urea-OxZn 200 + 10 | 4.0 | 0.71 | 7.9 | 529.1 | 4157.4 | 320.0 | 13303.6 |
| R$_2$ vs yield | | 0.96 | 0.96 | 0.30 | 0.24 | 0.99 | 0.24 | |
| Stat. Sign (P=) | | | | | | | | <0.004 |
| VQ (%) | | | | | | | | 5.9% |

TABLE 8

Morphological parameters and performance components: Dry matter in V5, plant height and spikelet insertion, radiation interception at flowering, green intensity determined by Spad and NDVI by Green seeker, vigor, yield and its numerical components: spikes · $m^{-2}$ (NS), grains · $spike^{-1}$ (GS), number of grains · $m^{-2}$ (NG) and weight of grain (WG x 1000). Impregnations with Zn powder on MAP or Urea in corn of traditional date. INTA Pergamino, 2018/19 season.

| Tr | Description | Dry M V6 ($g\ m^{-2}$) | Plant height (cm) | Insertion height (cm) | Coverage R1 (%) | Spad V6 | Spad V10 |
|---|---|---|---|---|---|---|---|
| T1 | Control | 2160.0 | 212 | 85 | 78.1 | 47.1 | 43.2 |
| T2 | Map 100 + Urea 200 | 2685.0 | 240 | 99 | 94.9 | 46.2 | 45.0 |
| T3 | Map − OxZn 100 + 2 + Urea 200 | 2800.0 | 242 | 98 | 95.0 | 47.1 | 45.4 |
| T4 | Map 100 + Urea-OxZn 200 + 2 | 2590.0 | 243 | 100 | 94.8 | 47.0 | 45.3 |
| T5 | Map − OxZn 100 + 4 + Urea 200 | 3070.0 | 251 | 102 | 96.0 | 47.5 | 49.6 |
| T6 | Map 100 + Urea-OxZn 200 + 4 | 2620.0 | 240 | 99 | 95.9 | 46.9 | 45.8 |
| $R_2$ vs yield | | 0.84 | 0.96 | 0.92 | 0.93 | 0.01 | 0.56 |

| Tr | Description | Vigor V9 (1-5) | Green seeker V9 | NS | GS | NG | WG x 1000 | Yield (kg $ha^{-1}$) |
|---|---|---|---|---|---|---|---|---|
| T1 | Control | 3.0 | 0.65 | 7.0 | 465.2 | 3267.1 | 326.7 | 10672.6 |
| T2 | Map 100 + Urea 200 | 3.5 | 0.70 | 7.9 | 484.9 | 3810.3 | 324.0 | 12345.2 |
| T3 | Map − OxZn 100 + 2 + Urea 200 | 3.8 | 0.71 | 7.4 | 536.6 | 3960.7 | 325.0 | 12872.3 |
| T4 | Map 100 + Urea-OxZn 200 + 2 | 3.7 | 0.70 | 7.8 | 492.5 | 3830.5 | 327.0 | 12525.7 |
| T5 | Map − OxZn 100 + 4 + Urea 200 | 4.0 | 0.72 | 8.6 | 471.3 | 4039.5 | 324.0 | 13088.0 |
| T6 | Map 100 + Urea-OxZn 200 + 4 | 3.7 | 0.71 | 8.0 | 492.7 | 3929.9 | 323.0 | 12693.5 |
| $R_2$ vs yield | | 0.95 | 0.99 | 0.55 | 0.24 | 1.00 | 0.31 | |
| Stat. Sign (P=) | | | | | | | | <0.0009 |
| VQ (%) | | | | | | | | 5.7% |

Figure 11:
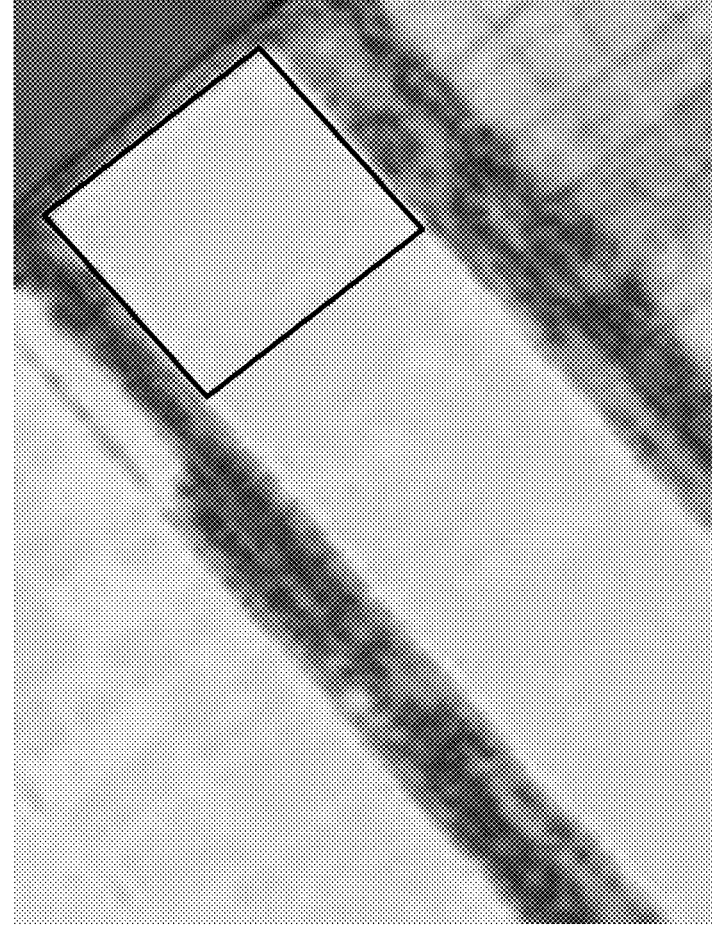
FIG. 11: Calculation of the NDRE (Normalized Difference Red Edge) on January 16th, post-flowering (2018/2019 corn season). The rectangle shows the experimental plot.

In FIG. 11 the NDRE (Normalized Difference Red Edge) index is shown, which shows subtle differences since it is an index associated with N, rather than P. NDVI is sensitive to biomass, but at the date of measurement in this experiment (January 16) it was already saturated. The control treatment is identified, which shows a rapid deterioration of chlorophyll and senescence of the leaf area.

Discussion and Conclusions

The 2018/19 cropping season was characterized by the development of appropriate environmental conditions for growing corn, with abundant rainfall centered around the critical period and during grain filling. The site shows a strong limitation of P, determining statistical responses to its application.

Granular Sources of Zn on MAP or Urea

Yields averaged 12591 kg $ha^{-1}$. Significant differences were found between treatments (P=0.0009; VQ=5.7%). The Zn treatments showed significant response, with slight advantages in the MAP treatment compared to Urea at the lowest dose of Zinc (5 kg), compensated when the highest dose (10 kg) was applied. I.e., while no dose response was verified in the treatment with MAP, it was detected when the base source was Urea (Table 7 and FIG. 9).

The crop variables that showed the highest correlation with yield were NG ($r^2$=0.99), plant vigor rating ($r^2$=0.96), NDVI determined by Green seeker ($r^2$=0.96), radiation interception at flowering ($r^2$=0.94), spike insertion height ($r^2$=0.90), plant height ($r^2$=0.75) and initial biomass ($r^2$=0.68).

Impregnations with Zn Powder on MAP or Urea

Yields averaged 12366 kg $ha^{-1}$. Significant differences were found between treatments (P=0.004; VQ=5.9%). As with the granular sources (FIG. 9), the response to Zn was considerable (Table 8 and FIG. 10). However, yields and response were slightly lower than that observed with granulates. A better performance was verified in MAP impregnation, probably due to the online location of this source, which acts as a "carrier", compared to urea applied in total coverage (Table 8). Similarly, the dose response was very modest (Table 8).

The crop variables that showed the highest correlation with yield were NG ($r^2$=0.99), NDVI determined by Green seeker ($r^2$=0.99), plant vigor rating ($r^2$=0.95), plant height ($r^2$=0.96), radiation interception at flowering ($r^2$=0.93), spike insertion height ($r^2$=0.92) and initial biomass ($r^2$=0.84).

Using spectral indexes on aerial photography, it was determined that the NDRE index showed a higher correlation with yield than NDVI or OSAVI. The NDRE reflects variations in chlorophyll content. Zn treatments would have favored N uptake.

The results obtained suggest a positive effect of Zn fertilization in a soil limited in this element. In addition, in general, the granulated formulation tended to perform better. Likewise, the joint treatments with MAP showed slight superiority compared to Urea, and little response to Zn doses. The exception was the Blend of Urea+granulated Zn, which did show a dose response (FIG. 9). As it would have been the case in a previous experiment with wheat, increasing the Zn dose together with MAP applied in line could maximize efficiency, but higher risks of phytotoxicity are assumed. However, the greater spacing of the seedlings would determine a more linear behavior in urea, with a smaller initial increase but a greater response to dose.

Even assuming this slight advantage for MAP and Urea, both sources were suitable for impregnation from an agronomic point of view, and did not present operational difficulties for their implementation.

Example 3—Zinc Impregnated in Phosphorus Macronutrients for Soybeans; 2017-2018 Season

Materials and Methods

During the 2017/18 season, a field experiment was conducted aimed to evaluate the impact of different fertilization strategies on soybean crop productivity. The treatments were applied top quality soybean. The experiment was planted at the EEA INTA Pergamino, on a Pergamino Series soil, typical Argiudol, mixed family, loam, thermal, Class I-2, IP=85. Planting was carried out on November 15th, with the DM 40R16 STS variety, in rows spaced 0.40 m apart. The experimental site registers a continuous agricultural rotation with a high level of intensification and crop rotation. The predecessor was corn. During the cycle, insecticides and fungicides were applied to prevent attacks by bollworms, bugs and diseases. The plots were kept completely free of weeds and pests.

The test design was a randomized complete block design with four replications and six treatments. Details of the treatments evaluated are described in Table 9. The soil analysis of the sites is presented in Table 10.

TABLE 9

Zinc (Zn) fertilization treatments applied in the experiment. 2017/18 season.

|  | Alternative application | Dose | Application state |
|---|---|---|---|
| T1 | Absolute control |  |  |
| T2 | MAP | 46 kg ha$^{-1}$ | sowing |
| T3 | MAP (treated with 20% granulated zinc oxysulfate) | 46 + 2.3 kg ha$^{-1}$ | sowing |
| T4 | MAP (treated with 20% granulated zinc oxysulfate) | 46 + 4.6 kg ha$^{-1}$ | sowing |
| T5 | MAP (treated with 50% zinc oxysulfate powder) | 46 + 0.9 kg ha$^{-1}$ | sowing |
| T6 | MAP (treated with 50% zinc oxysulfate powder) | 46 + 1.8 kg ha$^{-1}$ | sowing |

TABLE 10

Soil analysis at planting, average of four replications. INTA EEA Pergamino

| Depth | pH water 1:2.5 | | MO % | Total N | Available phosphorus mg kg$^{-1}$ | N-Nitrates (0-60 cm) kg ha$^{1}$ | S-Sulphates (0-20 cm) ppm | UW in soil (0-150 cm) mm |
|---|---|---|---|---|---|---|---|---|
| 0-20 cm | 5.7 | | 3.02 | 0.151 | 14.2 | 67.9 | 5.8 | 160 |
|  | Magnesium ppm | Potassium ppm | Calcium ppm | Zn ppm | Manganese ppm | Copper ppm | Iron ppm | Boron ppm |
| 0-20 cm | 278 | 551 | 1533 | 0.98 | 81.5 | 2.32 | 79.1 | 0.73 |

Emerged plants were counted for 15 days. In R4, NDVI was determined by means of the Green seeker sensor and the radiation interception. Likewise, the N content was also estimated using a Minolta Spad 502 chlorophyll meter, and vigor was rated according to the general condition of the plot, its uniformity and health. An evaluation of nodulation was carried out, considering number, weight, size and location of nodules. Harvesting was carried out with an experimental self-propelled harvester. Yield components, number of nodes, pods, NG and WG were determined on a harvest sample. The results were analyzed by partition of variance, mean comparisons and regression analysis.

Environmental Conditions During the Season

Figure 12:
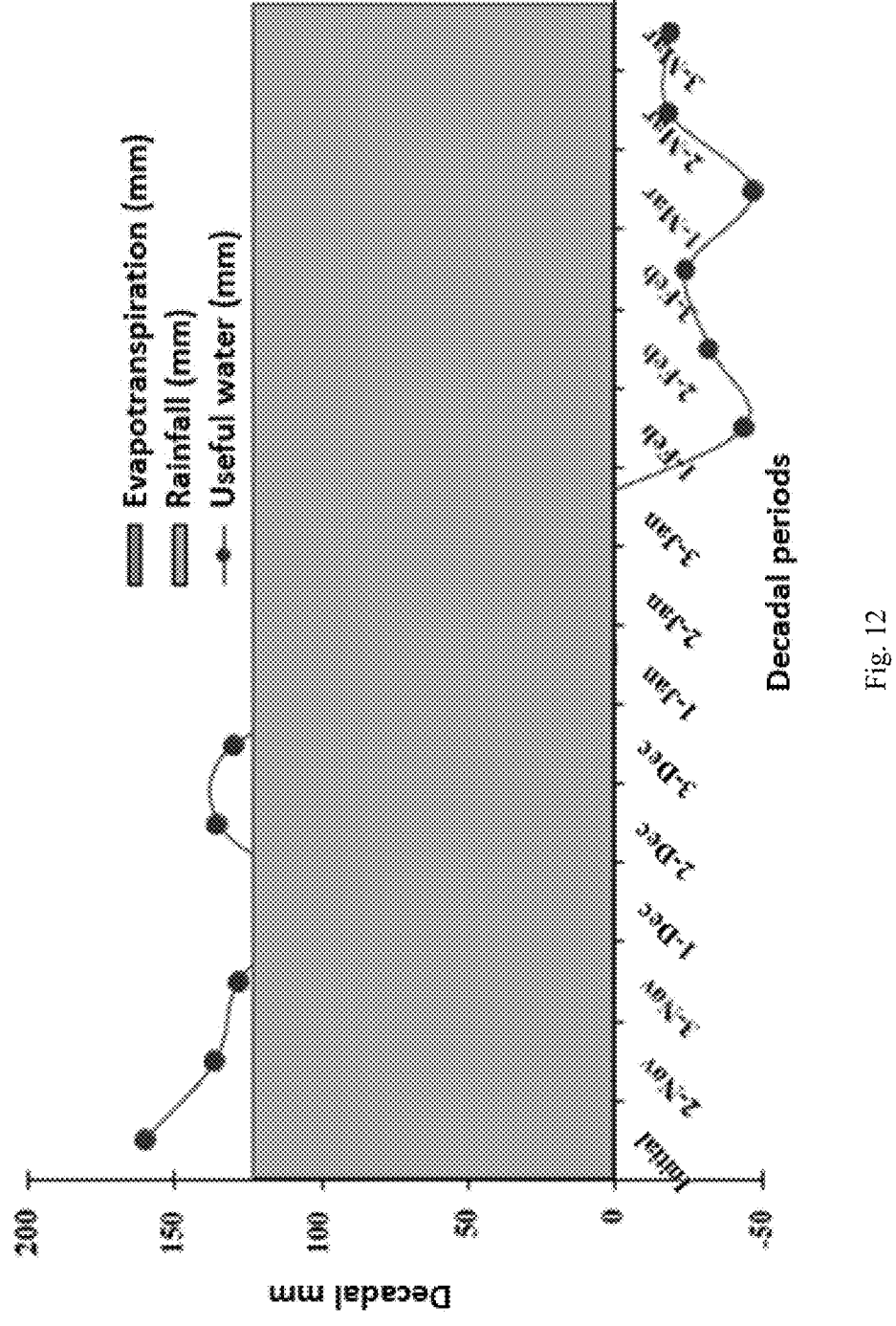
FIG. 12. Precipitation, evapotranspiration and decadel water balance considering 1.5 m depth. INTA EEA Pergamino, soybean season 2017/18. Total precipitation in the cycle: 258.7 mm. Initial UW (150 cm): 160 mm. Accumulated deficit: 184 mm. The rectangle indicates the level where UW (useful water) decreases below 50%, where crop consumption may not be optimal.

In FIG. 12, the rainfall determined at the experimental site and the crop evapotranspiration are shown, as well as the decadel water balance, measured through the evolution of the useful water content in the soil. The 2017/18 season was notable for its complexity. Rainfall gradually decreased after sowing, entering a progressive drought from mid-January onwards, which became more accentuated during grain filling (FIG. 12). However, no excessive heat shocks were recorded, with the exception of the first week of February. The presence of pests was moderate, with only the populations of thrips, spider mites, and bugs reaching the critical threshold of treatments. The temperature condition and low pest severity contributed to the effect of the lack of rainfall. The initial reserve and the good physical conditions of the lot mitigated the process and allowed good yields to be achieved.

Results

In Table 11 presents parameters that characterize crop nodulation, while in Table 12 presents the yield, its components and other variables determined during the crop cycle.

TABLE 11

Quantitative and qualitative evaluation of nodulation. Fertilization
treatments evaluating Zinc impregnation over phosphorus sources
in soybean. INTA Pergamino, 2017/18 season.

| T | Treatments | Number of nodules (1) | Nodule size (2) | Location (3) | Functionality (4) |
|---|---|---|---|---|---|
| T1 | Control | 3 | 3 | 2 | 3 |
| T2 | Map 46 | 3 | 3 | 4 | 3 |
| T3 | Map – OxZnG 46 + 2.3 | 3 | 3 | 2 | 3 |
| T4 | Map – OxZnG 46 + 4.6 | 3 | 4 | 4 | 3 |
| T5 | Map – OxZnP 46 + 0.9 | 3 | 3 | 4 | 3 |
| T6 | Map – OxZnP 46 + 1.8 | 2 | 4 | 4 | 3 |
| R2 vs yield | | 0.09 | 0.53 | 0.16 | #iDIV/0! |

Number of nodules: 1: none, 2: low, 3: medium, 4: high, 5: very high.

Size: 1: very small, 2: small, 3: medium size, 4: large size, 5: very large size.

Location: 1: totally in secondary roots, 2: mostly in secondary roots, 3: equal distribution main root: secondary root, 4: mostly in primary root, 5: nodules totally located in main root.

Functionality: 1: completely green or brown shade, 2: mostly green or brown shade, 3: diverse shade, 4: mostly reddish shade, 5: reddish shade in the totality of the nodules.

TABLE 12

Density, NDVI measured by Green seeker, number of nodes and pods,
radiation interception, vigor, plant height (cm), N content estimated
by Spad, grain yield, components and response over the control.
Fertilization treatments evaluating Zinc impregnation over phosphorus
sources in soybean. Pergamino, 2017/18 season.

| Treat. | Number of plants | Green seeker R4 | Nodes/ plant | Pods/ plant | Interception R4 (%) | Vigor |
|---|---|---|---|---|---|---|
| Control | 24.8 | 0.83 | 12.0 | 36.0 | 94.8 | 3.5 |
| Map 46 | 25.0 | 0.83 | 13.0 | 38.5 | 97.6 | 3.5 |
| Map – OxZnG 46 + 2.3 | 26.0 | 0.80 | 15.0 | 45.0 | 94.5 | 3.7 |
| Map – OxZnG 46 + 4.6 | 25.9 | 0.83 | 14.5 | 41.0 | 93.5 | 3.5 |
| Map – OxZnP 46 + 0.9 | 27.8 | 0.82 | 14.5 | 45.0 | 98.1 | 3.8 |
| Map – OxZnP 46 + 1.8 | 21.1 | 0.84 | 14.0 | 44.0 | 93.0 | 3.7 |
| R2 vs yield | 0.01 | 0.01 | 0.68 | 0.40 | 0.26 | 0.04 |

| Treat. | Plants height | Spad | Yield (kg ha$^{-1}$) | NG | WG | Diff vs T1 (kg ha$^{-1}$) |
|---|---|---|---|---|---|---|
| Control | 93.0 | 44.4 | 3834.8 | 2681.6 | 143.0 | |
| Map 46 | 93.0 | 46.0 | 3998.8 | 2720.2 | 147.0 | 164.0 |
| Map – OxZnG 46 + 2.3 | 95.0 | 43.9 | 4189.1 | 2877.1 | 145.6 | 354.3 |
| Map – OxZnG 46 + 4.6 | 93.0 | 46.1 | 4324.9 | 3024.4 | 143.0 | 490.1 |
| Map – OxZnP 46 + 0.9 | 95.0 | 45.7 | 4053.0 | 2814.6 | 144.0 | 218.2 |
| Map – OxZnP 46 + 1.8 | 94.0 | 45.0 | 4207.0 | 2786.1 | 151.0 | 372.2 |
| R2 vs yield | 0.05 | 0.05 | | 0.78 | 0.05 | |
| P= | | | 0.17 | | | |
| R2 vs yield | | | 6.3 | | | |

R4 (maximum pod size) according to the scale of Fehr and Caviness, 1974.

Vigor Index: According to scale 1: minimum-5: maximum. It evaluates health, plant size and plot uniformity.

Interception: evaluated as % of the maximum incident radiation.

Discussion and Conclusions

The 2017/18 season was low in rainfall (FIG. 12), the crop lost biomass and height, although yield components managed to be sustained (Table 12). The initial reserve and the good physical and rotational conditions of the site contributed to moderate the degree of stress. Yields averaged 4101.3 kg ha$^{-1}$ (FIG. 13), being acceptable for the environmental conditions of the year but slightly below the yield achievable in this particular environment.

Nodulation presented a good quality. Fertilized treatments clearly differed from the Control, especially in size and location (Table 11). The size of the nodules with the highest correlation with yields (Table 11).

Figure 13:
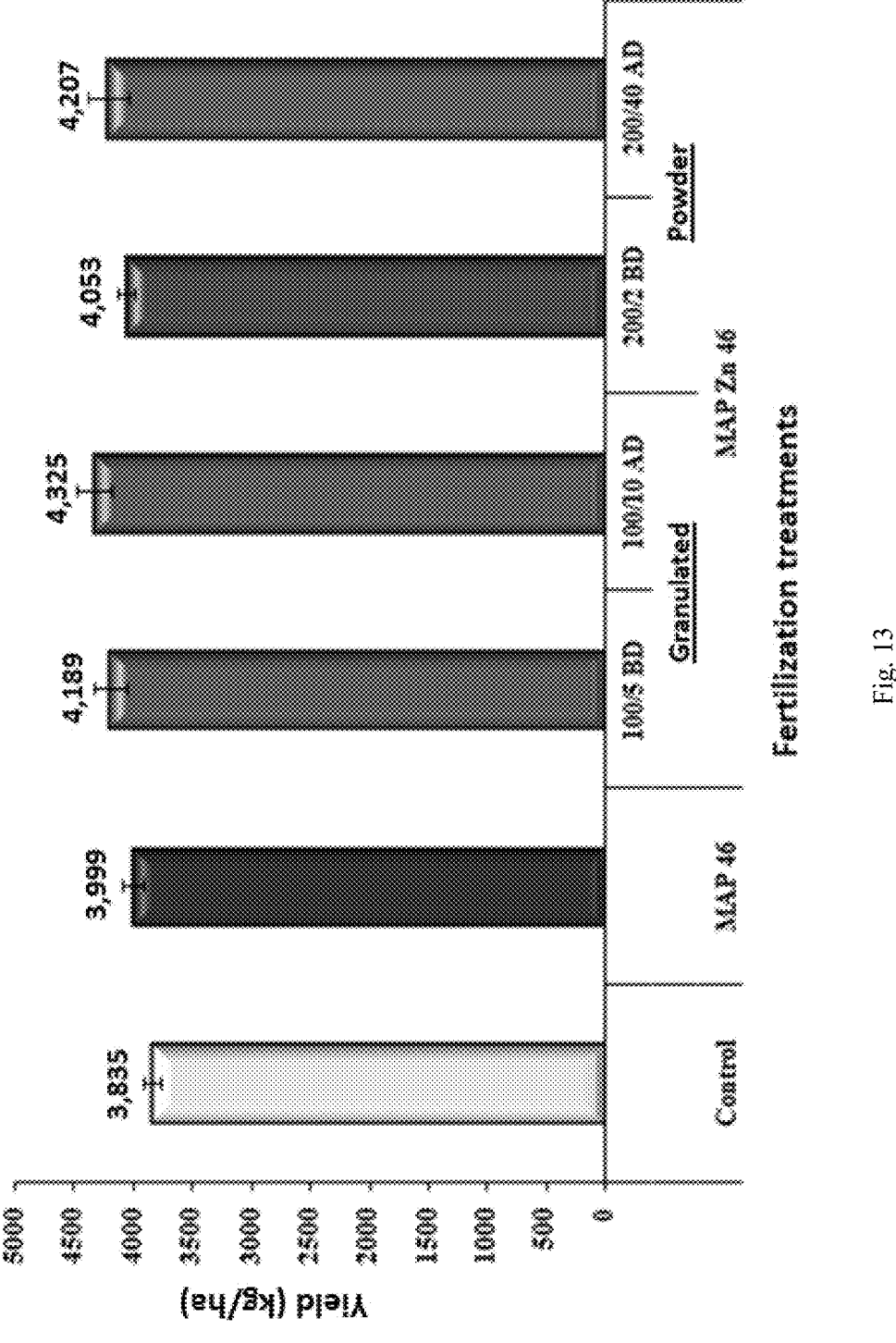
FIG. 13: Grain yield according to fertilization treatments evaluating Zinc impregnation over phosphorus sources in soybean. The error bars indicate the standard deviation of the mean. INTA EEA Pergamino, season 2017/18.

Differences in yields were at the limit of statistical significance (P=0.17; VQ=6.3%). However, the absolute differences reached a considerable magnitude, determined up to 490.1 kg ha$^{-1}$ over the Control (FIG. 13). The granulated formulation of Zn tended to perform slightly better than its powdered counterpart. For both formulations, a moderate dose effect was verified, increasing the response when moving to the higher dose in the order of 135.9 kg ha$^{-1}$ and 154.0 kg ha$^{-1}$ for the granular and powder formulation, respectively.

Evaluated through the coefficient of determination ($r^2$), the variables that most explained yields were NG ($r^2$=0.78), No. nodes·plant$^{-1}$ ($r^2$=0.68), nodule size ($r^2$=0.53) and No. pods·plant$^{-1}$ ($r^2$=0.40) (Table 12).

The results of the present experiment allow us to conclude on the positive effects of fertilization on soybean. The Zn-impregnated formulations performed well.

Example 4—Zinc Impregnated in Phosphorus Macronutrients for Soybeans; 2018-2019 Season Materials and Methods During the 2018/19 season, an experiment was conducted on top quality soybeans to evaluate the impact of different P and micronutrient fertilization technologies on soybean crop productivity. The experiment was planted at the EEA INTA Pergamino, on a Pergamino Series soil, typical Argiudol, mixed family, loam, thermal, Class I-2, IP=85. Planting was carried out on November 21st, with the DM 46R18 STS variety, in rows spaced 0.40 m apart. The experimental site registers a continuous agricultural rotation with a high level of intensification and crop rotation. The predecessor was corn. During the cycle, insecticides and fungicides were applied to prevent attacks by bollworms, bugs and diseases. The plots were kept completely free of weeds and pests. A base inoculation was performed to ensure nitrogen (N) supply.

The treatments were applied top quality soybean. Details of these experiments are presented in Table 13.

The test design was a randomized complete block design with four replications and four treatments. Details of the treatments evaluated are described in Table 13. In addition, the soil analysis of the sites is presented in Table 14.

TABLE 13

Fertilization treatments with phosphorus and zinc sources in soybean. Pergamino, 2018/19 season.

| | Alternative application | Dose | Application state |
|---|---|---|---|
| T1 | Absolute control | | |
| T2 | SPS | 80 kg ha$^{-1}$ | sowing |
| T3 | SPS (treated with 20% granulated zinc oxysulfate) | 80 + 40 kg ha$^{-1}$ | sowing |
| T4 | SPS (treated with 20% granulated zinc oxysulfate) | 80 + 8 kg ha$^{-1}$ | sowing |
| T5 | SPS (treated with 50% zinc oxysulfate powder) | 80 + 1.6 kg ha$^{-1}$ | sowing |
| T6 | SPS (treated with 50% zinc oxysulfate powder) | 80 + 3.2 kg ha$^{-1}$ | sowing |

TABLE 14

Soil analysis at planting, average of four replications. Fertilization with phosphorus and zinc in soybean.

| Depth 0-20 cm | pH water 1:2.5 | MO | Total N % | Available phosphorus mg kg$^{-1}$ | N-Nitrates (0-60 cm) kg ha$^{-1}$ | S-Sulphates (0-20 cm) mg kg$^{-1}$ | Zn DTPA (0-20 cm) mg kg$^{-1}$ |
|---|---|---|---|---|---|---|---|
| Pergamino 1 | 5.5 | 2.25 | 0.112 | 9.9 | 13.5 | 7.5 | 1.19 |

The biomass accumulated in R3 (kg ha$^{-1}$) was quantified. In R4, the NDVI was determined by means of the Green seeker sensor, and the coverage was determined by processing with specific digital image software. Likewise, the N content was also estimated using a Minolta Spad 502 chlorophyll meter, and vigor was rated according to the general condition of the plot, its uniformity and health. Harvesting was carried out with an experimental self-propelled harvester. Yield components, number of nodes, pods, NG and WG were determined on a harvest sample. On four occasions a flight was performed with an Ebee Parrot aircraft equipped with a Sequoia_4.0_1280×960 (Green), Sequoia_4.0_1280×960 (Red), Sequoia_4.0_1280×960 (Red Edge), Sequoia_4.0_1280×960 (NIR) high resolution camera. The photographs obtained, with a pixel size of 14×14 cm, were processed and the OSAVI and NDRE indexes were calculated.

OSAVI (Optimized Soil Adjusted Vegetation Index) is a vegetation index corrected for soil reflectance. It provides additional information and represents an improvement over NDVI by showing greater sensitivity to cover variations in sparsely vegetated areas where the ground is visible through the canopy. It is also advisable to use it at the end of the cycle where vegetation cover is maximum, since it saturates at higher levels of leaf area with respect to NDVI.

NDRE (Normalized Difference Red Edge) is an index highly sensitive to the chlorophyll content of vegetation. The variation of this index allows inferring nutrient deficiencies that cause chlorosis in the tissues, such as nitrogen, sulfur and some microelements.

The results were analyzed by partition of variance, mean comparisons and regression analysis.

Environmental Conditions During the Season

Figure 14:
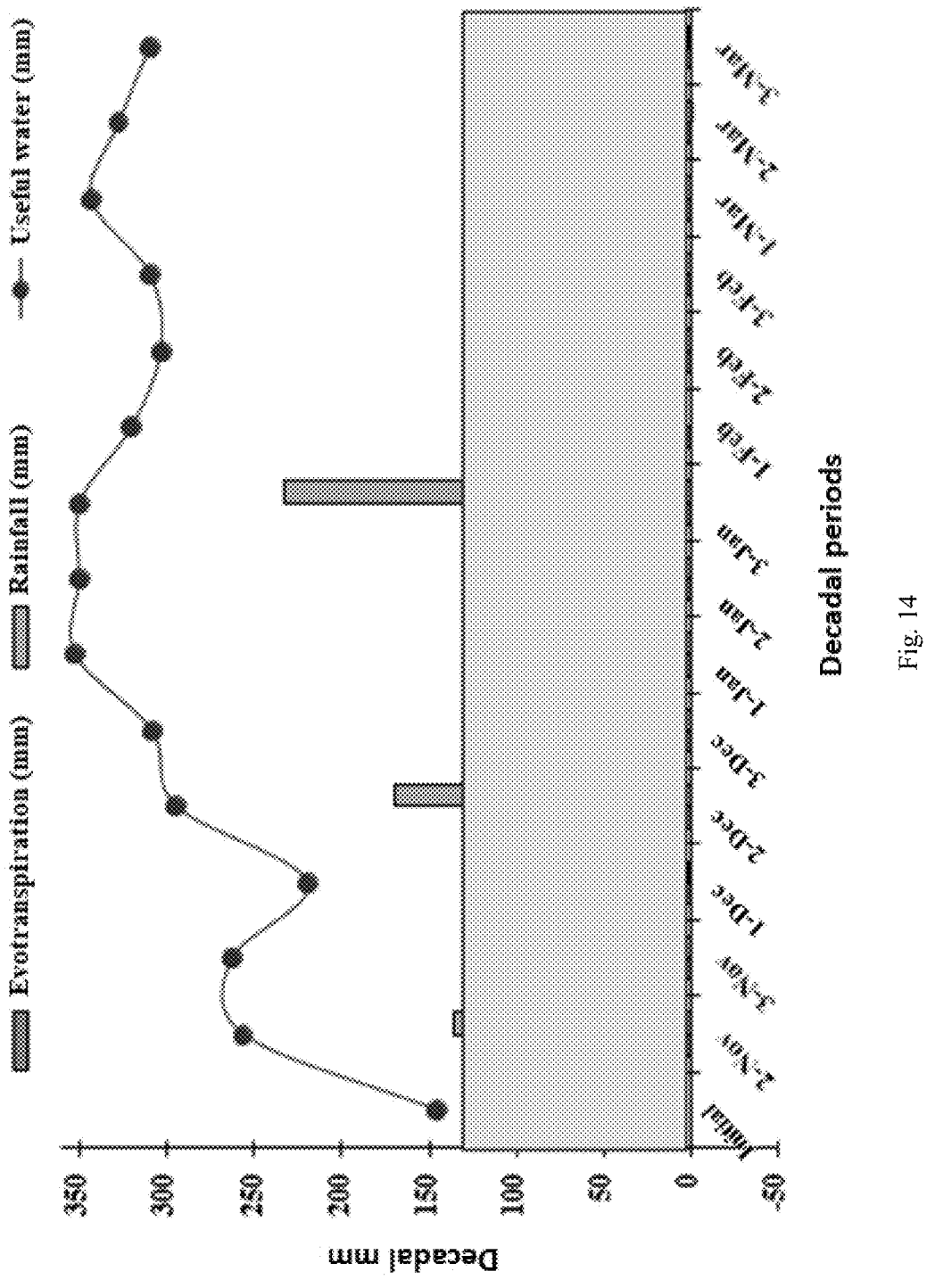
FIG. 14. Precipitation, evapotranspiration and decadel water balance considering 1.5 m depth. INTA EEA Pergamino, soybean season 2018/19. Total rainfall in the cycle: 987 mm. Initial UW (150 cm): 145 mm. Accumulated deficit: 0 mm. The rectangle indicates the level where UW decreases below 50%, where crop consumption may not be optimal.
Figure 15:
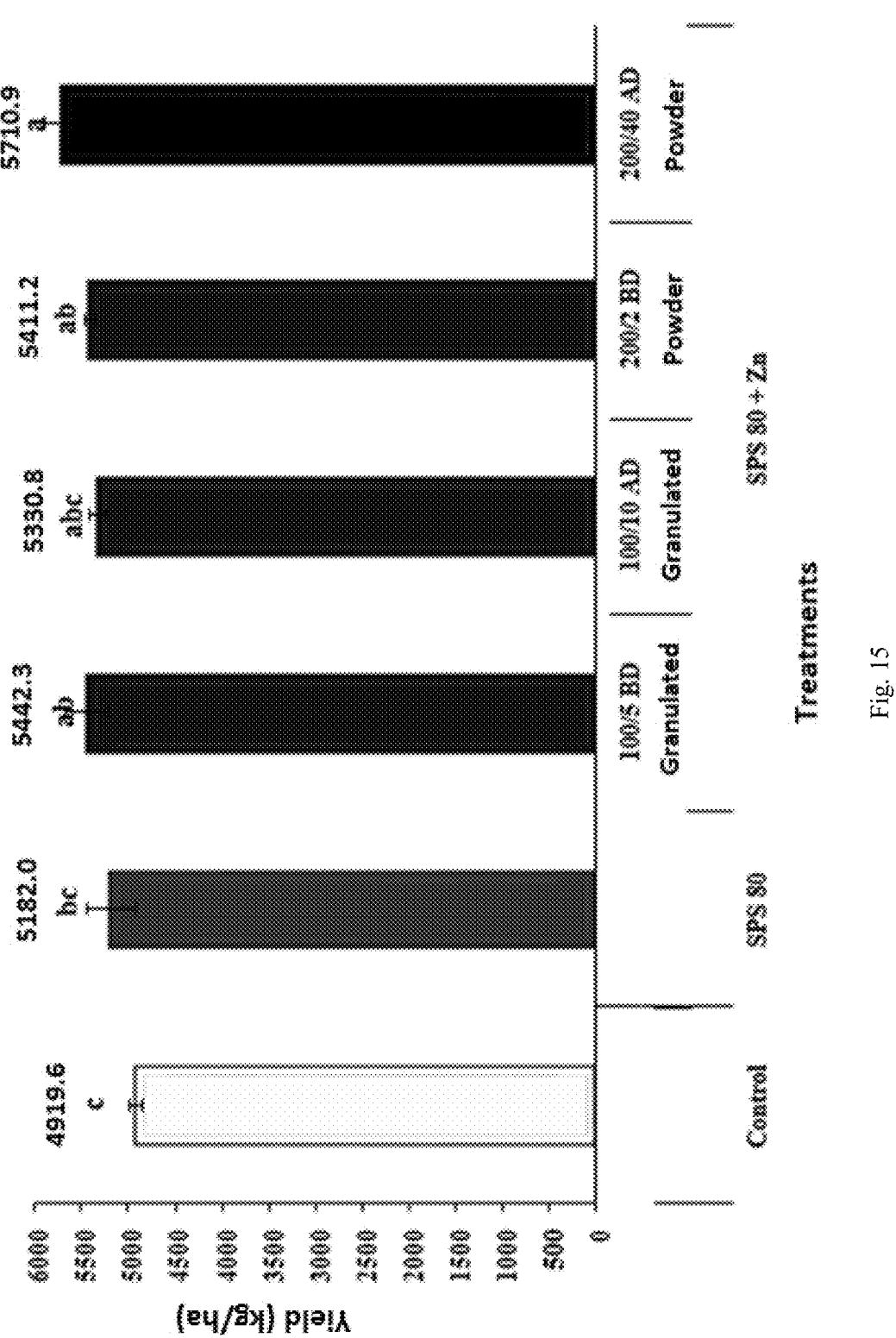
FIG. 15: Grain yield according to fertilization treatments with phosphorus and zinc sources in soybean. Different letters above the columns represent statistically significant differences between treatments (LSD a=0.10; MSD=426 kg ha$^{-1}$). The error bars indicate the standard deviation of the mean. INTA EEA Pergamino, season 2018/19.

In FIG. 14, the rainfall determined at the experimental site and the crop evapotranspiration are shown, as well as the decadel water balance, measured through the evolution of the useful water content in the soil. The 2018/19 season presented a friendly climate for the crop, with copious rains during December-January, and a pause period characterized by high temperatures and lack of rains in the first two decades of February. None of this seemed to limit yields (FIG. 15). Conditions at the end of filling were very favorable, with sustained temperatures and high radiation. The presence of pests was moderate, with only the *Anticarsia gemmatalis* and bug populations reaching the critical treatment threshold. The temperature condition and low pest severity contributed to mitigate the effect of the lack of rainfall.

Results

In Table 15 an evaluation of nodulation is presented, while in Table 16 the yield, its components and other variables determined during the crop cycle, for the different locations.

TABLE 15

Quantitative and qualitative evaluation of nodulation. Sources and doses for soybean fertilization. INTA Pergamino, 2018/19 season.

| T | Treatments | Number of nodules (1) | Nodule size (2) | Location (3) | Functionality (4) |
|---|---|---|---|---|---|
| | Early Pergamino | | | | |
| T1 | Control | 3 | 4 | 4 | 3 |
| T2 | SPS 80 | 4 | 3 | 3 | 3 |
| T3 | SPS – OxZnG 80 + 4 | 4 | 3 | 3 | 3 |

TABLE 15-continued

Quantitative and qualitative evaluation of nodulation. Sources and doses for soybean fertilization. INTA Pergamino, 2018/19 season.

| T | Treatments | Number of nodules (1) | Nodule size (2) | Loca- tion (3) | Function- ality (4) |
|---|---|---|---|---|---|
| T4 | SPS – OxZnG 80 + 8 | 3 | 4 | 4 | 3 |
| T5 | Map – OxZnP 80 + 1.6 | 5 | 4 | 5 | 4 |
| T6 | Map – OxZnP 80 + 3.2 | 4 | 4 | 4 | 3 |
| | R2 vs yield | 0.24 | 0.14 | 0.01 | 0.02 |

Number of nodules: 1: none, 2: low, 3: medium, 4: high, 5: very high.
Size: 1: very small, 2: small, 3: medium size, 4: large size, 5: very large size.
Location: 1: totally in secondary roots, 2: mostly in secondary roots, 3: equal distribution main root:secondary root, 4: mostly in primary root, 5: nodules totally located in main root.
Functionality: 1: completely green or brown shade, 2: mostly green or brown shade, 3: diverse shade, 4: mostly reddish shade, 5: reddish shade in the totality of the nodules.

TABLE 16

Biomass at the beginning of the critical period, plant height (cm), cover and interception, green seeker, number of nodes and pods, radiation interception, vigor, grain yield, components and response to the control. 2018/19 season.

| Treat. | Dry mass R3 (kg ha$^{-1}$) | Green seeker R4 | Nodes/ plant | Pods/ plant | Interception R4 (%) | Vigor |
|---|---|---|---|---|---|---|
| Control | 3115 | 0.72 | 16.0 | 40.5 | 93.4 | 3.0 |
| SPS 80 | 3715 | 0.75 | 16.5 | 51.0 | 95.2 | 3.5 |
| SPS – OxZnG 80 + 4 | 3435 | 0.76 | 16.0 | 45.0 | 95.3 | 3.4 |
| SPS – OxZnG 80 + 8 | 3585 | 0.76 | 17.0 | 45.0 | 95.1 | 3.7 |
| Map – OxZnP 80 + 1.6 | 3830 | 0.77 | 16.5 | 45.5 | 93.2 | 3.8 |
| Map – OxZnP 80 + 3.2 | 4160 | 0.75 | 16.0 | 47.0 | 96.9 | 4.0 |
| R2 vs yield | 0.69 | 0.43 | 0.00 | 0.15 | 0.46 | 0.76 |

| Treat. | Plants height | Spad | Yield (kg ha$^{-1}$) | NG | WG | Diff vs T1 (kg ha$^{-1}$) |
|---|---|---|---|---|---|---|
| Control | 92 | 48.2 | 4919.6 | 2928.3 | 168.0 | |
| SPS 80 | 95 | 47.5 | 5182.0 | 3030.4 | 171.0 | 262.4 |
| SPS – OxZnG 80 + 4 | 96 | 47.4 | 5442.3 | 3154.9 | 172.5 | 522.7 |
| SPS – OxZnG 80 + 8 | 94 | 48.5 | 5330.8 | 3154.3 | 169.0 | 411.2 |
| Map – OxZnP 80 + 1.6 | 96 | 48.3 | 5411.2 | 3183.0 | 170.0 | 491.6 |
| Map – OxZnP 80 + 3.2 | 100 | 48.9 | 5710.9 | 3330.0 | 171.5 | 791.3 |
| R2 vs yield | 0.88 | 0.14 | | 0.97 | 0.47 | |
| P= | | | 0.08 | | | |
| VQ= | | | 6.4 | | | |

R4 (maximum pod size) according to the scale of Fehr and Caviness, 1974.
Vigor Index: According to scale 1: minimum-5: maximum. It evaluates health, plant size and plot uniformity.
Interception: evaluated as % of the maximum incident radiation.

Figure 16:
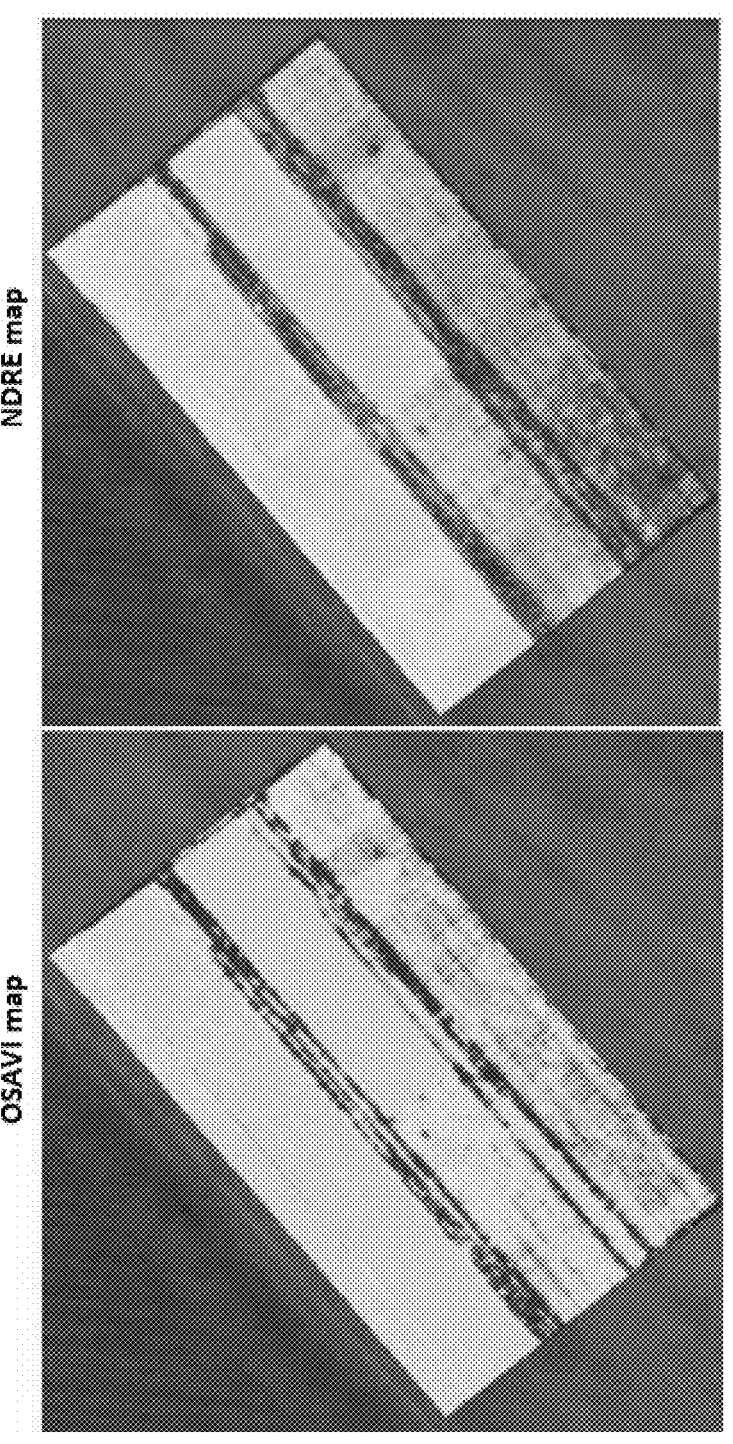
FIG. 16: Calculation of the OSAVI (left) and NDRE (right) indexes in R3-R4, full critical period. Soybean, 2018/19 season.

FIG. 16 shows the OSAVI (related to biomass without influence of soil reflectance in lightly covered crops) and NDRE (red border, associated with chlorophyll) indexes Both showed good sensitivity to the treatments. Zn is associated with growth, and for this reason OSAVI was representative of the differences obtained.

Discussion and Conclusions

The 2018/19 season was favorable for the crop, with abundant rainfall, although concentrated in December-January, and significantly better than the previous season. The initial reserve, abundant rainfall together with favorable temperatures and good physical conditions of the lot helped to achieve very good yields. Productivity reached an average of 5332.8 kg ha$^{-1}$ (Table 16), which is close to the potential achievable by the crop in the region.

Significant differences were found between treatments (P=0.08; VQ=6.4%). A consistent response to Zn supply was determined, which reached its peak with powder impregnation at the maximum dose (FIG. 15). This treatment (T6) statistically outperformed T2 (SPS80) and T1 (control without fertilization). However, all Zn treatments would represent the same level (FIG. 15).

None of the treatments evaluated showed phytotoxicity on seeds or damage to emergence. Zn impregnation did not change this behavior. The addition of P, and P+Zn increased initial biomass (r$^2$ vs yield=0.69), NDVI by Green seeker (r$^2$=0.43), interception (r$^2$=0.46), subjective vigor rating (r$^2$=0.76), plant height (r$^2$=0.88), NG (r$^2$=0.97) and WG (r$^2$=0.47). That is, the behavior of the fertilized treatments and their agronomic response could be anticipated by numerous variables.

The results of the present experiment allow us to conclude on the positive effects of novel technologies for P and Zn addition. According to the obtained results, impregnation with Zn powder, at its highest dose, was the most successful strategy in the present experience.

Example 5—Zinc Impregnated in Phosphorus and Nitrogen Macronutrients for Wheat; Season 2018-2019

Materials and Methods

During the year 2018, two field experiments were conducted at EEA INTA Pergamino, on a soil Serie Pergamino, Class I-2, typical Argiudol, fine family, illitic, thermal (USDA-Soil Taxonomy V. 2006). On June 20th, the SY 120 variety, an intermediate cycle cultivar with no vernalization requirements, was planted. According to the sanitary profile of the crop, this variety shows tolerance to all rust species except stem rust, as well as to leaf spots—Dreschlera and Septoria—. It also shows good behavior to ear blight.

In the experiment, a randomized complete block design with 4 replications was used. Despite the good health of the cultivar, fungicides and insecticides were applied at Zadoks 32 and Z41 phenological stages. The treatments evaluated are described in Table 17. In addition, the soil analysis of the site is presented in Table 18.

Impregnation treatments with Zn oxysulfate, in its granulated and powdered physical forms, were evaluated at two doses of Zn for each of them, respectively. In Experiment 1, impregnations were evaluated on MAP (0-23-0) (Table 17.a), and in experiment 2 on Urea (46-0-0), in both cases incorporated (Table 17.b).

TABLE 17.a

Zn fertilization treatments applied on MAP. 2018 season.

| | Alternative application | Dose | Application state |
|---|---|---|---|
| T1 | Absolute control | | |
| T2 | MAP | 100 kg ha$^{-1}$ | Sowing |
| | Urea | 200 kg ha$^{-1}$ | |
| T3 | MAP (treated with 20% granulated zinc oxysulfate) | 100 + 5 kg ha$^{-1}$ | Sowing |
| | Urea | 200 kg ha$^{-1}$ | |
| T4 | MAP (treated with 20% granulated zinc oxysulfate) | 100 + 10 kg ha$^{-1}$ | Sowing |
| | Urea | 200 kg ha$^{-1}$ | |
| T5 | MAP (treated with 50% zinc oxysulfate powder) | 100 + 2 kg ha$^{-1}$ | Sowing |
| | Urea | 200 kg ha$^{-1}$ | |
| T6 | MAP (treated with 50% zinc oxysulfate powder) | 100 + 4 kg ha$^{-1}$ | Sowing |
| | Urea | 200 kg ha$^{-1}$ | |

TABLE 17.b

Zinc fertilization treatments applied on Urea. 2018 season.

| | Alternative application | Dose | Application state |
|---|---|---|---|
| T1 | Absolute control | | |
| T2 | MAP | 100 kg ha$^{-1}$ | sowing |
| | Urea | 200 kg ha$^{-1}$ | |
| T3 | MAP | 100 kg ha$^{-1}$ | sowing |
| | Urea (treated with 20% granulated zinc oxysulfate) | 200 + 5 kg ha$^{-1}$ | |
| T4 | MAP | 100 kg ha$_{-1}$ | sowing |
| | Urea (treated with 20% granulated zinc oxysulfate) | 200 + 10 kg ha$^{-1}$ | |
| T5 | MAP | 100 kg ha$^{-1}$ | sowing |
| | Urea (treated with 50% zinc oxysulfate powder) | 200 + 2 kg ha$^{-1}$ | |
| T6 | MAP | 100 kg ha$^{-1}$ | sowing |
| | Urea (treated with 50% zinc oxysulfate powder) | 200 + 4 kg ha$^{-1}$ | |

TABLE 18

Soil data at sowing time

| Depth cm | pH water 1:2.5 | Organic matter % | Avail. P. ppm | N-Nitrates 0-20 cm ppm | N-Nitrates soil 0-60 cm kg ha$^{-1}$ | S-Sulphates soil 0-20 cm ppm | Zn ppm |
|---|---|---|---|---|---|---|---|
| 0-20 cm | 5.9 | 3.05 | 10.6 | 7.7 | 41.1 | 8.0 | 0.80 |
| 20-40 cm | | | | 4.6 | | 7.8 | |
| 40-60 cm | | | | 3.5 | | | |

A count of emerged plants was made 15 days after emergence. In Z65, cover, NDVI by Green seeker, and vigor, green index by Spad and plant height were quantified. The harvesting was carried out mechanically, harvesting the entire plot.

In the vicinity of anthesis, a flight was conducted with an Ebee Parrot aircraft equipped with a Sequoia_4.0_1280×960 (Green), Sequoia_4.0_1280×960 (Red), Sequoia_4.0_1280×960 (Red Edge), Sequoia_4.0_1280× 960 (NIR) high resolution camera. The photographs obtained, with a pixel size of 14×14 cm, were processed and the OSAVI and TCARI indexes were calculated.

OSAVI (Optimized Soil Adjusted Vegetation Index) is a vegetation index corrected for soil reflectance. It provides additional information and represents an improvement over NDVI by showing greater sensitivity to cover variations in sparsely vegetated areas where the ground is visible through the canopy. It is also advisable to use it at the end of the cycle where vegetation cover is maximum, since it saturates at higher levels of leaf area with respect to NDVI.

TCARI (Transformed Chlorophyll Absorption Ratio Index), is sensitive to the chlorophyll content of the vegetation, and therefore could express changes in nitrogen supply in an adjusted form. The variation of this index at the plot scale allows inferring nutritional N deficiencies, allowing re-fertilization decisions to be made. If the N supply is uniform, it could represent effects of other chlorophyll-related elements, such as sulfur (S).

Yield components—number (NG) and weight (WG) of grains—were evaluated on a harvest sample. The results were analyzed by variance partitioning and correlation analysis.

Environmental Conditions of the Season

Figure 17:
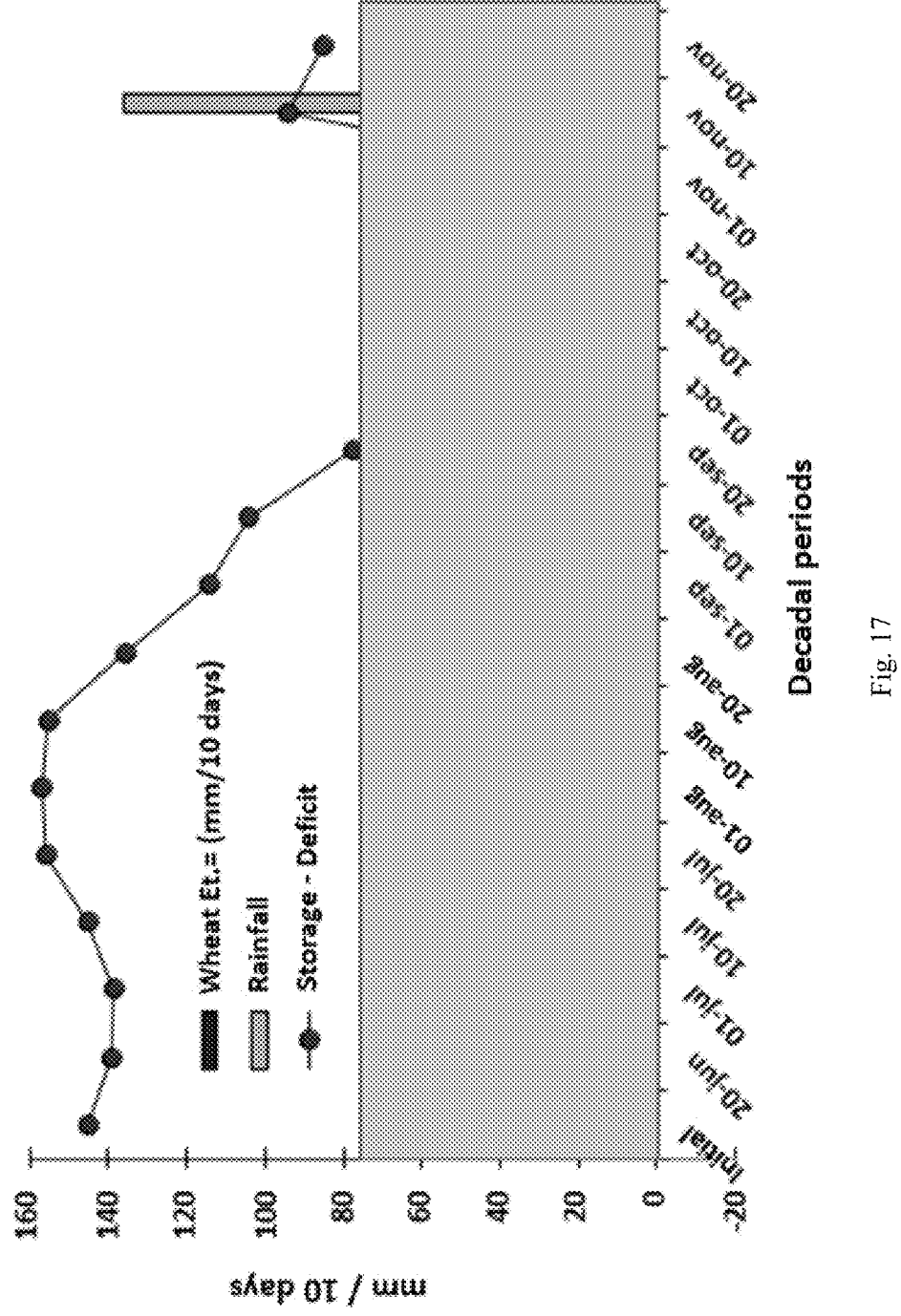
FIG. 17: Precipitation, evapotranspiration and decadel water balance, expressed as useful water sheet (positive values) or evapotranspiration deficit (negative values). When storage falls within the rectangular area, crop demand may not be fully satisfied, generating an evapotranspiration deficit. Accumulated values every 10 days in mm. Wheat, EEA Pergamino, year 2018. Initial useful water (150 cm): 160 mm. Total rainfall during the cycle: 333.1 mm.
Figure 18:
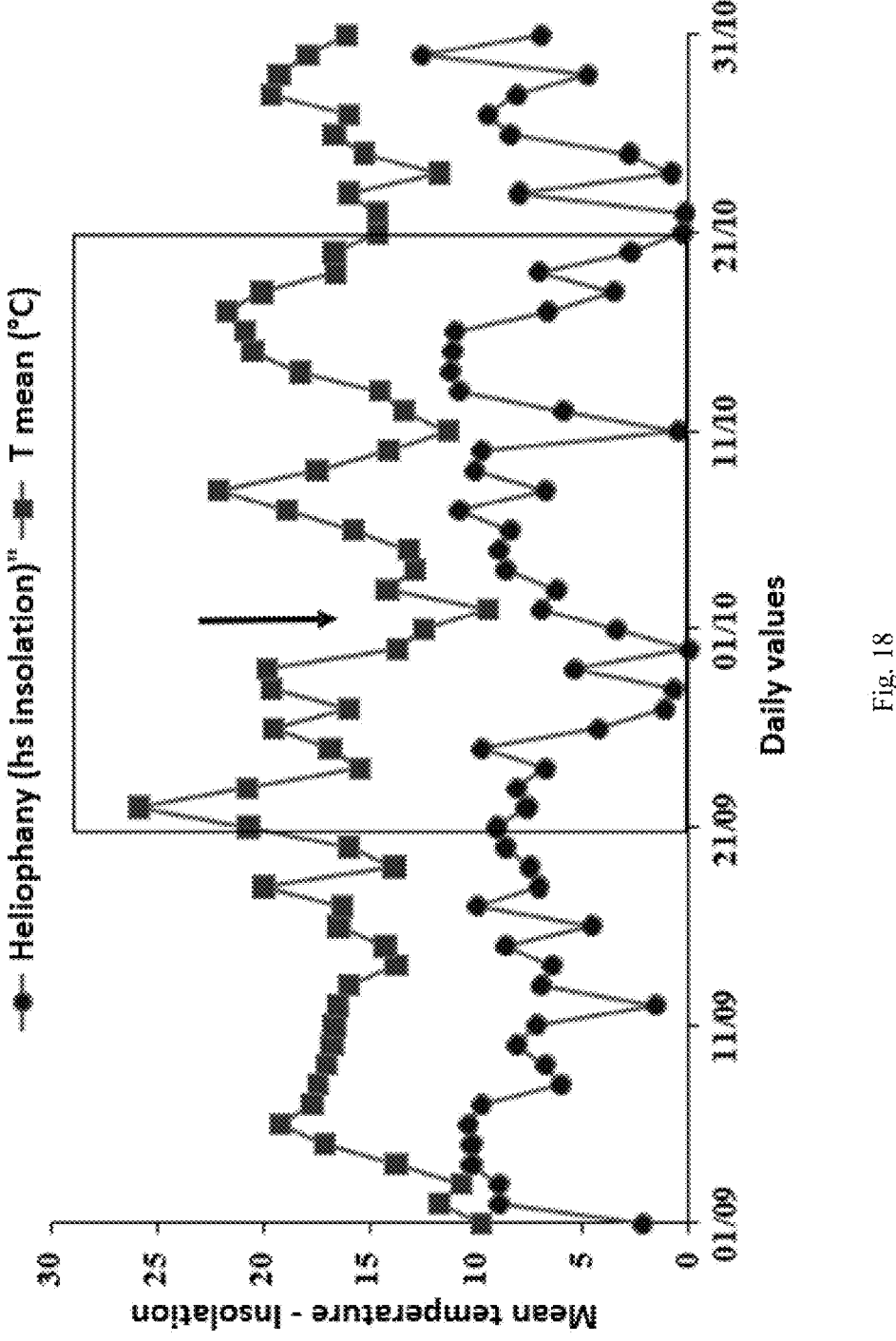
FIG. 18: Daily hours of insolation and average daily temperatures in the period from September 1 to Oct. 31, 2018. INTA Pergamino weather station data. The black arrow indicates the occurrence of a moderate late frost in the early morning of October 2nd.

At sowing, the profile had a moderate level of storage. Even though the previous summer was very dry, the abundant rainfall in April allowed a reasonable level of recharge of the soil moisture profile. Between August 20th and October 10th, precipitation decreased sharply, depleting moisture reserves (FIG. 17). In the crop, it was expressed in limitations in biomass accumulation. Average temperatures were low, determining a harsh winter, compared to recent winters (FIGS. 17 and 18). A moderate frost affected several crops in the region, although no damage was observed at the site, probably due to its elevated position in the relief. Finally, the photothermal quotient was of intermediate level (FIG. 19).

Figure 19:
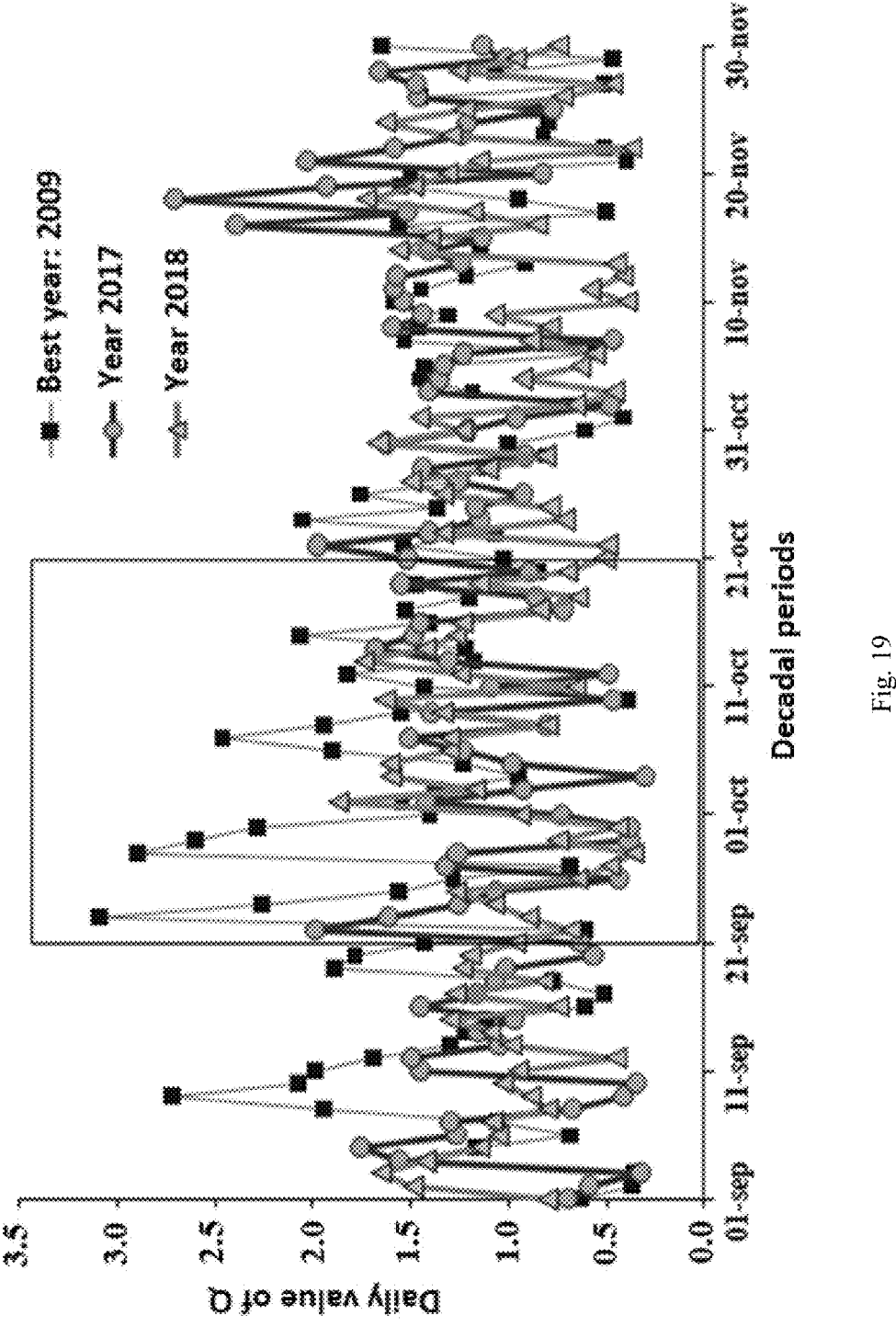
FIG. 19: Photothermal quotient (Q) in the period September 1-September 30-November of 2018, and its comparison with the previous year and the best year of the last decade. INTA Pergamino weather station data. Year 2018.

FIG. 19 shows the photothermal quotient (Q) (Fisher, 1985), which represents the relationship between the daily effective surface radiation and the daily mean temperature, and is a measure of the growth potential per unit thermal time of development. In 2018, few cloudy days were verified but temperatures increased considerably towards spring, determining a normal photothermal quotient for the locality (FIG. 19 and Table 19). This was higher in comparison to the 2017 season but well below 2009, the most favorable year in the last 13 cycles. It is remarkable how this Q value is decreasing since 2014, mainly because of higher temperatures (Table 19). Filling conditions were favorable, with temperatures remaining cool (FIGS. 18 and 19).

TABLE 19

Effective insolation (hs), mean temperature (C. °) and photothermal quotient Q (T
base 0° C.) for the critical period of wheat cultivation in Pergamino area. October
1st to October 30th in 2010, and September 15th to October 15th in all other years.

| Environmental conditions | Year 2005 | Year 2006 | Year 2007 | Year 2008 | Year 2009 | Year 2010 | Year 2011 | Year 2012 | Year 2013 | Year 2014 | Year 2015 | Year 2016 | Year 2017 | Year 2018 |
|---|---|---|---|---|---|---|---|---|---|---|---|---|---|---|
| Average effective insolation (hs) | 7.2 | 7.1 | 5.9 | 6.9 | 8.3 | 7.45 | 6.8 | 5.0 | 5.6 | 6.2 | 5.3 | 5.4 | 6.2 | 7.0 |
| Period average T ° C. | 15.1 | 17.1 | 15.0 | 16.4 | 13.4 | 14.8 | 14.8 | 14.3 | 13.5 | 15.1 | 13.8 | 15.5 | 15.8 | 16.6 |
| Photothermal quotient (Q) $(\text{Mj m}^{-2}\text{ day}^{-1}\text{ ° C.}^{-1})$ | 1.24 | 1.10 | 1.12 | 1.10 | 1.56 | 1.34 | 1.19 | 1.11 | 1.20 | 1.11 | 1.11 | 0.98 | 1.05 | 1.09 |

Results

Figure 20:
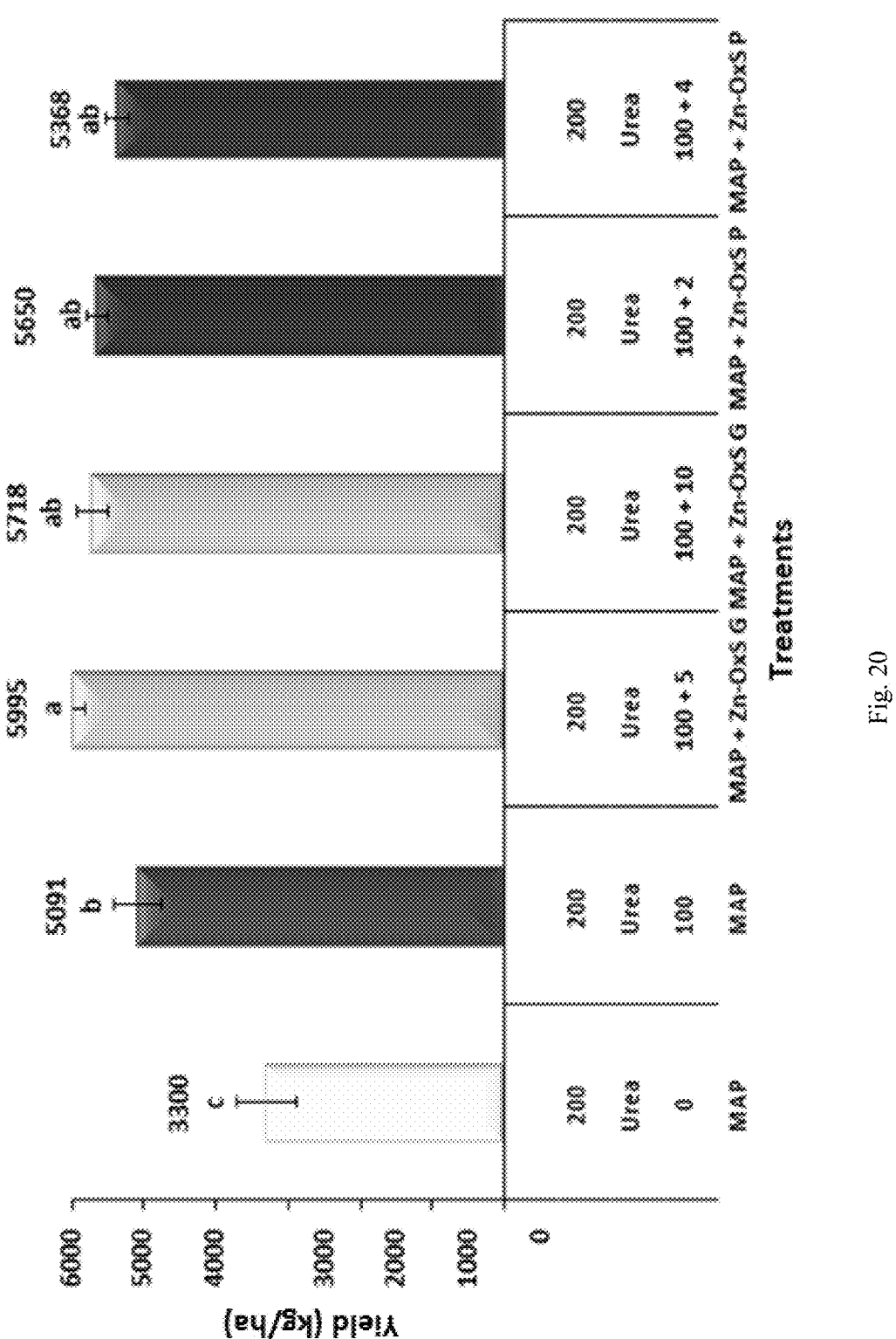
FIG. 20: Average wheat grain yield according to sources and doses for Zn impregnation on MAP. Different letters above the columns represent statistically significant differences between treatments (LSD a=0.05; MSD=807 kg ha$^{-1}$). The error bars indicate the standard deviation of the mean. INTA Pergamino, year 2018.
Figure 21:
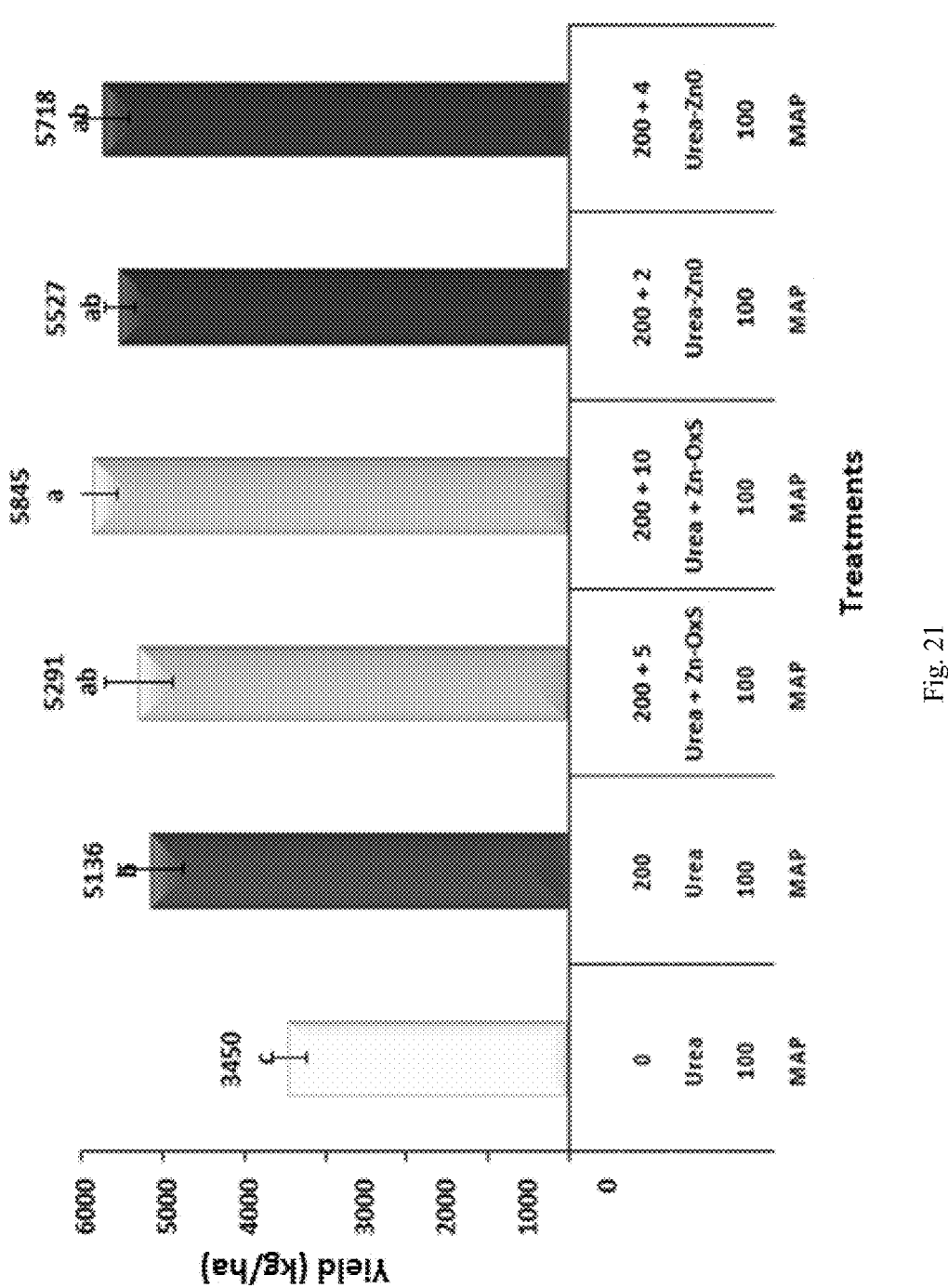
FIG. 21: Average wheat grain yield according to sources and doses for Zn impregnation on Urea. Different letters above the columns represent statistically significant differences between treatments (LSD a=0.05; MSD=694 kg ha$^{-1}$). The error bars indicate the standard deviation of the mean. INTA Pergamino, year 2018.

In Tables 20 and 21, data from observations taken during the crop cycle are presented, while FIGS. 20 and 21 show grain yields grouped by treatment.

TABLE 20

Morphological parameters of the crop: Number of emerged plants, initial dry
matter, cover and interception, vigor, NDVI by Green seeker, green intensity
readings in Spad units, vigor and plant height (Z65), components and grain
yield. Zn impregnation treatments on MAP in wheat. Pergamino, year 2018.

|  | T | Treatments | Plants $\text{m}^{-2}$ | Dry M Z25 | Coverage and Intercep. Z65 | NDVI GS 65 | Spad Z65 |
|---|---|---|---|---|---|---|---|
| Wheat | T1 | MAP 0 | 240 | 1815.0 | 83.9 | 0.42 | 43.2 |
|  | T2 | Map 100 | 238 | 3350.0 | 89.7 | 0.48 | 44.5 |
|  | T3 | Map 100 + ZnG 100 + 5 | 234 | 3297.5 | 93.5 | 0.46 | 45.0 |
|  | T4 | Map 100 + ZnG 100 + 10 | 241 | 2622.5 | 93.7 | 0.43 | 46.7 |
|  | T5 | Map 100 + ZnG 100 + 2 | 244 | 2997.5 | 86.7 | 0.44 | 48.6 |
|  | T6 | Map 100 + ZnG 100 + 4 | 239 | 2155.0 | 93.7 | 0.45 | 41.6 |
| R2 vs yield |  |  | 0.02 | 0.47 | 0.58 | 0.20 | 0.20 |

|  | T | Treatments | Vigor Z65 (1-5) | Plant height cm | NG $\text{m}^{-2}$ | WG | Yield kg $\text{ha}^{-1}$ |
|---|---|---|---|---|---|---|---|
| Wheat | T1 | MAP 0 | 2.5 | 71 | 11511.6 | 28.7 | 3300.0 |
|  | T2 | Map 100 | 3.8 | 76 | 15909.1 | 32.0 | 5090.9 |
|  | T3 | Map 100 + ZnG 100 + 5 | 4.2 | 82 | 18735.8 | 32.0 | 5995.5 |
|  | T4 | Map 100 + ZnG 100 + 10 | 4.4 | 77 | 18249.5 | 31.3 | 5718.2 |
|  | T5 | Map 100 + ZnG 100 + 2 | 4.4 | 79 | 17656.3 | 32.0 | 5650.0 |
|  | T6 | Map 100 + ZnG 100 + 4 | 4.5 | 81 | 18300.6 | 29.3 | 5368.2 |
|  | P= |  |  |  |  |  | <0.0001 |
|  | VQ= |  |  |  |  |  | 10.3% |
| R2 vs yield |  |  | 0.89 | 0.78 | 0.96 | 0.56 |  |

Vigor Index: 1 minimum 5-maximum It considers growth, uniformity, health and general appearance of the crop in the evaluated plot.
NDVI: Normalized vegetation index.

TABLE 21

Morphological parameters of the crop: Number of emerged plants, initial dry
matter, cover and interception, vigor, NDVI by Green seeker, green intensity
readings in Spad units, vigor and plant height (Z65), components and grain
yield. Zn impregnation treatments on Urea in wheat. Pergamino, year 2018.

|  | T | Treatments | Plants $\text{m}^{-2}$ | Dry M Z25 | Coverage and Intercep. Z65 | NDVI GS 65 | Spad Z65 |
|---|---|---|---|---|---|---|---|
| Wheat | T1 | Urea 0 | 235.0 | 2095.0 | 83.3 | 0.30 | 40.9 |
|  | T2 | Urea 200 | 239.0 | 2450.0 | 91.7 | 0.40 | 40.8 |
|  | T3 | Urea 200 + ZnG 100 + 5 | 240.0 | 2510.0 | 94.4 | 0.42 | 45.6 |
|  | T4 | Urea 200 + ZnG 100 + 10 | 241.0 | 2950.0 | 95.0 | 0.43 | 46.9 |

TABLE 21-continued

Morphological parameters of the crop: Number of emerged plants, initial dry matter, cover and interception, vigor, NDVI by Green seeker, green intensity readings in Spad units, vigor and plant height (Z65), components and grain yield. Zn impregnation treatments on Urea in wheat. Pergamino, year 2018.

|  | T5 | Urea 200 + ZnP 100 + 2 | 240.0 | 2870.0 | 96.4 | 0.43 | 51.5 |
|  | T6 | Urea 200 + ZnP 100 + 4 | 242.0 | 2850.0 | 93.5 | 0.41 | 47.3 |
| R2 vs yield |  |  | 0.95 | 0.85 | 0.90 | 0.94 | 0.45 |

|  | T | Treatments | Vigor Z65 (1-5) | Plant height cm | NG $m^{-2}$ | WG | Yield kg $ha^{-1}$ |
| --- | --- | --- | --- | --- | --- | --- | --- |
| Wheat | T1 | Urea 0 | 3.0 | 68.0 | 12034.9 | 28.7 | 3450.0 |
|  | T2 | Urea 200 | 3.9 | 75.0 | 16410.1 | 31.3 | 5136.4 |
|  | T3 | Urea 200 + ZnG 100 + 5 | 4.2 | 74.0 | 16638.1 | 31.8 | 5290.9 |
|  | T4 | Urea 200 + ZnG 100 + 10 | 4.5 | 86.0 | 18735.4 | 31.2 | 5845.5 |
|  | T5 | Urea 200 + ZnP 100 + 2 | 4.4 | 80.0 | 17546.9 | 31.5 | 5527.3 |
|  | T6 | Urea 200 + ZnP 100 + 4 | 4.3 | 79.0 | 18269.0 | 31.3 | 5718.2 |
|  | P= |  |  |  |  |  | <0.0001 |
|  | VQ= |  |  |  |  |  | 8.9% |
| R2 vs yield |  |  | 0.97 | 0.76 | 0.99 | 0.83 |  |

Figure 22:
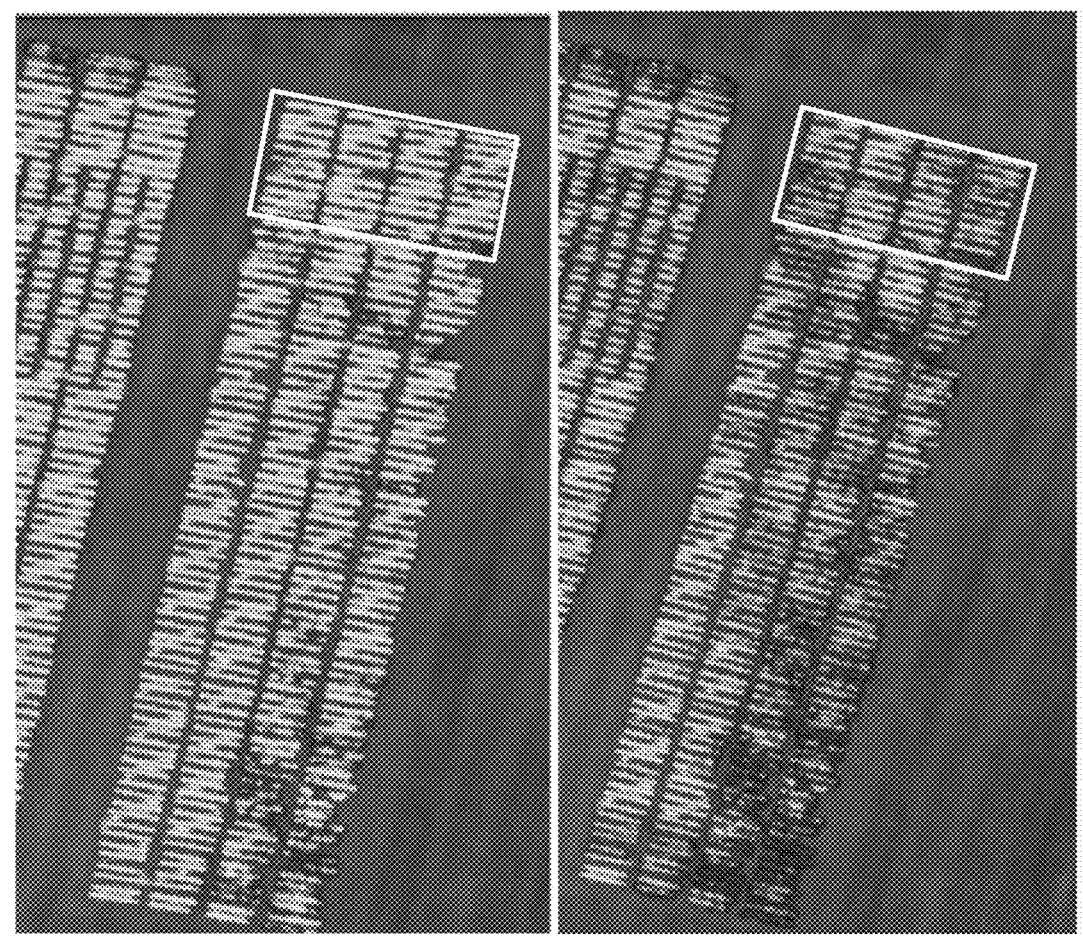
FIG. 22: Calculation of the OSAVI (left) and TCARI (right) indexes around anthesis. The blue squares frame the plots of the present experiment. Wheat, 2018/2019 season.

Vigor Index: 1 minimum 5-maximum It considers growth, uniformity, health and general appearance of the crop in the evaluated plot.
NDVI: Normalized vegetation index FIG. 22 shows the OSAVI (related to biomass without influence of soil reflectance in lightly covered crops) and TCARI (related to chlorophyl) Despite being developed for N, the latter was the most sensitive, probably because of anthocyanin accumulation under P deficiency conditions (FIG. 22).

Discussion and Conclusions

The yields, which averaged 5187 and 5161 kg $ha^{-1}$, respectively. They were satisfactory, although with lower yields compared to the previous season. Water availability was the main constraint to productivity during the season.

The site recorded a poor initial P content, which determined a consistent response to fertilization. Something similar occurred with respect to N. The level of Zn was also below the proposed critical limit of 1 mg $kg^{-1}$ (0-20 cm). The presence of a positive response site enables the comparison of different sources, doses and substrates for impregnation.

Impregnations on MAP

Significant differences were found between treatments (P=0.001, VQ=10.3%). Treatments with granulated Zn were slightly higher than powdered Zn (Table 20 and FIG. 20). In both cases, no dose response was determined. There is speculation of possible subclinical phytotoxicity, since no symptoms were observed in the field. The in-line application performed with the MAP could become excessive at the highest dose. Some intermediate variables recorded in the trial were positively and significantly associated with yields. These were NG ($r^2$=0.96), plant vigor rating ($r^2$=0.89), plant height ($r^2$=0.78), radiation interception at Z65 ($r^2$=0.58), WG ($r^2$=0.56) and initial biomass ($r^2$=0.47).

Impregnations on Urea

Significant differences were found between treatments (P=0.001, VQ=8.9%) (Table 21). Even when the urea treatments were located in the mid-row, somewhat farther away from the plant line than MAP, the response to Zn application was not diminished. Probably the separation of the lines made it possible to determine a greater dose response. Treatments with granulated Zn were slightly higher than powdered Zn (Table 21 and FIG. 21). On average, both granular and powdered Zn sources behaved similarly. Powder treatments appear more uniform in their distribution and more attractive to the user, although this would not have agronomic implications.

All intermediate variables showed a high correlation with yields. Among them, NG ($r^2$=0.99), plant vigor rating ($r^2$=0.97), radiation interception at Z65 ($r^2$=0.90), initial biomass ($r^2$=0.85), WG ($r^2$=0.83) and height ($r^2$=0.76) stand out.

Using spectral indexes on aerial photography, it was determined that both the OSAVI and TCARI indexes were correlated with yields, although the latter was more highly correlated with yields. This index was developed to predict chlorophyll content and N availability, and Zn metabolism is largely associated with N metabolism.

The results obtained suggest a very significant effect of Zn fertilization in a soil limited in this element. On the other hand, the granulated formulation performed better in the MAP treatments, but was equivalent in the Urea treatments. Additionally, at the lower dose, more response was verified in the MAP treatments, but no dose response was determined. It is likely that, when applied in-line, the efficiency is maximized, but greater risks of phytotoxicity are assumed. However, the greater spacing of the seedlings would determine a more linear behavior in urea, with a smaller initial increase but a greater response to dose.

Both substrates, MAP and Urea, were suitable for impregnation from an agronomic point of view, and did not present operational difficulties for their implementation.

Example 6—Boron Impregnated in Phosphorus and Nitrogen Macronutrients for Corn; 2017-2018 Season Materials and Methods A field experiment was carried out at Wheelwright, Santa Fe, Argentina, on a Hughes Series soil, typical Argiudol, (USDA-Soil Taxonomy V. 2006), use capacity: I; IP=100. The trial was planted on December 12th and was spaced at 0.525 m between rows. The chosen cultivar was DK7220 VT3P. Good productive conditions were ensured, keeping the crop free of weeds, pests and diseases. The design corresponded to randomized complete blocks with 4 replications and 5 treatments, as shown in Table 22. Impregnation treatments with B were evaluated over traditional sources such as MAP or urea. The soil analysis of the site is presented in Table 23.

TABLE 22

| B fertilization treatments applied in the experiment. 2017/18 season. | | |
| --- | --- | --- |
| Alternative application | Dose | Application state |
| T1 MAP | 100 kg ha$^{-1}$ | sowing |
| Urea | 200 kg ha$^{-1}$ | |
| T2 MAP (treated with 15% ulexite powder) | 100 + 2.66 kg ha$^{-1}$ | sowing |
| Urea | 200 kg ha$^{-1}$ | |
| T3 MAP (treated with 15% ulexite powder) | 100 + 5.33 kg ha$^{-1}$ | sowing |
| Urea | 200 kg ha$^{-1}$ | |
| T4 MAP | 100 | sowing |
| Urea (treated with 15% ulexite powder) | 200 kg ha$^{-1}$ + 4 kg ha$^{-1}$ | |
| T5 MAP | 100 kg ha$^{-1}$ | sowing |
| Urea (treated with 15% ulexite powder) | 200 kg ha$^{-1}$ + 5.33 kg ha$^{-1}$ | |
| T1 MAP | 100 kg ha$^{-1}$ | sowing |
| Urea | 200 kg ha$^{-1}$ | |

TABLE 22-continued

| B fertilization treatments applied in the experiment. 2017/18 season. | | |
| --- | --- | --- |
| Alternative application | Dose | Application state |
| T2 MAP (treated with 10% granulated ulexite) | 100 + 4 kg ha$^{-1}$ | sowing |
| Urea | 200 kg ha$^{-1}$ | |
| T3 MAP (treated with 10% granulated ulexite) | 100 + 8 kg ha$^{-1}$ | |
| Urea | 200 kg ha$^{-1}$ | |
| T4 MAP | 100 | sowing |
| Urea (treated with 10% granulated ulexite) | 200 kg ha$^{-1}$ + 4 kg ha$^{-1}$ | |
| T5 MAP | 100 kg ha$^{-1}$ | sowing |
| Urea (treated with 10% granulated ulexite) | 200 kg ha$^{-1}$ + 8 kg ha$^{-1}$ | |

TABLE 23

| Soil analysis carried out at planting time | | | | | |
| --- | --- | --- | --- | --- | --- |
| Depth | Organic matter % | Total N mg kg$^{-1}$ | Extractable phosphorus mg kg$^{-1}$ | N-Nitrates (0-20) cm ppm | N-Nitrates soil 0-60 cm kg ha$^{-1}$ |
| 0-20 cm | 2.63 low | 0.131 low | 8.1 very low | 8.3 intermediate | 41.1 intermediate |

| Depth | S-Sulfates soil mg kg$^{-1}$ | Zinc mg kg$^{-1}$ | Boron mg kg$^{-1}$ | pH water 1:2.5 | Water in soil 150 cm - sowing |
| --- | --- | --- | --- | --- | --- |
| 0-20 cm | 8.5 intermediate | 0.83 low | 0.41 intermediate | 5.6 Slightly acid | 140 mm normal |

In the V7 stage, the accumulated biomass was determined. In V8, NDVI was calculated using the Green Seeker sensor and nitrogen content was estimated using the Minolta Spad chlorophyll meter. In female flowering (R1), vigor was rated on a subjective scale (1: minimum-5 maximum) according to the general condition of the plots, and intercepted radiation was measured. At harvest, final plant height, % of broken and tipped plants, yield components: kernels·spikel$^{-1}$, number of kernels·m$^{-2}$, kernel weight and yield were determined. Harvesting was done manually, with stationary threshing of the samples. For the study of the results, analysis of variance, mean comparisons and multivariate analysis by the principal components method were performed.

Weather Conditions During the Season

Figure 23:
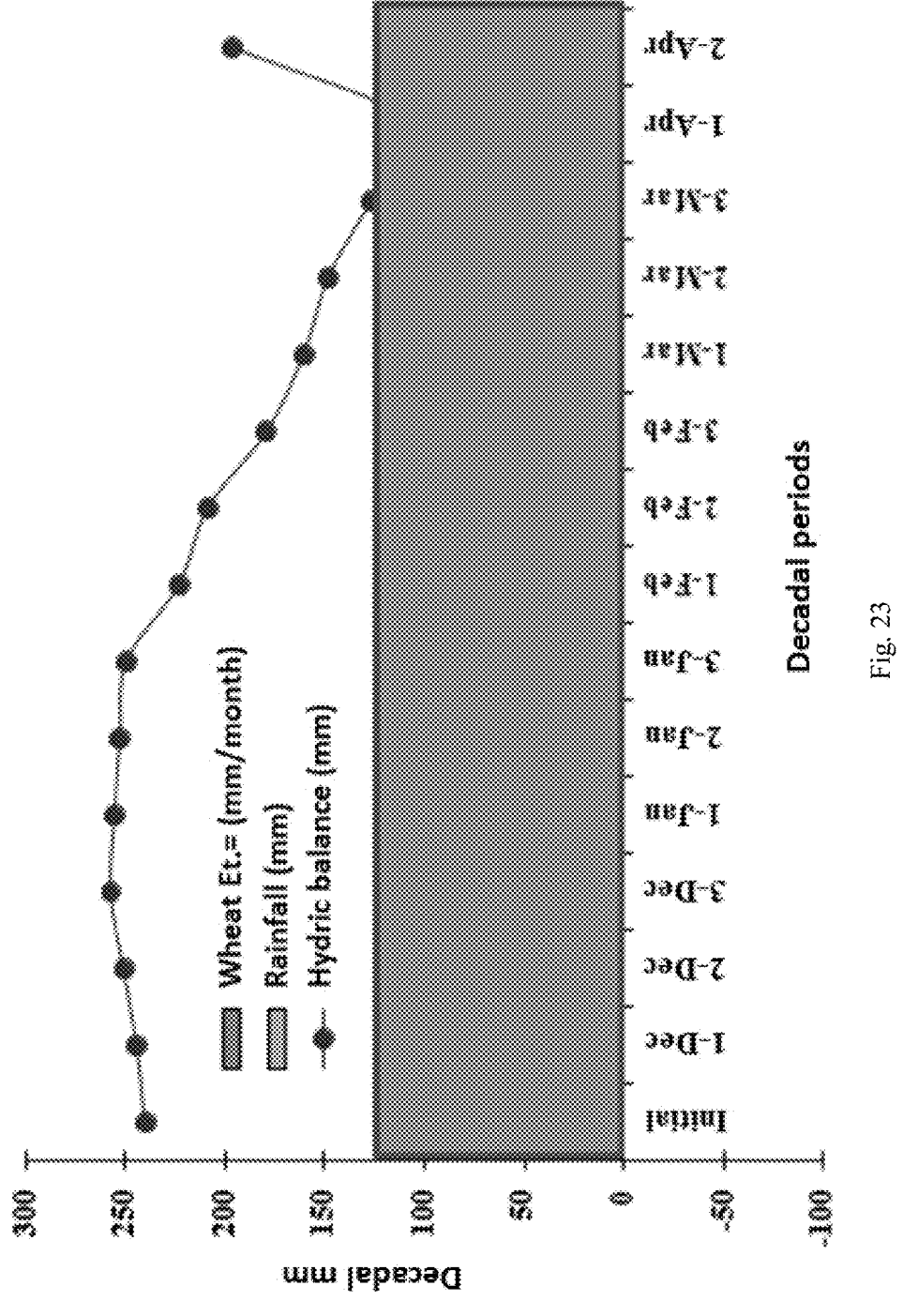
FIG. 23: Precipitation, evapotranspiration and storage level (positive values) or deficit (negative) accumulated (mm) in the experimental site. Wheelwright, Santa Fe, Argentina, 2017/18 corn season. Initial available water in the soil (150 cm): 140 mm. The crop added the consumptive use of 100 mm from the presence of the groundwater table. The rectangle indicates the storage level below which evapotranspiration may no longer be at its maximum. Total rainfall in the cycle: 530 mm. Cumulative evapotranspiration deficit 0 mm.

In FIG. 23, the rainfall of the site during the crop cycle is presented. Rainfall was scarce in the January-March quarter, although higher than in other localities in the region. However, the presence of near-surface nappe was the key factor. Nappe, fertilization and late sowing allowed improving an apparently restricted environment, with the crop achieving outstanding yields for the nature of the season (FIG. 23).

Results

A) B Powder

Figure 24:
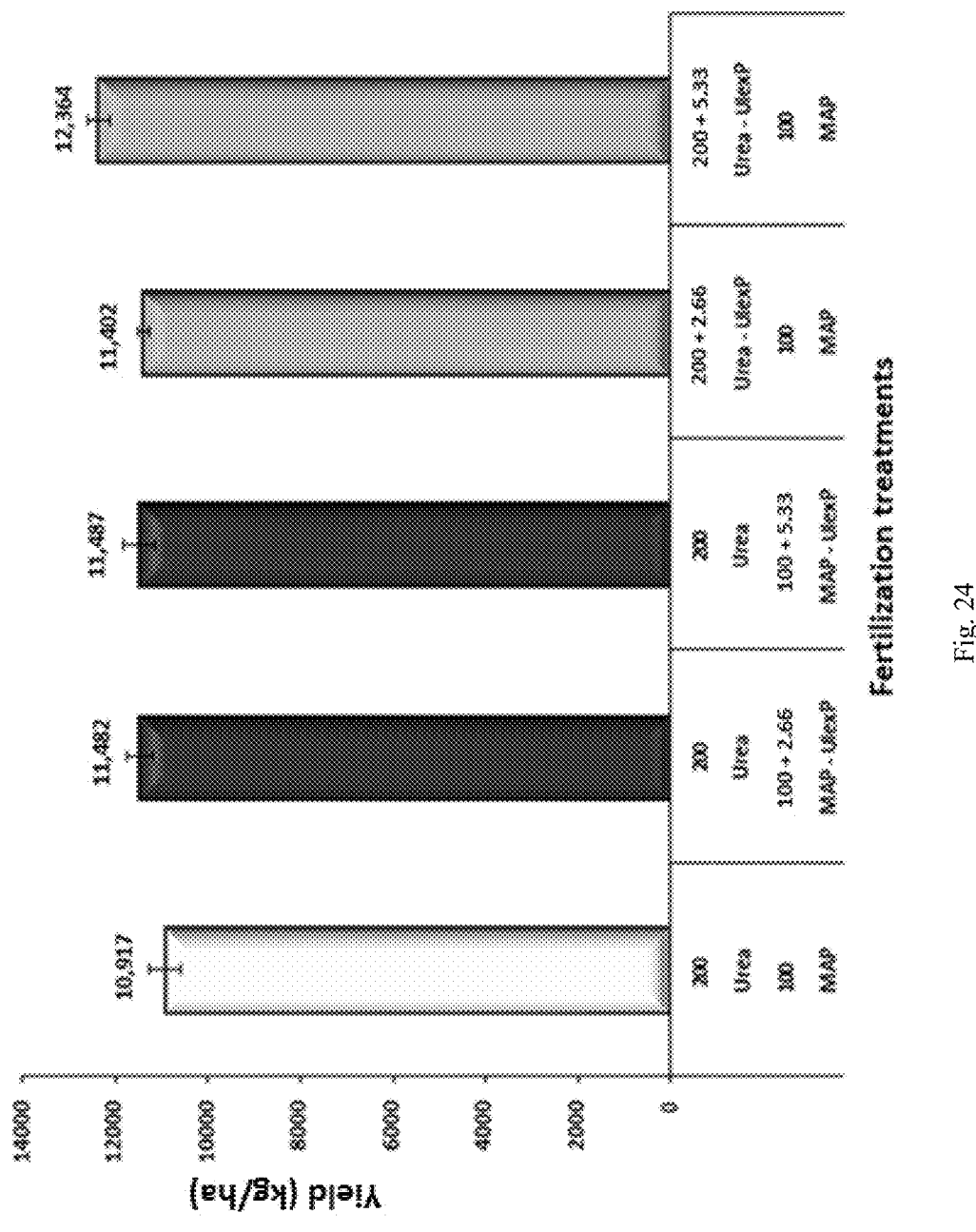
FIG. 24: Corn yields according to phosphorus, nitrogen and boron powder fertilization strategies by impregnation of traditional sources. 2017/18 cycle. The error bars indicate the standard deviation of the mean.

In Table 24 the morphological and physiological crop variables and yield components are presented, while in FIG. 24 the yields and their statistical significance are shown.

TABLE 24

Morphological parameters and yield components: Dry matter in V8, plant height and spikelet insertion, radiation interception at flowering, green intensity determined by Spad and NDVI by Green seeker, vigor, yield and its numerical components: spikes · m$^{-2}$ (NS), spike · m$^{-1}$ (GS), number of grains · m$^{-2}$ (NG) and weight of grain (WG × 1000). The relationship between yield and these intermediate variables is presented. Boron powder fertilization strategies by impregnation from traditional sources in late dated corn. Wheelwright, Santa Fe, 2017/18 season.

| Tr | Description | Dry M V8 (gm$^{-2}$) | Plant height (cm) | Insertion height (cm) | Spad R1 | Coverage R1 (%) | Vigor (1-5) |
|---|---|---|---|---|---|---|---|
| T1 | Map 100 + Urea 200 | 1374.6 | 270.0 | 101.0 | 49.0 | 88.1 | 3.7 |
| T2 | MAP100 – Ulex P2.6 + Urea 200 | 1784.3 | 280.0 | 103.0 | 50.4 | 90.5 | 4.1 |
| T3 | MAP100 – Ulex P5.3 + Urea 200 | 1571.6 | 280.0 | 112.0 | 46.8 | 90.8 | 4.1 |
| T4 | MAP100 + Urea 200-Ulex P2.6 | 1895.1 | 282.0 | 102.0 | 49.7 | 92.2 | 4.2 |
| T5 | MAP100 + Urea 200-Ulex G5.3 | 1626.6 | 285.0 | 100.0 | 51.8 | 96.0 | 4.6 |
| R$_2$ vs yield | | 0.64 | 0.73 | 0.02 | 0.35 | 0.92 | 0.94 |

| Tr | Description | Green seeker V10 | NS | GS | NG | WG × 1000 | Yield (kg ha$^{-1}$) |
|---|---|---|---|---|---|---|---|
| T2 | Map 100 + Urea 200 | 0.75 | 7.2 | 401.7 | 2898.2 | 377 | 10916.6 |
| T3 | MAP100 – Ulex P2.6 + Urea 200 | 0.76 | 7.5 | 395.7 | 2969.4 | 387 | 11481.5 |
| T4 | MAP100 – Ulex P5.3 + Urea 200 | 0.78 | 6.9 | 465.9 | 3226.8 | 356 | 11487.3 |
| T5 | MAP100 + Urea 200-Ulex P2.6 | 0.78 | 8.4 | 364.9 | 3054.2 | 373 | 11402.3 |
| T6 | MAP100 + Urea 200-Ulex G5.3 | 0.80 | 8.1 | 428.2 | 3460.0 | 357 | 12363.7 |
| R$_2$ vs yield | | 0.78 | 0.21 | 0.09 | 0.84 | 0.31 | |
| Stat. Sign (P=) | | | | | | | <0.0001 |
| VQ (%) | | | | | | | 5.18 |

Vigor Index: 1 minimum 5-maximum

B) Granulated B

Figure 25:
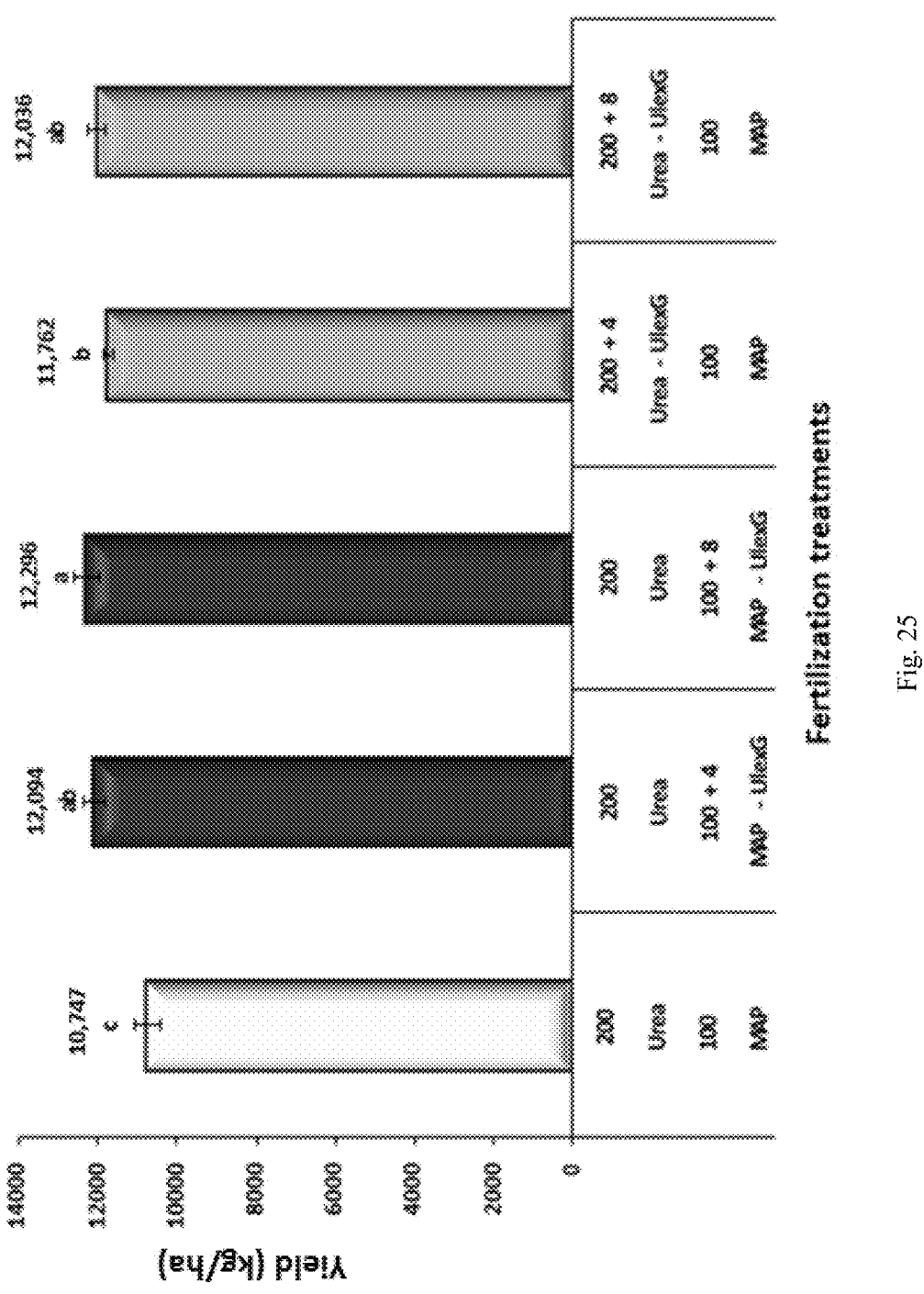
FIG. 25: Corn yield according to fertilization strategies with phosphorus, nitrogen and granular boron by impregnation of traditional sources. 2017/18 cycle. Different letters above the columns represent statistically significant differences between treatments (LSD a=0.05). MSD=450.7 kg ha$^{-1}$. The error bars indicate the standard deviation of the mean.

In Table 25 the morphological and physiological crop variables and yield components are presented, while in FIG. 25 the yields and their statistical significance are shown.

Discussion and Conclusions

A) B Powder

Yields reached an average of 11,530.3 kg ha$^{-1}$, which was very acceptable for the climatic year, given the scarcity of

TABLE 25

Morphological parameters and performance components: Dry matter in V8, plant height and spikelet insertion, radiation interception at flowering, green intensity determined by Spad and NDVI by Green seeker, vigor, yield and its numerical components: spikes · m$^{-2}$ (NS), spike · grains$^{-1}$ (GS), number of grains · m$^{-2}$ (NG) and weight of grain (WG × 1000). The relationship between performance and these intermediate variables is presented. Granulated Boron fertilization strategies by impregnation from traditional sources in late dated corn. Wheelwright, Santa Fe, 2017/18 season.

| Tr | Description | Dry M V8 (g m$^2$) | Plant height (cm) | Insertion height (cm) | Spad R1 | Coverage R1 (%) | Vigor (1-5) |
|---|---|---|---|---|---|---|---|
| T1 | Map 100 + Urea 200 | 1833.5 | 270.0 | 101.0 | 49.5 | 85.1 | 3.5 |
| T2 | MAP100 – UlexG4 + Urea 200 | 1853.2 | 280.0 | 103.0 | 50.1 | 89.9 | 3.7 |
| T3 | MAP100 – UlexG8 + Urea 200 | 2164.7 | 280.0 | 112.0 | 51.1 | 88.9 | 3.5 |
| T4 | MAP100 + Urea 200-Ulex G4 | 2102.3 | 282.0 | 102.0 | 52.9 | 90.8 | 3.7 |
| T5 | MAP100 + Urea 200-Ulex G8 | 1948.2 | 285.0 | 100.0 | 51.6 | 92.7 | 3.8 |
| R$_2$ vs yield | | 0.11 | 0.71 | 0.25 | 0.20 | 0.56 | 0.16 |

| Tr | Description | Green seeker V10 | NS | GS | NG | WG × 1000 | Yield (kg ha$^{-1}$) |
|---|---|---|---|---|---|---|---|
| T2 | Map 100 + Urea 200 | 0.77 | 8.1 | 355.0 | 2868.4 | 375 | 10746.9 |
| T3 | MAP100 – UlexG4 + Urea 200 | 0.85 | 7.2 | 456.4 | 3292.8 | 372 | 12093.5 |
| T4 | MAP100 – UlexG8 + Urea 200 | 0.76 | 8.4 | 402.5 | 3369.0 | 365 | 12295.6 |
| T5 | MAP100 + Urea 200-Ulex G4 | 0.76 | 7.2 | 480.0 | 3463.0 | 383 | 11762.2 |
| T6 | MAP100 + Urea 200-Ulex G8 | 0.80 | 6.9 | 483.6 | 3349.3 | 402 | 12035.7 |
| R$_2$ vs yield | | 0.08 | 0.06 | 0.39 | 0.75 | 0.00 | |
| Stat. Sign (P=) | | | | | | | <0.0001 |
| VQ (%) | | | | | | | 5.18 |

Vigor Index: 1 minimum 5-maximum rainfall. The contribution of the nappe was the key factor, when the rains were discontinued and the crop could have entered a deficit. In addition, the adequate reserves with which the crop started its cycle and the low daily demand typical of a late planting made it possible to sustain the yield components. It is confirmed that, in the region, a corn planted in the first part of the "window" for late planting dates has little effect on its potential yield.

The differences obtained did not reach statistical significance (P=0.18; VQ=5.5%). The highest yields were obtained in the combination of MAP+Urea impregnated at maximum dose (T5). The yields of this treatment resembled those obtained with MAP or Urea impregnated with Granulated Ulexite, in a similar experiment carried out at the same site by the inventors. The response is still interesting for a microelement whose adoption so far is minor, compared to Zinc (Zn), the most relevant and widespread so far. Most of the experiments conducted with B so far have been carried out through foliar applications, and in crops such as sunflower, alfalfa or soybean. So the present combination represents a novel advance in research on this nutrient. Considering the mobility and the results obtained, it seems an acceptable strategy to impregnate MAP with Zn and Urea with B, using for impregnation the source selected on the basis of its agronomic performance in the field.

Response was anticipated in order of correlation by subjective rating of vigor ($r^2$=0.94), cover and interception ($r^2$=0.92), NG ($r^2$=0.84), NDVI by Green Seeker ($r^2$=0.78), Plant height ($r^2$=0.73) and Cumulative dry matter at V8 ($r^2$=0.64). The variables that contributed most to explaining yields were related to growth and NG, rather than other physiological or metabolic processes (Table 24).

The late seeding date does not seem to limit the response to fertilization. If the water environment is more comfortable in late seeding, even with greater availability of nutrients and resources in the soil, the response to the technology could be superior to that observed in the traditional September seeding.

Although the differences obtained did not reach statistical significance, the maximum response was similar to that obtained in the Granulated Ulexite treatments, although the mean difference was lower. The nutrient evaluated (B) was limiting for corn yields. The combination of MAP impregnated with Zn+Urea with B seems to be a suitable combination for the supply of both elements.

B) Granulated B

Yields reached an average of 11,786.8 kg ha$^{-1}$, which was very good for the climatic year, given the scarcity of rainfall. The contribution of the nappe was the key factor, when the rains were discontinued and the crop could have entered a deficit. In addition, the adequate reserves with which the crop started its cycle and the low daily demand typical of a late planting made it possible to sustain the yield components. It is confirmed that in the region, a corn planted in the first part of the "window" for late planting dates has little effect on its potential yield.

Significant treatment effect was determined (P<0.001; VQ=2.0%). The impregnation treatments on MAP, regardless of the dose, and the maximum dose applied on Urea allowed obtaining the maximum yield (FIG. 25). B is highly mobile in soil and the use of MAP or Urea as a transporter could present similar efficiencies. The lower dose dependence in the impregnation on MAP could reside in the soil-incorporated location of the fertilizer, while with Urea it was surface-applied, over a light residue cover. The response was anticipated in order of correlation by NG ($r^2$=0.75), plant height ($r^2$=0.71), cover and interception ($r^2$=0.56) and GS ($r^2$=0.39). The variables that contributed most to explain yields were related to growth and NG, and not to photosynthetic efficiency (Table 25).

The late seeding date does not seem to limit the response to fertilization. If the water environment is more comfortable in late seeding, even with greater availability of nutrients and resources in the soil, the response to the technology could be superior to that observed in the traditional September seeding. This raises the question of whether the lower yields sometimes observed in December crops are not limited by management and fertilization, rather than by the physiology and potential of the crop at this second date.

The results obtained allow us to conclude that the nutrient evaluated was a limiting factor in corn yields and that the technologies evaluated were an appropriate means of supplying it, with less dependence on doses when a phosphorus fertilizer was used as a means of supplying it to the soil.

Example 7—Boron Impregnated in Phosphorus Macronutrients for Soybeans; 2017-2018 Season

Materials and Methods

During the 2017/18 season, a field experiment was conducted aimed to evaluate the impact of different fertilization strategies on soybean crop productivity. The treatments were applied top quality soybean. The experiment was planted at the EEA INTA Pergamino, on a Pergamino Series soil, typical Argiudol, mixed family, loam, thermal, Class I-2, IP=85. Planting was carried out on December 21st, with the DM 40R16 STS variety, in rows spaced 0.40 m apart. The experimental site registers a continuous agricultural rotation with a high level of intensification and crop rotation. The predecessor was corn. During the cycle, insecticides and fungicides were applied to prevent attacks by bollworms, bugs and diseases. The plots were kept completely free of weeds and pests.

The test design was a randomized complete block design with four replications and six treatments. Details of the treatments evaluated are described in Table 26. The soil analysis of the sites is presented in Table 27.

TABLE 26

| Treatment | Fertilizers | Dose |
|---|---|---|
| | Boron (B) fertilization treatments applied in the experiment. 2017/18 season. | |
| T1. | Control | |
| T2. | Simple Superphosphate | 100 kg. |
| T3. | Simple Superphosphate treated with 10% granulated ulexite | 100 kg. + 4 kg. |
| T4. | Simple Superphosphate treated with 10% granulated ulexite | 100 kg. + 8 kg. |
| T5. | Simple Superphosphate treated with 15% ulexite powder | 100 kg. + 2.66 kg. |
| T6. | Simple Superphosphate treated with 15% ulexite powder | 100 kg. + 5.33 kg. |

TABLE 27

| | | | | Available phosphorus mg kg$^{-1}$ | N-Nitrates (0-60 cm) kg ha$^{-1}$ | S-Sulphates (0-20 cm) ppm | UW in soil (0-150 cm) mm |
|---|---|---|---|---|---|---|---|
| Depth | pH water 1:2.5 | MO | Total N % | | | | |
| 0-20 cm | 5.7 | | 3.02 | 0.151 | 14.2 | 67.9 | 5.8 | 160 |

| | Magnesium ppm | Potassium ppm | Calcium ppm | Zn ppm | Manganese ppm | Copper ppm | Iron ppm | Boron ppm |
|---|---|---|---|---|---|---|---|---|
| 0-20 cm | 278 | 551 | 1533 | 0.98 | 81.5 | 2.32 | 79.1 | 0.73 |

Soil analysis at planting, average of four replications. INTA EEA Pergamino

Emerged plants were counted for 15 days. In R4, NDVI was determined by means of the Green seeker sensor and the radiation interception. Likewise, the N content was also estimated using a Minolta Spad 502 chlorophyll meter, and vigor was rated according to the general condition of the plot, its uniformity and health. An evaluation of nodulation was carried out, considering number, weight, size and location of nodules. Harvesting was carried out with an experimental self-propelled harvester. Yield components, number of nodes, pods, NG and WG were determined on a harvest sample. The results were analyzed by partition of variance, mean comparisons and regression analysis.

Environmental Conditions During the Season

Figure 26:
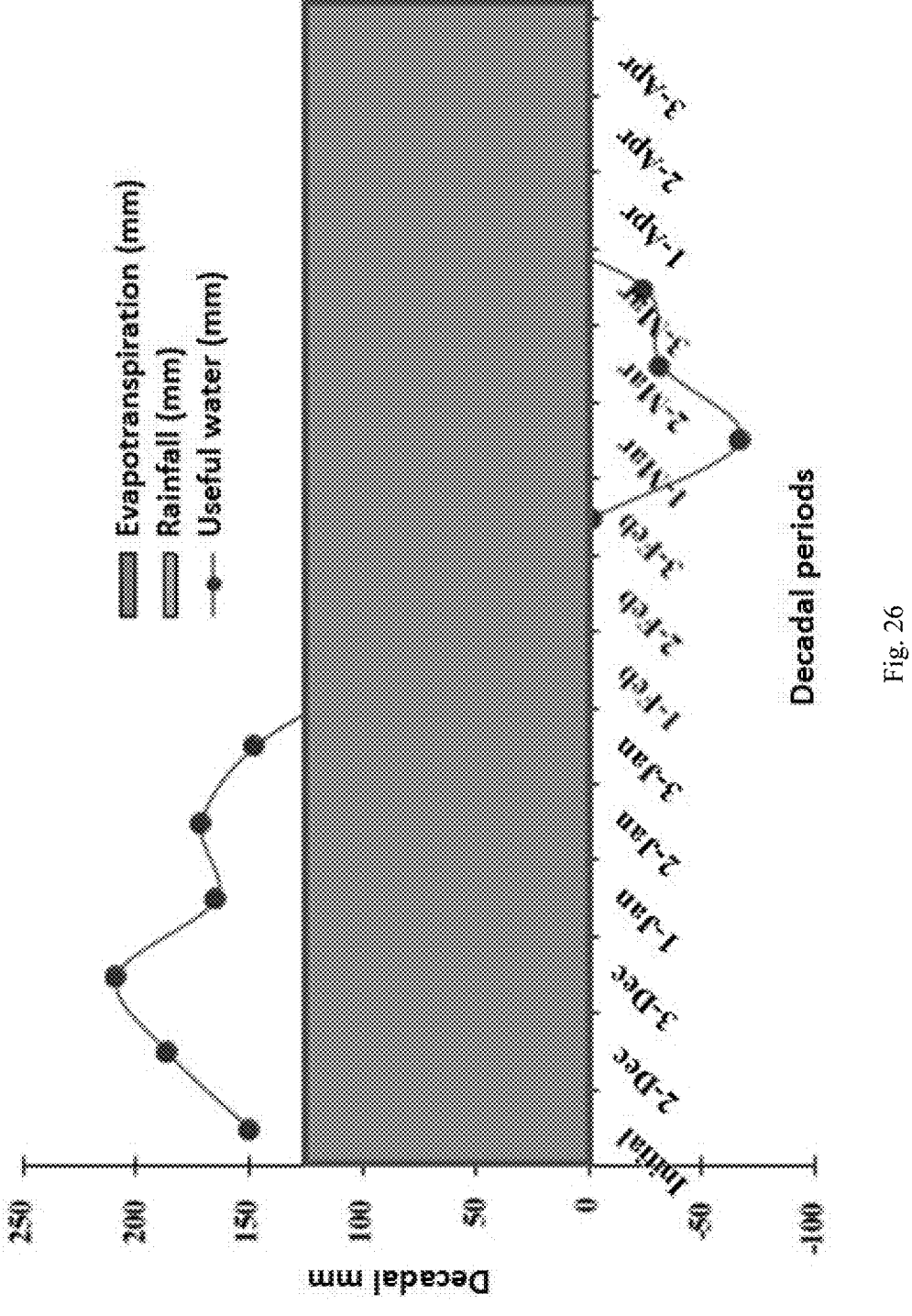
FIG. 26: Precipitation, evapotranspiration and decadel water balance considering 1.5 m depth. INTA EEA Pergamino, soybean season 2017/18. Total rainfall in the cycle: 415 mm. Initial UW (150 cm): 150 mm. Accumulated deficit: 125 mm. The rectangle indicates the level where UW decreases below 50%, where crop consumption may not be optimal.

In FIG. 26, the rainfall determined at the experimental site and the crop evapotranspiration are shown, as well as the decadel water balance, measured through the evolution of the useful water content in the soil. The 2017/18 season was notable for its complexity. Rainfall gradually decreased after sowing, entering a progressive drought from mid-January onwards, which became more accentuated during grain filling (FIG. 26). However, no excessive heat shocks were recorded, with the exception of the first week of February. The presence of pests was moderate, with only the populations of thrips, spider mites, and bugs reaching the critical threshold of treatments. The temperature condition and low pest severity contributed to the effect of the lack of rainfall. The initial reserve and the good physical conditions of the lot mitigated the process and allowed good yields to be achieved.

Results

In Table 28 presents parameters that characterize the nodulation, while in Table 29 presents the yield, its components and other variables determined during the crop cycle.

TABLE 28

Quantitative and qualitative evaluation of nodulation. Fertilization treatments evaluating Boron impregnation over phosphorus sources in soybean. INTA Pergamino, 2017/18 season.

| T | Treatments | Number of nodules (1) | Nodule size (2) | Location (3) | Functionality (4) |
|---|---|---|---|---|---|
| T1 | Control | 2 | 2 | 3 | 3 |
| T2 | SPS 100 | 3 | 3 | 3 | 3 |
| T3 | SPS – Ulex B G 100 + 4 | 3 | 4 | 3 | 3 |
| T4 | SPS – Ulex B G 100 + 8 | 3 | 4 | 4 | 3 |
| T5 | SPS – Ulex B P 100 + 2.66 | 3 | 4 | 4 | 3 |
| T6 | SPS – Ulex B P 100 + 5.33 | 3 | 4 | 4 | 3 |
| | R2 vs yield | 0.81 | 0.96 | 0.28 | — |

Number of nodules: 1: none, 2: low, 3: medium, 4: high, 5: very high.

Size: 1: very small, 2: small, 3: medium size, 4: large size, 5: very large size.

Location: 1: totally in secondary roots, 2: mostly in secondary roots, 3: equal distribution main root:secondary root, 4: mostly in primary root, 5: nodules totally located in main root.

Functionality: 1: completely green or brown shade, 2: mostly green or brown shade, 3: diverse shade, 4: mostly reddish shade, 5: reddish shade in the totality of the nodules.

TABLE 29

Density, NDVI measured by Green seeker, number of nodes and pods, radiation interception, vigor, plant height (cm), N content estimated by Spad, grain yield, components and response over the control. Fertilization treatments evaluating Boron impregnation over phosphorus sources in soybean. Pergamino, 2017/18 season.

| Treat. | Number of plants | Green seeker R4 | Nodes/ plant | Pods/ plant | Interception R4 (%) | Vigor |
|---|---|---|---|---|---|---|
| Control | 25.6 | 0.83 | 12.0 | 38.0 | 91.0 | 3.5 |
| SPS 100 | 28.4 | 0.85 | 13.0 | 38.5 | 92.8 | 3.5 |
| SPS – Ulex B G 100 + 4 | 26.0 | 0.86 | 15.0 | 45.0 | 91.6 | 3.6 |
| SPS – Ulex B G 100 + 8 | 28.1 | 0.85 | 13.5 | 41.0 | 94.4 | 3.6 |
| SPS – Ulex B P 100 + 2.66 | 26.6 | 0.86 | 13.0 | 45.0 | 92.0 | 3.7 |
| SPS – Ulex B P 100 + 5.33 | 26.8 | 0.85 | 13.0 | 44.0 | 93.1 | 3.7 |
| $R_2$ vs yield | 0.09 | 0.76 | 0.60 | 0.60 | 0.28 | 0.45 |

| Treat. | Plants height | Spad | Yield (kg ha$^{-1}$) | NG | WG | Diff vs T1 (kg ha$^{-1}$) |
|---|---|---|---|---|---|---|
| Control | 69 | 45.3 | 3235.8 | 2142.9 | 151.0 | |
| SPS 100 | 76 | 45.8 | 3580.7 | 2403.1 | 149.0 | 344.9 |
| SPS – Ulex B G 100 + 4 | 80 | 45.7 | 3888.2 | 2574.9 | 151.0 | 652.4 |
| SPS – Ulex B G 100 + 8 | 79 | 44.8 | 3858.7 | 2538.6 | 152.0 | 622.9 |

TABLE 29-continued

Density, NDVI measured by Green seeker, number of nodes and pods,
radiation interception, vigor, plant height (cm), N content estimated
by Spad, grain yield, components and response over the control.
Fertilization treatments evaluating Boron impregnation over phosphorus
sources in soybean. Pergamino, 2017/18 season.

| SPS – Ulex B P 100 + 2.66 | 80 | 45.7 | 3763.5 | 2631.8 | 143.0 | 527.7 |
|---|---|---|---|---|---|---|
| SPS – Ulex B P 100 + 5.33 | 81 | 45.6 | 3788.4 | 2594.8 | 146.0 | 552.6 |
| $R_2$ vs yield | | 0.92 | 0.00 | | 0.89 | 0.03 |
| P= | | | | 0.05 | | |
| VQ(%) | | | | 7.99 | | |

R4 (maximum pod size) according to the scale of Fehr and Caviness, 1974.
Vigor Index: According to scale 1: minimum-5: maximum. It evaluates health, plant size and plot uniformity.
Interception: evaluated as % of the maximum incident radiation.

Discussion and Conclusions

The 2017/18 season was low in rainfall (FIG. 26), the crop lost biomass and height, accentuated by the late seeding date, although yield components managed to be sustained (Table 29). The initial reserve and the good physical and rotational conditions of the site contributed to moderate the degree of stress. Yields averaged 3685.9 kg ha$^{-1}$ (FIG. 27), a high level considering the unfavorable environment that the crop had to endure.

Nodulation presented a good quality. The fertilized treatments clearly differed from the Control, replicating what happened in a similar experiment conducted by the inventors where Zinc (Zn) impregnations were evaluated. The most representative variables were number and size, which showed the highest correlation with yields (Table 29).

Figure 27:
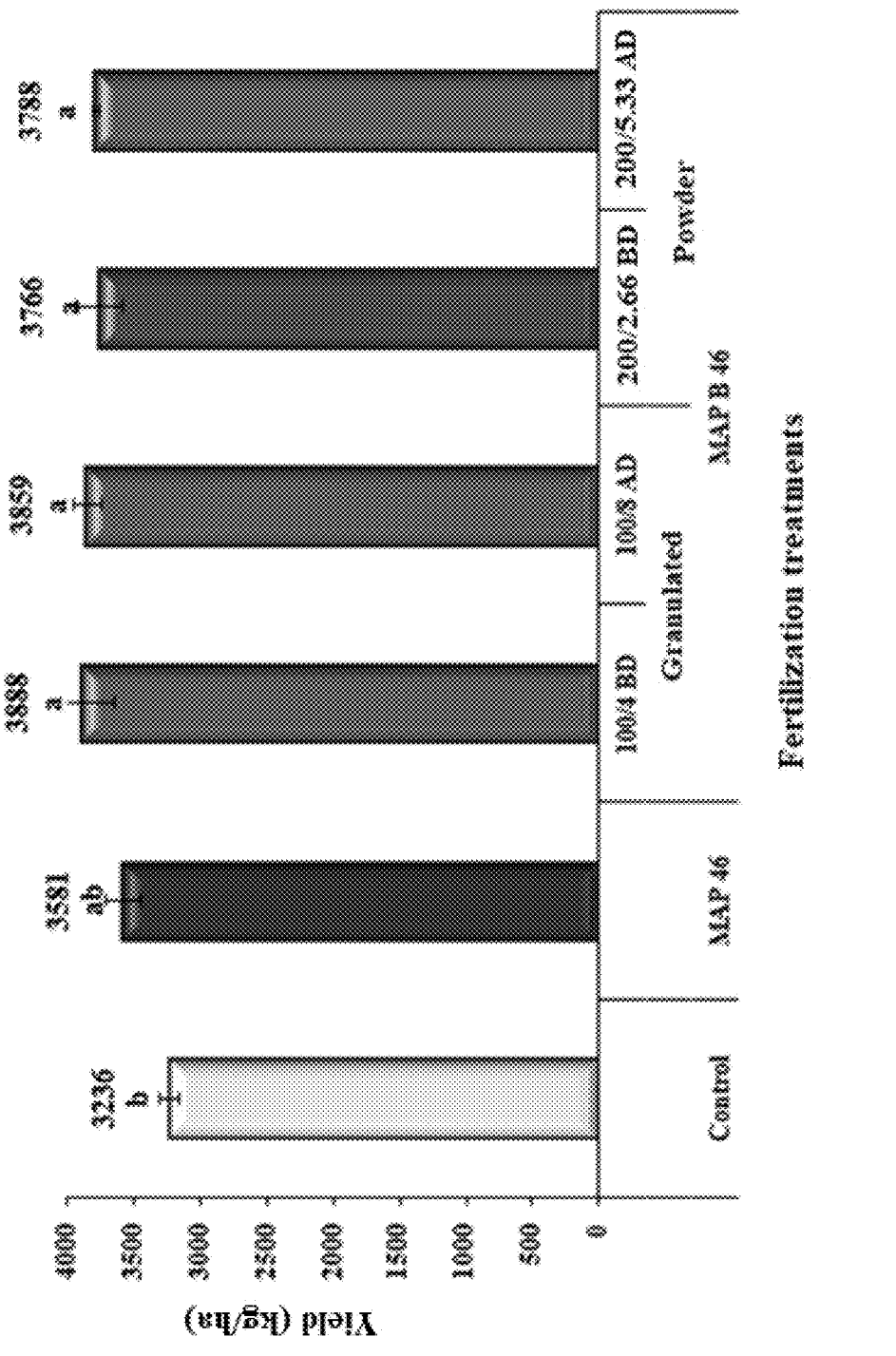
FIG. 27: Grain yield according to fertilization treatments evaluating Boron impregnation over phosphorus sources in soybean. The error bars indicate the standard deviation of the mean. INTA EEA Pergamino, season 2017/18.

Differences in yields were statistically significant (P=0.05; VQ=7.99%). The best results were obtained by impregnation with granulated Ulexite. Both in this source and in the powder formulation, no differences between doses were recorded. The maximum response reached 652.4 kg ha$^{-1}$ over the Control (FIG. 27). All treatments with B impregnation achieved higher yields compared to untreated SPS (Table 29 and FIG. 27).

Evaluated through the coefficient of determination ($r^2$), the variables that most explained yields were plant height ($r^2$=0.92), NG ($r^2$=0.89), NDVI determined by Green seeker ($r^2$=0.76), No. nodes·plant$^{-1}$ ($r^2$=0.60) and No. pods·plant$^{-1}$ ($r^2$=0.60) (Table 29).

The crop, despite its stability and late seeding date, achieved a significant response to fertilization. The impregnation strategies allowed obtaining the maximum statistical performance, outperforming the control. Although tradition points to B as a paradigm of foliar-applied elements, the existence of alternatives with good performance has been demonstrated that broaden the range of options available to the user.

Example 8—Boron Impregnated in Phosphorus and
Nitrogen Macronutrients for Corn; 2018-2019
Season Materials and Methods During the year 2018, two field experiments were conducted at EEA INTA Pergamino, on a soil Serie Pergamino, Class I-2, typical Argiudol, fine family, illitic, thermal (USDA-Soil Taxonomy V. 2006). The trial was planted on October 2nd and was spaced at 0.7 m between rows, achieving a final density of 80,000 plants·ha$^{-1}$. The chosen cultivar was Dow Next 22.6 PW. Good productive conditions were ensured, keeping the crop free of weeds, pests and diseases. In the experiment, a randomized complete block design with 4 replications was used, whose treatments are detailed in Table 30. In addition, in Table 31, the soil data of the experiment are presented.

Impregnation treatments were evaluated with Ulexite, source of B. In Experiment 1 a granular physical form was evaluated (Table 30.a), and in experiment 2 the same source in powder form, impregnated on MAP or Urea (Table 30.b). The MAP treatments were applied in-line incorporated, while in the case of using Urea as a substrate, they were applied on the surface.

TABLE 30.a

Fertilization treatments with granulated Boron in
conjunction with MAP or Urea. 2018/19 season.

| | Alternative application | Dose | Application state |
|---|---|---|---|
| T1 | Absolute control | | |
| T2 | MAP | 100 kg ha$^{-1}$ | Sowing |
| | Urea | 200 kg ha$^{-1}$ | |
| T3 | MAP (treated with 10% granulated ulexite) | 100 + 4 kg ha$^{-1}$ | Sowing |
| | Urea | 200 kg ha$^{-1}$ | |
| T4 | MAP | 100 | Sowing |
| | Urea (treated with 10% granulated ulexite) | 200 kg ha$^{-1}$ + 4 kg ha$^{-1}$ | |
| T5 | MAP (treated with 10% granulated ulexite) | 100 + 8 kg ha$^{-1}$ | Sowing |
| | Urea | 200 kg ha$^{-1}$ | |
| T6 | MAP | 100 kg ha$^{-1}$ | Sowing |
| | Urea (treated with 10% granulated ulexite) | 200 kg ha$^{-1}$ + 8 kg ha$^{-1}$ | |

TABLE 30.b

Fertilization treatments with Boron powder
impregnated on MAP or Urea. 2018/19 season.

| | Alternative application | Dose | Application state |
|---|---|---|---|
| T1 | Absolute control | | |
| T2 | MAP | 100 kg ha$^{-1}$ | sowing |
| | Urea | 200 kg ha$^{-1}$ | |
| T3 | MAP (treated with 15% ulexite powder) | 100 + 2.66 kg ha$^{-1}$ | sowing |
| | Urea | 200 kg ha$^{-1}$ | |
| T4 | MAP | 100 | sowing |
| | Urea (treated with 15% ulexite powder) | 200 kg ha$^{-1}$ + 2.66 kg ha$^{-1}$ | |

TABLE 30.b-continued

Fertilization treatments with Boron powder
impregnated on MAP or Urea. 2018/19 season.

| Alternative application | Dose | Application state |
|---|---|---|
| T5 MAP (treated with 15% ulexite powder) | 100 + 5.33 kg ha$^{-1}$ | sowing |
| Urea | 200 kg ha$^{-1}$ | |
| T6 MAP | 100 kg ha$^{-1}$ | sowing |
| Urea (treated with 15% ulexite powder) | 200 kg ha$^{-1}$ + 5.33 kg ha$^{-1}$ | |

TABLE 31

Soil analysis carried out at planting time

| Depth | Organic matter % | Total N | Extractable phosphorus | N-Nitrates (0-20) cm ppm | N-Nitrates soil 0-60 cm kg ha$^{-1}$ |
|---|---|---|---|---|---|
| | | | mg kg$^1$ | | |
| Pergamino | 3.38 high | 0.169 high | 15.2 intermediate | 8.4 low | 33.9 Very low |

| Depth | S-Sulfates soil mg kg$^{-1}$ | Zinc mg kg$^{-1}$ | Boron mg kg$^{-1}$ | pH water 1:2.5 | Water in soil 150 cm - sowing |
|---|---|---|---|---|---|
| Pergamino | 7.0 low | 0.65 low | 0.33 low | 5.7 Slightly acid | 130 mm moderat. dry |

The dry mass accumulated in V6 was quantified. In V6 and V10, N content was estimated by a nondestructive dimensionless reading with the Minolta Spad 502 chlorophyll meter. In V9, NDVI was determined by means of the Green seeker sensor. At flowering, accumulated dry matter, number of photosynthetically active leaves, vigor, cover and plant height. Successive flights with a drone were carried out to determine the Normalized Difference Vegetation Index (NDVI), the Green Index not affected by ground reflectance (OSAVI) and the Normalized Difference Red Edge (NDRE).

At harvest, yield components, number of spikes·m$^{-2}$ (NS), grains·spike$^{-1}$ (GS), number of grains·m$^{-2}$ (NG) and weight (WGx1000) of grains were determined. Harvesting was done manually, with stationary threshing of the samples. For the study of the results, analysis of variance and mean comparisons were performed.

Weather Conditions During the Season

FIG. 6 shows the precipitation of the sites during the crop cycle, and FIG. 7 shows the temperatures, daylight hours and photothermal coefficient (Q), with data from EEA Pergamino. The stage between December 10th and February 15th was considered, which covers the critical period of flowering and grain filling in all the materials. In FIG. 8, the maximum temperatures of this cycle are compared with the previous ones.

The season was very favorable, although somewhat excessive in rainfall, which was concentrated in short periods of time (FIG. 6) that would have caused leaching of N. As a mitigating factor, the rains were relatively late, espe-cially since mid-December. A large number of cloudy days with low radiation were recorded, due to frequent rainfall (FIG. 7). Average temperatures were cool and lower than 2017/18, especially in the January-February transition during grain filling (FIG. 8), although higher than 2016/17. The photothermal quotient (Q) (December 11-January 10) was 1.59, lower than in the preceding years (2017/18: 1.65; 2015/16: 1.72; 2014/15: 1.70) but nevertheless higher than the warm cycles (2013/14: 1.35; 2016/17: 1.58) (FIG. 7).

Results

Figure 28:
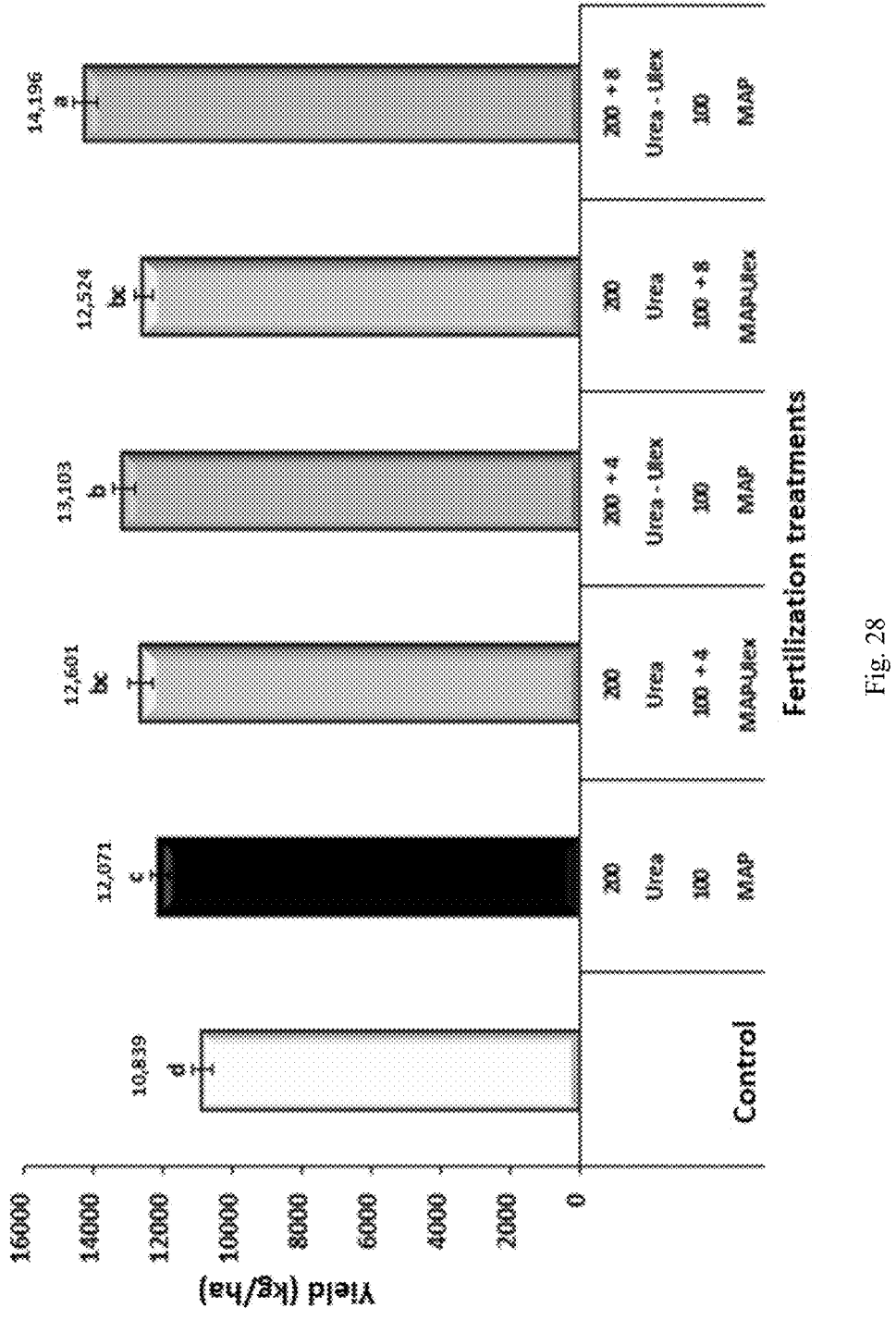
FIG. 28: Corn yield according to impregnation strategies with granular Boron-Ulexite over phosphorus or nitrogen sources. Pergamino, traditionally sowing corn, 2018/19 cycle. Different letters above the columns represent statistically significant differences between treatments (LSD a=0.05; MSD=1086 kg ha$^{-1}$). The error bars indicate the standard deviation of the mean.
Figure 29:
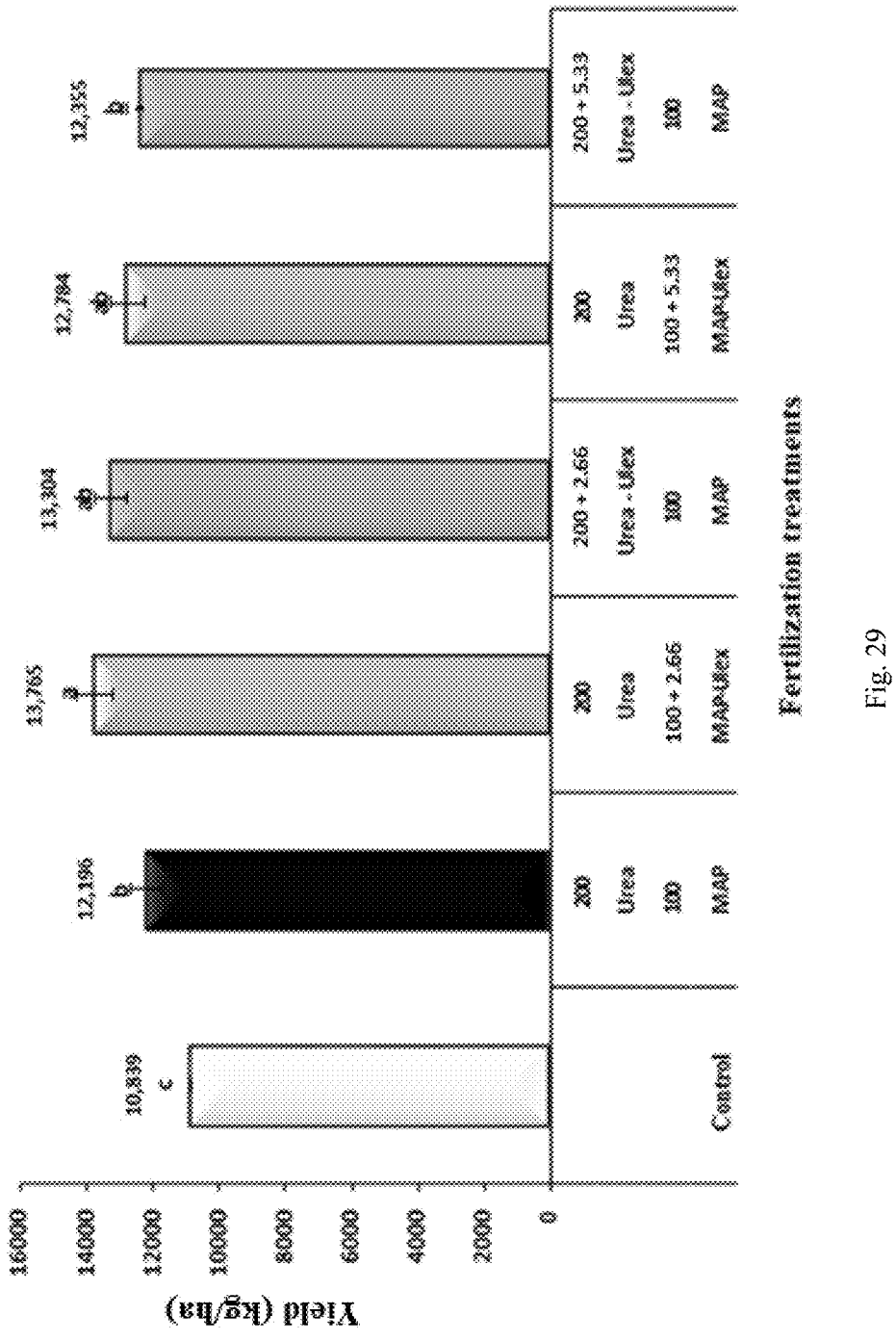
FIG. 29: Corn yield according to impregnation strategies with Boron-Ulexite powder over phosphorus or nitrogen sources. Pergamino, traditionally sowing corn, 2018/19 cycle. Different letters above the columns represent statistically significant differences between treatments (LSD a=0.05; MSD=1110 kg ha$^{-1}$). The error bars indicate the standard deviation of the mean.

In Tables 32 and 33, data from observations taken during the crop cycle are presented, while FIGS. 28 and 29 show grain yields grouped by treatment.

TABLE 32

Morphological parameters and yield components: Dry matter in V5, plant and spike
insertion height, radiation interception at flowering, green intensity determined by
Spad and NDVI by Green seeker, vigor, yield and its numerical components:
spikes · m$^{-2}$ (NS), grains · spike$^{-1}$ (GS), number of grains · m$^{-1}$
(NG) and weight (WG × 1000) of grains. Treatments with granulated B-Ulexite on
MAP or Urea on traditionally dated corn. INTA Pergamino, 2018/19 season.

| Tr | Description | Dry M V6 (g m$^{-2}$) | Plant height (cm) | Insertion height (cm) | Coverage R1 (%) | Spad V6 | Spad V10 |
|---|---|---|---|---|---|---|---|
| T1 | Control | 2055.0 | 214 | 88 | 83.2 | 46.4 | 43.7 |
| T2 | Map 100 + Urea 200 | 2605.0 | 240 | 99 | 83.2 | 54.2 | 49.0 |
| T3 | MAP100 – UlexG4 + Urea | 2640.0 | 244 | 102 | 79.1 | 54.3 | 48.7 |
| T4 | MAP100 + Urea 200 – Ulex G4 | 2360.0 | 245 | 104 | 93.6 | 56.6 | 46.5 |

TABLE 32-continued

Morphological parameters and yield components: Dry matter in V5, plant and spike
insertion height, radiation interception at flowering, green intensity determined by
Spad and NDVI by Green seeker, vigor, yield and its numerical components:
spikes · m$^{-2}$ (NS), grains · spike$^{-1}$ (GS), number of grains · m$^{-1}$
(NG) and weight (WG × 1000) of grains. Treatments with granulated B-Ulexite on
MAP or Urea on traditionally dated corn. INTA Pergamino, 2018/19 season.

| T5 | MAP100 – UlexG8 + Urea 200 | 2740.0 | 245 | 103 | 89.8 | 54.4 | 50.2 |
|---|---|---|---|---|---|---|---|
| T6 | MAP100 + Urea 200 – Ulex G8 | 2915.0 | 243 | 102 | 90.3 | 54.0 | 48.2 |
| R$_2$ vs yield | | 0.61 | 0.60 | 0.64 | 0.31 | 0.54 | 0.25 |

| Tr | Description | Vigor V9 (1-5) | Green seeker V9 | NS | GS | NG | WG × 1000 | Yield (kg ha$^{-1}$) |
|---|---|---|---|---|---|---|---|---|
| T1 | Control | 3.0 | 0.65 | 8.7 | 383.8 | 3335.2 | 325.0 | 10839.3 |
| T2 | Map 100 + Urea 200 | 3.5 | 0.71 | 8.1 | 451.9 | 3657.9 | 330.0 | 12071.1 |
| T3 | MAP100 – UlexG4 + Urea | 4.0 | 0.72 | 7.7 | 512.1 | 3962.6 | 318.0 | 12601.2 |
| T4 | MAP100 + Urea 200–Ulex G4 | 3.7 | 0.75 | 8.7 | 466.1 | 4069.3 | 322.0 | 13103.1 |
| T5 | MAP100 – UlexG8 + Urea 200 | 3.9 | 0.72 | 7.5 | 507.6 | 3806.6 | 329.0 | 12523.8 |
| T6 | MAP100 + Urea 200-Ulex G8 | 4.0 | 0.73 | 9.2 | 478.0 | 4381.6 | 324.0 | 14196.4 |
| R$_2$ vs yield | | 0.70 | 0.70 | 0.09 | 0.42 | 0.98 | 0.06 | |
| Stat. Sign (P=) | | | | | | | | <0.0001 |
| VQ (%) | | | | | | | | 4.7% |

TABLE 33

Morphological parameters and performance components: Dry matter in V5, plant and
spike insertion height, radiation interception at flowering, green intensity determined
by Spad and NDVI by Green seeker, vigor, yield and its numerical components: spikes · m$^{-2}$
(NS), grains · spike$^{-1}$ (GS), number of grains · m$^{-2}$ (NG) and weight
(WG × 1000) of grains. Impregnations with Boron-Ulexite on MAP or Urea in corn
of traditional date. INTA Pergamino, 2018/19 season.

| Tr | Description | Dry M V5 (g m$^{-2}$) | Plant height (cm) | Insertion height (cm) | Coverage R1 (%) | Spad V6 | Spad V10 |
|---|---|---|---|---|---|---|---|
| T1 | Control | 2160 | 212 | 85 | 78.1 | 47.1 | 43.2 |
| T2 | Map 100 + Urea 200 | 2450 | 239 | 100 | 89.9 | 45.2 | 44.9 |
| T3 | MAP100 – Ulex P2.6 + Urea 200 | 3020 | 241 | 103 | 93.2 | 50.8 | 46.9 |
| T4 | MAP100 + Urea 200-Ulex P2.6 | 3080 | 244 | 103 | 93.8 | 47.2 | 47.3 |
| T5 | MAP100 - Ulex P5.3 + Urea 200 | 3000 | 244 | 102 | 93.1 | 45.3 | 45.1 |
| T6 | MAP100 + Urea 200-Ulex G5.3 | 2650 | 245 | 105 | 92.9 | 46.0 | 46.2 |
| R$_2$ vs yield | | 0.88 | 0.65 | 0.68 | 0.78 | 0.23 | 0.82 |

| Tr | Description | Vigor V9 (1-5) | Green seeker V9 | NS | GS | NG | WG × 1000 | Yield (kg ha$^{-1}$) |
|---|---|---|---|---|---|---|---|---|
| T1 | Control | 3.0 | 0.65 | 7.0 | 472.4 | 3318.1 | 326.7 | 10839.3 |
| T2 | Map 100 + Urea 200 | 3.6 | 0.69 | 7.7 | 486.5 | 3764.3 | 324.0 | 12196.4 |
| T3 | MAP100 – Ulex P2.6 + Urea 200 | 3.9 | 0.69 | 8.3 | 496.3 | 4096.7 | 336.0 | 13764.9 |
| T4 | MAP100 + Urea 200-Ulex P2.6 | 4.0 | 0.70 | 8.9 | 452.9 | 4043.6 | 329.0 | 13303.6 |
| T5 | MAP100 + Urea P5.3 + Urea 200 | 3.8 | 0.69 | 7.9 | 493.1 | 3874.0 | 330.0 | 12784.3 |
| T6 | MAP100 + Urea 200-Ulex G5.3 | 3.8 | 0.70 | 7.4 | 501.2 | 3699.2 | 334.0 | 12355.4 |
| R$_2$ vs yield | | 0.86 | 0.61 | 0.70 | 0.01 | 0.98 | 0.36 | |
| Stat. Sign (P=) | | | | | | | | <0.003 |
| VQ (%) | | | | | | | | 6.7% |

Figure 30:
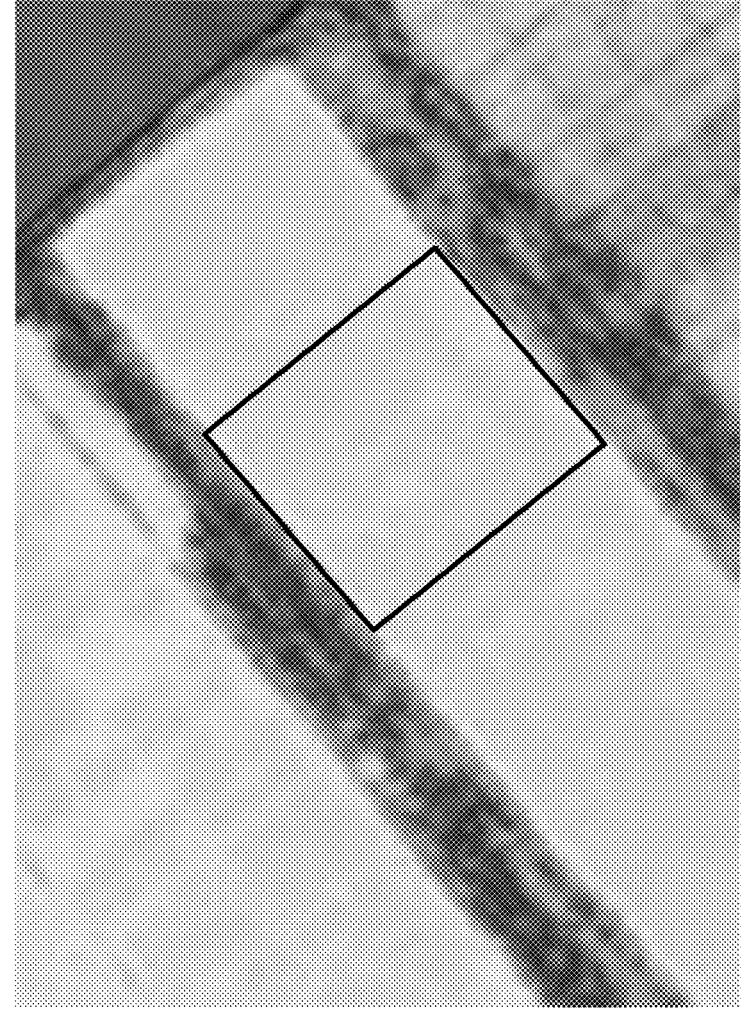
FIG. 30: Calculation of the NDRE (Normalized Difference Red Edge) on January 16th, post-flowering. The rectangle shows the experimental plots of the present experiment.

Vigor Index: 1 minimum 5-maximum. It considers growth, uniformity, health and general appearance of the crop in the evaluated plot.
NDVI: Normalized vegetation index In FIG. 30 the NDRE (Normalized Difference Red Edge) index is shown, which, as was the case in the Zn experiments, was the most sensitive of the indexes evaluated to variations between treatments.

Discussion and Conclusions

The 2018/19 cropping season was characterized by the development of appropriate environmental conditions for growing corn, with abundant rainfall centered around the critical period and during grain filling. The site shows a strong limitation of P, determining statistical responses to its application. The abundance of rainfall makes the site less predisposed to B deficiencies. Nevertheless, favorable responses to its addition were verified.

A) Granulated B

Yields averaged 12556 kg ha$^{-1}$. Significant differences were found between treatments (P=0.0001, VQ=4.7%). A considerable response to P and also in the case of B was determined, being even greater than that observed in a similar experiment with Zn (Table 32 and FIG. 28). In this case, the mixtures with B-Ulexite and Urea performed better than MAP. In turn, the Blend with Urea showed a response to doses of B, which was not verified in MAP. It is likely that some phytotoxicity limited the response to B applied in line with MAP when the maximum dose was used. Several authors mention this micronutrient as aggressive and risky in seed applications. On the other hand, there would be no restrictions for treatments in coverage together with Urea. Since B is soluble and mobile in soil, no response to its localization in bands or incorporation below the surface is expected.

The crop variables that showed the highest correlation with yield were NG ($r^2=0.98$), plant vigor rating ($r^2=0.70$), NDVI determined by Green seeker ($r^2=0.70$), spike insertion height ($r^2=0.64$), initial biomass ($r^2=0.68$), plant height ($r^2=0.60$) and N content estimated by Spad at V6 ($r^2=0.64$).

B) B Powder

Yields averaged 12541 kg ha$^{-1}$. Significant differences were found between treatments (P=0.003; VQ=6.7%). As with the granular sources (FIG. 4), the response to P and B was of great magnitude, but no clear advantage was determined between substrates, MAP or Urea (Table 33 and FIG. 29). Similarly, there was no response to B doses, productivity being higher at the lowest level. It is likely that the high specific surface area of the powdered B facilitated its solubility, making it undesirable to grow up to the highest dose (FIG. 29).

The crop variables that showed the highest correlation with yield were NG ($r^2=0.98$), plant vigor rating ($r^2=0.86$), NS ($r^2=0.70$), NDVI determined by Green seeker ($r^2=0.61$), initial biomass ($r^2=0.88$), N content estimated by Spad at V10 ($r^2=0.82$), radiation interception at flowering ($r^2=0.78$), spike insertion height ($r^2=0.68$) and plant height ($r^2=0.65$).

On average of both carriers, the response to B was higher in powdered Ulexite at the LOW DOSE, while it was higher in granulated B-Ulexite at the HIGH DOSE, suggesting higher solubility in the former than in the latter.

Using spectral indexes on aerial photography, it was determined that the NDRE index showed a higher correlation with yield than NDVI or OSAVI. It is very interesting the development of new crop indexes, which contribute to characterize and monitor the occurrence of deficiencies. This would allow identifying a possible deficiency during the cycle and, if detected in early stages of growth, correcting it through the application of sources such as urea impregnated with B in total coverage.

The results obtained suggest a positive effect of B fertilization in a soil limited in this element. On the other hand, the physical form of B-Ulexite powder showed a superior performance at LOW DOSAGE, while the granulated formulation showed a more outstanding performance at HIGH DOSAGE of B, possibly evidencing differences in solubility between sources. As a substrate, MAP or Urea performed well, with Urea being slightly superior especially at high doses of B, where in-line applications could be phytotoxic.

Example 9—Boron Impregnated in Phosphorus Macronutrients for Soybeans; 2018-2019 Season Materials and Methods During the 2018/19 season, an experiment was conducted on top quality soybeans to evaluate the impact of different P and micronutrient fertilization technologies on soybean crop productivity. The experiment was planted at the EEA INTA Pergamino, on a Pergamino Series soil, typical Argiudol, mixed family, loam, thermal, Class I-2, IP=85. Planting was carried out on November 21st, with the DM 46R18 STS variety, in rows spaced 0.40 m apart. The experimental site registers a continuous agricultural rotation with a high level of intensification and crop rotation. The predecessor was corn. During the cycle, insecticides and fungicides were applied to prevent attacks by bollworms, bugs and diseases. The plots were kept completely free of weeds and pests. A base inoculation was performed to ensure nitrogen (N) supply.

The test design was a randomized complete block design with four replications and four treatments. Details of the treatments evaluated are described in Table 34. In addition, the soil analysis of the sites is presented in Table 35.

TABLE 34

Fertilization treatments with phosphorus and boron sources in soybean. Pergamino, 2018/19 season.

| Treat. | Fertilizers | Dose | Application state |
|---|---|---|---|
| T1. | Control | | |
| T2. | Simple Superphosphate | 100 kg. | sowing |
| T3. | Simple Superphosphate treated with 10% granulated ulexite | 100 kg. + 4 kg. | sowing |
| T4. | Simple Superphosphate treated with 10% granulated ulexite | 100 kg. + 8 kg. | sowing |
| T5. | Simple Superphosphate treated with 15% ulexite powder | 100 kg. + 2.66 kg. | sowing |
| T6. | Simple Superphosphate treated with 15% ulexite powder | 100 kg. + 5.33 kg. | sowing |

TABLE 35

Soil analysis at planting, average of four replications. INTA EEA Pergamino

| Depth | pH water 1:2.5 | MO % | Total N % | Available phosphorus mg kg$^{-1}$ | N-Nitrates mg kg$^{-1}$ | S-Sulfates ppm | Zn mg kg$^{-1}$ | B mg kg$^{-1}$ |
|---|---|---|---|---|---|---|---|---|
| 0-20 cm | 5.7 | 2.42 | 0.121 | 7.7 | 13.2 | 6.9 | 0.98 | 0.37 |

The biomass accumulated in R3 (kg ha$^{-1}$) was quantified. In R4, the NDVI was determined by means of the Green seeker sensor, and the coverage was determined by processing with specific digital image software. Likewise, the N content was also estimated using a Minolta Spad 502 chlorophyll meter, and vigor was rated according to the general condition of the plot, its uniformity and health. Harvesting was carried out with an experimental self-propelled harvester. Yield components, number of nodes, pods, NG and WG were determined on a harvest sample. On four occasions a flight was performed with an Ebee Parrot aircraft equipped with a Sequoia_4.0_1280×960 (Green), Sequoia_4.0_1280×960 (Red), Sequoia_4.0_1280×960 (Red Edge), Sequoia_4.0_1280×960 (NIR) high resolution camera. The photographs obtained, with a pixel size of 14×14 cm, were processed and the OSAVI and NDRE indexes were calculated.

OSAVI (Optimized Soil Adjusted Vegetation Index) is a vegetation index corrected for soil reflectance. It provides additional information and represents an improvement over NDVI by showing greater sensitivity to cover variations in sparsely vegetated areas where the ground is visible through the canopy. It is also advisable to use it at the end of the cycle where vegetation cover is maximum, since it saturates at higher levels of leaf area with respect to NDVI.

NDRE (Normalized Difference Red Edge) is an index highly sensitive to the chlorophyll content of vegetation. The variation of this index allows inferring nutrient deficiencies that cause chlorosis in the tissues, such as nitrogen, sulfur and some microelements.

The results were analyzed by partition of variance, mean comparisons and regression analysis.

Environmental Conditions During the Season

Figure 31:
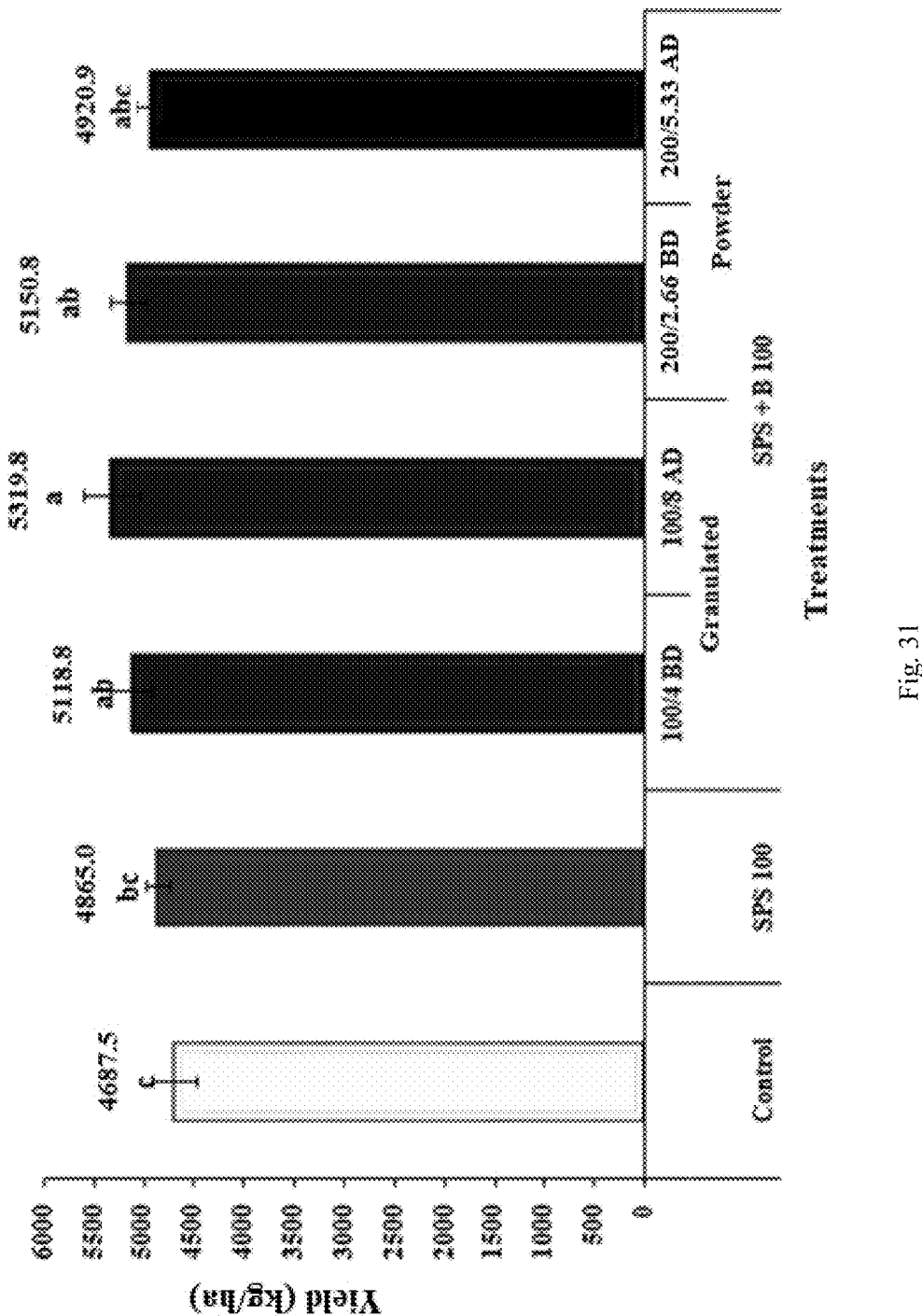
FIG. 31: Grain yield according to fertilization treatments with phosphorus and boron sources in soybean. Different letters above the columns represent statistically significant differences between treatments (LSD a=0.10; MSD=406 kg ha$^{-1}$). The error bars indicate the standard deviation of the mean. INTA EEA Pergamino, season 2018/19.

In FIG. 14, the rainfall determined at the experimental site and the crop evapotranspiration are shown, as well as the decadel water balance, measured through the evolution of the useful water content in the soil. The 2018/19 season presented a friendly climate for the crop, with copious rains during December-January, and a pause period characterized by high temperatures and lack of rains in the first two decades of February. None of this seemed to limit yields (FIG. 31). Conditions at the end of filling were very favorable, with sustained temperatures and high radiation. The presence of pests was moderate, with only the *Anticarsia gemmatalis* and bug populations reaching the critical treatment threshold. The temperature condition and low pest severity contributed to the effect of the lack of rainfall.

Results of the Experiments

In Table 36 an evaluation of nodulation is presented, while in Table 37 the yield, its components and other variables determined during the crop cycle, for the different locations.

TABLE 36

Quantitative and qualitative evaluation of nodulation. Fertilization treatments evaluating boron impregnation over phosphorus sources in soybean. Pergamino, 2018/19 season.

| T | Treatments | Number of nodules (1) | Nodule size (2) | Location (3) | Functionality (4) |
|---|---|---|---|---|---|
| | Early Pergamino | | | | |
| T1 | Control | 4 | 3 | 4 | 3 |
| T2 | SPS 100 | 4 | 4 | 5 | 4 |
| T3 | SPS – Ulex B G 100 + 4 | 5 | 4 | 5 | 4 |
| T4 | SPS – Ulex B G 100 + 8 | 4 | 5 | 4 | 3 |
| T5 | SPS – Ulex B P 100 + 2.66 | 5 | 5 | 4 | 4 |
| T6 | SPS – Ulex B P 100 + 5.33 | 5 | 3 | 4 | 3 |
| | R2 vs yield | 0.07 | 0.71 | 0.01 | 0.02 |

Number of nodules: 1: none, 2: low, 3: medium, 4: high, 5: very high.
Size: 1: very small, 2: small, 3: medium size, 4: large size, 5: very large size.
Location: 1: totally in secondary roots, 2: mostly in secondary roots, 3: equal distribution main root:secondary root, 4: mostly in primary root, 5: nodules totally located in main root.
Functionality: 1: completely green or brown shade, 2: mostly green or brown shade, 3: diverse shade, 4: mostly reddish shade, 5: reddish shade in the totality of the nodules.

TABLE 37

Biomass at the beginning of the critical period, plant height (cm), cover and interception, green seeker, number of nodes and pods, radiation interception, vigor, grain yield, components and response to the control. Fertilization treatments evaluating Boron impregnation over phosphorus sources in soybean. 2018/19 season.

| Treat. | Dry mass R3 (kg ha$^1$) | Green seeker R4 | Nodes/ plant | Pods/ plant | Interception R4 (%) | Vigor |
|---|---|---|---|---|---|---|
| Control | 3170 | 0.73 | 14.0 | 39.0 | 84.5 | 3.0 |
| SPS 100 | 3745 | 0.75 | 14.0 | 38.5 | 88.5 | 3.5 |
| SPS – Ulex B G 100 + 4 | 4095 | 0.75 | 16.5 | 53.0 | 89.1 | 3.4 |
| SPS – Ulex B G 100 + 8 | 3940 | 0.75 | 13.5 | 48.5 | 94.5 | 3.5 |
| SPS – Ulex B P 100 + 2.66 | 3590 | 0.76 | 14.0 | 42.0 | 86.8 | 3.4 |
| SPS – Ulex B P 100 + 5.33 | 3555 | 0.75 | 16.5 | 53.0 | 91.8 | 3.7 |
| R$_2$ vs yield | 0.56 | 0.48 | 0.00 | 0.24 | 0.43 | 0.20 |

| Treat. | Plants height | Spad | Yield (kg ha$^{-1}$) | NG | WG | Diff vs T1 (kg ha$^{-1}$) |
|---|---|---|---|---|---|---|
| Control | 90.0 | 48.1 | 4687.5 | 2741.2 | 171.0 | |
| SPS 100 | 94.0 | 47.9 | 4856.0 | 2848.1 | 170.5 | 168.5 |
| SPS – Ulex B G 100 + 4 | 96.0 | 47.3 | 5118.8 | 2950.3 | 173.5 | 431.3 |
| SPS – Ulex B G 100 + 8 | 93.0 | 49.1 | 5319.8 | 3092.9 | 172.0 | 632.3 |
| SPS – Ulex B P 100 + 2.66 | 94.0 | 48.8 | 5150.8 | 3029.9 | 170.0 | 463.3 |
| SPS – Ulex B P 100 + 5.33 | 92.0 | 48.9 | 4920.9 | 2911.8 | 169.0 | 233.4 |
| R2 vs yield | 0.34 | 0.12 | | 0.96 | 0.15 | |
| P= | | | | 0.10 | | |
| VQ= | | | | 6.55 | | |

R4 (maximum pod size) according to the scale of Fehr and Caviness, 1974.
Vigor Index: According to scale 1: minimum-5: maximum. It evaluates health, plant size and plot uniformity.
Interception: evaluated as % of the maximum incident radiation.

In FIG. 33 shows the OSAVI (related to biomass without influence of soil reflectance in lightly covered crops) and NDRE (red border, associated with chlorophyll) indexes With respect to the boron treatments, the latter was the one that showed the greatest sensitivity to the treatments.

Discussion and Conclusions

The 2018/19 season was favorable for the crop, with abundant rainfall, although concentrated in December-January, and significantly better than the previous season. Radiation, temperature and humidity conditions were determined that allowed the crop to express itself clearly. Productivity reached an average of 5009 kg ha$^{-1}$ (Table 37), which is close to the potential achievable by the crop in the region.

Significant differences were found between treatments (P=0.10; VQ=5.5%). A significant response to B fertilization was observed, obtaining the maximum with its granulated version at the highest dose (T4). Although it did not differ statistically from the rest of the treatments that provided B, it was the one that managed to outperform T2 (SPS 100) and T1 (control without fertilization). As soluble B and this combination is the one with the highest nutrient supply (8 kg B ha$^{-1}$), it is likely that these results are suggesting a response to micronutrient doses. The results are in line with those obtained in the 2017/18 season (FIG. 32).

None of the treatments evaluated showed phytotoxicity on seeds or damage to emergence, being perfectly tolerated and presenting a rapid emergence and better initial coloration in the presence of B. The addition of P and P+B increased initial biomass (r$^2$ vs. yield=0.56), NDVI by Green seeker (r$^2$=0.48), radiation interception (r$^2$=0.43), plant height (r$^2$=0.34) and NG (r$^2$=0.96). The level of the NDRE spectral index, related to the red edge, also improved.

The results obtained allow us to identify the granulated source at maximum dose as the one with the best yield expression and agronomic response.

Example 10—Boron Impregnated in Phosphorus and Nitrogen Macronutrients for Wheat; Season 2018-2019

Materials and Methods

During the year 2018, two field experiments were conducted at EEA INTA Pergamino, on a soil Serie Pergamino, Class I-2, typical Argiudol, fine family, illitic, thermal (USDA-Soil Taxonomy V. 2006). On June 20th, the SY 120 variety, an intermediate cycle cultivar with no vernalization requirements, was planted. In the experiment, a randomized complete block design with 4 replications was used. Despite the good health of the cultivar, fungicides and insecticides were applied at Zadoks 32 and Z41 phenological stages. The treatments evaluated are described in Table 38. In addition, the soil analysis of the site is presented in Table 39.

Impregnation treatments with B-Ulexite, in its granulated and powdered physical forms, were evaluated at two levels for each of them, respectively. In Experiment 1, impregnations were evaluated on MAP (0-23-0) (Table 38.a), and in Experiment 2 on Urea (46-0-0) (Table 38.b), in both cases incorporated into the soil at crop sowing.

TABLE 38.a

| | Zn fertilization treatments applied on MAP. 2018 season. | | |
| --- | --- | --- | --- |
| | Alternative application | Dose | Application state |
| T1 | Absolute control | | |
| T2 | MAP | 100 kg ha$^{-1}$ | Sowing |
| | Urea | 200 kg ha$^{-1}$ | |
| T3 | MAP (treated with 10% granulated boron-ulexite) | 100 + 4 kg ha$^{-1}$ | Sowing |
| | Urea | 200 kg ha$^{-1}$ | |
| T4 | MAP (treated with 10% granulated boron-ulexite) | 100 + 8 kg ha$^{-1}$ | Sowing |
| | Urea | 200 kg ha$^{-1}$ | |
| T5 | MAP (treated with 15% boron-ulexite powder) | 100 + 2.66 kg ha$^{-1}$ | Sowing |
| | Urea | 200 kg ha$^{-1}$ | |
| T6 | MAP (treated with 15% boron-ulexite powder) | 100 + 5.33 kg ha$^{-1}$ | Sowing |
| | Urea | 200 kg ha$^{-1}$ | |

TABLE 38.b

| | Zinc fertilization treatments applied on Urea. 2018 season. | | |
| --- | --- | --- | --- |
| | Alternative application | Dose | Application state |
| T1 | Absolute control | | |
| T2 | MAP | 100 kg ha$^{-1}$ | sowing |
| | Urea | 200 kg ha$^{-1}$ | |
| T3 | MAP | 100 kg ha$^{-1}$ | sowing |
| | Urea (treated with 10% granulated boron-ulexite) | 200 + 4 kg ha$^{-1}$ | |
| T4 | MAP | 100 kg ha$^{-1}$ | sowing |
| | Urea (treated with 10% granulated boron-ulexite) | 200 + 8 kg ha$^{-1}$ | |
| T5 | MAP | 100 kg ha$^{-1}$ | sowing |
| | Urea (treated with 15% boron-ulexite powder) | 200 + 2.66 kg ha$^{-1}$ | |
| T6 | MAP | 100 kg ha$^{-1}$ | sowing |
| | Urea (treated with 15% boron-ulexite powder) | 200 + 5.33 kg ha$^{-1}$ | |

TABLE 39

| | | | | | Soil data at sowing time | | | |
| --- | --- | --- | --- | --- | --- | --- | --- | --- |
| Depth cm | pH water 1:2.5 | Organic matter % | Available P ppm | N-Nitrates 0-20 cm ppm | N-Nitrates soil 0-60 cm kg ha-1 | S-Sulphates soil 0-20 cm ppm | Zn ppm | B ppm |
| 0-20 cm | 5.7 | 3.1 | 14.5 | 8.1 | 41.1 | 8.5 | 1.04 | 0.32 |
| 20-40 cm | | | | 4.4 | | 8.6 | | 0.12 |
| 40-60 cm | | | | 2.0 | | | | |

A count of emerged plants was made 15 days after emergence, and at Z 31 the biomass accumulated by the crop was determined. In Z65, cover, NDVI by Green seeker, and vigor, green index by Spad and plant height were quantified. The harvesting was carried out mechanically, harvesting the entire plot.

In the vicinity of anthesis, a flight was conducted with an Ebee Parrot aircraft equipped with a Sequoia_4.0_1280×960 (Green), Sequoia_4.0_1280×960 (Red), Sequoia_4.0_1280×960 (Red Edge), Sequoia_4.0_1280× 960 (NIR) high resolution camera. The photographs obtained, with a pixel size of 14×14 cm, were processed and the OSAVI and TCARI indexes were calculated.

OSAVI (Optimized Soil Adjusted Vegetation Index) is a vegetation index corrected for soil reflectance. It provides additional information and represents an improvement over NDVI by showing greater sensitivity to cover variations in sparsely vegetated areas where the ground is visible through the canopy. It is also advisable to use it at the end of the cycle where vegetation cover is maximum, since it saturates at higher levels of leaf area with respect to NDVI.

TCARI (Transformed Chlorophyll Absorption Ratio Index), is sensitive to the chlorophyll content of the vegetation, and therefore could express changes in nitrogen supply in an adjusted form. The variation of this index at the plot scale allows inferring nutritional N deficiencies, allowing re-fertilization decisions to be made. If the N supply is uniform, it could represent effects of other chlorophyll-related elements, such as sulfur (S).

Yield components—number (NG) and weight (WG) of grains—were evaluated on a harvest sample. The results were analyzed by variance partitioning and correlation analysis.

of the soil moisture profile. Between August 20th and October 10th, precipitation decreased sharply, depleting moisture reserves (FIG. 17). In the crop, it was expressed in limitations in biomass accumulation. Average temperatures were low, determining a harsh winter, compared to recent winters (FIGS. 17 and 18). A moderate frost affected several crops in the region, although no damage was observed at the site, probably due to its elevated position in the relief. Finally, the photothermal quotient was of intermediate level (FIG. 19).

FIG. 19 shows the photothermal quotient (Q) (Fisher, 1985), which represents the relationship between the daily effective surface radiation and the daily mean temperature, and is a measure of the growth potential per unit thermal time of development. In 2018, few cloudy days were verified but temperatures increased considerably towards spring, determining a normal photothermal quotient for the locality (FIG. 19 and Table 40). This was higher in comparison to the 2017 season but well below 2009, the most favorable year in the last 13 cycles. It is remarkable how this Q value is decreasing since 2014, mainly because of higher temperatures (Table 40). Filling conditions were favorable, with temperatures remaining cool (FIGS. 18 and 19).

TABLE 40

Effective insolation (hs), mean temperature (C. °) and photothermal quotient Q (T base 0° C.) for the critical period of wheat cultivation in Pergamino area. October 1st to October 30th in 2010, and September 15th to October 15th in all other years.

| Environmental conditions | Year 2005 | Year 2006 | Year 2007 | Year 2008 | Year 2009 | Year 2010 | Year 2011 | Year 2012 | Year 2013 | Year 2014 | Year 2015 | Year 2016 | Year 2017 | Year 2018 |
|---|---|---|---|---|---|---|---|---|---|---|---|---|---|---|
| Average effective insolation (hs) | 7.2 | 7.1 | 5.9 | 6.9 | 8.3 | 7.45 | 6.8 | 5.0 | 5.6 | 6.2 | 5.3 | 5.4 | 6.2 | 7.0 |
| Period average T° C. | 15.1 | 17.1 | 15.0 | 16.4 | 13.4 | 14.8 | 14.8 | 14.3 | 13.5 | 15.1 | 13.8 | 15.5 | 15.8 | 16.6 |
| Photothermal quotient (Q) (Mj · m$^{-2}$ · day$^{-1}$ ° C.$^{-1}$) | 1.24 | 1.10 | 1.12 | 1.10 | 1.56 | 1.34 | 1.19 | 1.11 | 1.20 | 1.11 | 1.11 | 0.98 | 1.05 | 1.09 |

Environmental Conditions of the Season

At sowing, the profile had a moderate level of storage. Even though the previous summer was very dry, the abundant rainfall in April allowed a reasonable level of recharge Results In Tables 41 and 42, data from observations taken during the crop cycle are presented, while FIGS. 34 and 35 show grain yields grouped by treatment.

TABLE 41

Morphological parameters of the crop: Number of emerged plants, initial dry matter, cover and interception, vigor, NDVI by Green seeker, green intensity readings in Spad units, vigor and plant height (Z65), components and grain yield. Boron-ulexite impregnation treatments on MAP in wheat. Pergamino, year 2018.

| | T | Treatments | Plants m$^{-2}$ | Dry M Z31 | Coverage and Intercep- Z65 | NDVI GS 65 | Spad Z65 |
|---|---|---|---|---|---|---|---|
| Wheat | T1 | MAP0 | 241.0 | 1710.0 | 77.8 | 0.41 | 45.2 |
| | T2 | Map 100 | 237.0 | 3265.0 | 91.0 | 0.43 | 51.6 |
| | T3 | Map 100 + B-G 100 + 5 | 233.0 | 3230.0 | 92.1 | 0.47 | 45.1 |
| | T4 | Map 100 4 B-G 100 4 10 | 235.0 | 3340.0 | 90.3 | 0.43 | 48.9 |
| | T5 | Map 100 + B-P 100 + 2 | 234.0 | 2930.0 | 92.3 | 0.43 | 49.8 |
| | T6 | Map 100 + B-P 100 + 4 | 239.0 | 3180.0 | 94.7 | 0.43 | 46.7 |
| R$_2$ vs yield | | | 0.58 | 0.72 | 0.88 | 0.27 | 0.24 |

TABLE 41-continued

Morphological parameters of the crop: Number of emerged plants, initial dry matter,
cover and interception, vigor, NDVI by Green seeker, green intensity readings
in Spad units, vigor and plant height (Z65), components and grain yield. Boron-
ulexite impregnation treatments on MAP in wheat. Pergamino, year 2018.

| | T | Treatments | Vigor Z65 (1-5) | height cm | NG m−2 | WG | Id kg ha−1 |
|---|---|---|---|---|---|---|---|
| Wheat | T1 | MAP 0 | 2.4 | 72 | 10017.1 | 29.2 | 2925.0 |
| | T2 | Map 100 | 4.0 | 76 | 16289.5 | 30.7 | 4795.5 |
| | T3 | Map 100 + B-G 100 + 5 | 4.4 | 76 | 16259.9 | 30.7 | 4986.4 |
| | T4 | Map 100 + B-G 100 + 10 | 3.8 | 78 | 15493.2 | 31.3 | 4854.5 |
| | T5 | Map 100 + B-P 100 + 2 | 4.3 | 76 | 16895.5 | 33.3 | 5631.8 |
| | T6 | Map 100 + B-P 100 + 4 | 3.9 | 77 | 15913.9 | 31.3 | 4986.4 |
| | P= | | | | | | 0.0001 |
| | VQ= | | | | | | 6.2 |
| R2 vs yield | | | 0.91 | 0.67 | 0.97 | 0.76 | |

Vigor Index: 1 minimum 5-maximum It considers growth, uniformity, health and general appearance of the crop in the evaluated plot.
NDVI: Normalized vegetation index

TABLE 42

Morphological parameters of the crop: Number of emerged plants, initial dry matter,
cover and interception, vigor, NDVI by Green seeker, green intensity readings
in Spad units, vigor and plant height (Z65), components and grain yield. Boron-
ulexite impregnation treatments on Urea in wheat. Pergamino, year 2018.

| | T | Treatments | Plants m−2 | Dry M Z31 | Coverage and Intercep- Z65 | NDVI GS 65 | Spad Z65 |
|---|---|---|---|---|---|---|---|
| Wheat | T1 | Urea 0 | 240.0 | 1815.0 | 81.3 | 0.30 | 40.9 |
| | T2 | Urea 200 | 238.0 | 3350.0 | 94.2 | 0.40 | 40.8 |
| | T3 | Urea 200 + ZnG 100 + 5 | 234.0 | 3297.5 | 94.5 | 0.42 | 45.6 |
| | T4 | Urea 200 + ZnG 100 + 10 | 241.0 | 2622.5 | 89.1 | 0.43 | 46.9 |
| | T5 | Urea 200 + ZnP 100 + 2 | 244.0 | 2997.5 | 93.1 | 0.43 | 51.5 |
| | T6 | Urea 200 + ZnP 100 + 4 | 239.0 | 2155.0 | 93.6 | 0.41 | 47.3 |
| $R_2$ vs yield | | | 0.02 | 0.42 | 0.79 | 0.20 | 0.02 |

| | T | Treatments | Vigor Z65 (1-5) | Plant height cm | NG m−2 | WG | Yield kg ha−1 |
|---|---|---|---|---|---|---|---|
| Wheat | T1 | Urea 0 | 3.0 | 68.0 | 11855.7 | 29.1 | 3450.0 |
| | T2 | Urea 200 | 3.9 | 75.0 | 19329.4 | 30.5 | 5695.5 |
| | T3 | Urea 200 + ZnG 100 + 5 | 4.2 | 74.0 | 20402.0 | 30.3 | 6181.8 |
| | T4 | Urea 200 + ZnG 100 + 10 | 4.5 | 86.0 | 19838.7 | 31.0 | 6150.0 |
| | T5 | Urea 200 + ZnP 100 + 2 | 4.4 | 80.0 | 18893.4 | 31.3 | 5913.6 |
| | T6 | Urea 200 + ZnP 100 + 4 | 4.3 | 79.0 | 18996.6 | 31.8 | 6040.9 |
| | P= | | | | | | <0.0001 |
| | VQ= | | | | | | 4.4% |
| $R_2$ vs yield | | | 0.96 | 0.79 | 0.99 | 0.66 | |

Vigor Index: 1 minimum 5-maximum It considers growth, uniformity, health and general appearance of the crop in the evaluated plot.
NDVI: Normalized vegetation index FIG. 36 shows the OSAVI (related to biomass without influence of soil reflectance in lightly covered crops) and TCARI (related to chlorophyl) Both showed high sensitivity to the treatments (FIG. 6). The lack of P severely conditioned crop growth. B supply also produced variations in biomass (OSAVI), but especially in N accumulation (TCARI).

Discussion and Conclusions

The yields, which averaged 4696.6 and 5572 kg ha−1, respectively. The upper limit to yield would have been set by water availability.

The site recorded a poor initial P content, which determined a consistent response to fertilization. Something similar occurred with respect to N. The level of Zn was also below the proposed critical limit of 1 mg kg−1 (0-20 cm).

The presence of a positive response site enables the comparison of different sources, doses and substrates for impregnation.

A) Impregnations on MAP

Significant differences were found between treatments (P=0.0001, VQ=6.2%). The mean response to the nutrient was of lower magnitude than that observed in the Zn-treated experiments. Also on average, the powdered source showed superior performance to the granulated source. In both cases, the lower dose allowed the maximum yield to be achieved.

The variables with the highest correlation with yield were NG ($r^2$=0.97), plant vigor rating ($r^2$=0.91), radiation interception at Z65 ($r^2$=0.88), PG ($r^2$=0.76), initial biomass ($r^2$=0.47) and plant height ($r^2$=0.67) (Table 41).

B) Impregnations on Urea

As in the previous experiment, significant differences were found between treatments (P=0.0001, VQ=4.4%) (Table 42). The response to B in relative terms was similar to that obtained in the MAP impregnations (Tables 41 and 42). This is to be expected considering B as a mobile element in the soil profile.

Both sources of B, granular and solid, behaved on an equal plane, with no differences between doses (Table 42 and FIG. 35). As with Zn, the MAP or urea granules treated with the powdered source appear more uniform in their distribution and more evident to the eye, although this did not modify the agronomic behavior.

The hierarchy of variables in terms of their ability to anticipate yields was similar to that observed in the MAP treatments. Those with the highest correlation with yields were NG ($r^2$=0.99), plant vigor rating ($r^2$=0.96), radiation interception at Z65 ($r^2$=0.79) and final plant height ($r^2$=0.76), WG ($r^2$=0.66) and finally initial biomass ($r^2$=0.42).

Using spectral indexes on aerial photography, it was determined that both the OSAVI and TCARI indexes were correlated with yields, although the latter was more highly correlated with yields and sensitivity.

The results obtained suggest a significant effect of B fertilization in a soil with moderate agricultural history, good management and medium fertility. The response, however, was lower than that obtained after Zn impregnation. This element would be more determinant for yield in winter cereals. On the other hand, both granular and powdered sources behaved similarly. However, in the impregnations on MAP the mean response was higher for the powdered source. This also allowed for better coverage and visualization, which would make it more easily adoptable. Additionally, the response was similar in MAP or Urea impregnations. The high mobility of B in soil would facilitate the free choice of substrate, probably allowing treatments in total coverage without incorporation, which have not been evaluated in the present experiment.

The invention claimed is:

1. A granulated agricultural composition comprising:
i—a macronutrient in granulated form;
ii—a micronutrient; and
iii—a homogeneous mixture of coadjuvants for a process of integrating the macronutrient and the micronutrient, said homogeneous mixture of coadjuvants comprising titanium dioxide, a mineral of the family of mica, polyethylene and a mixture of pigments, wherein the titanium dioxide is in a concentration lower than 10% w/w, the mineral of the family of mica is in a concentration lower than 10% w/w, and the polyethylene is in a concentration lower than 5% w/w;

wherein the homogeneous mixture of coadjuvants and the micronutrient form a single-layered coating over the granules of the macronutrient.

2. The granulated agricultural composition of claim 1, wherein the macronutrient is selected from the group consisting of urea, MAP (monoamonic phosphate), SSP (simple superphosphate), triple superphosphate, DAP (diamonic phosphate), calcium carbonate, potassium chloride, potassium sulfate, magnesium sulfate, potassium nitrate, sulfur, potassium, calcium, ammonium sulfate, potassium sulfate, phosphorus pentoxide, potassium dioxide, and magnesium dioxide.

3. The granulated agricultural composition of claim 2, wherein the macronutrient is selected from the group consisting of urea, MAP and SSP.

4. The granulated agricultural composition of claim 1, wherein the micronutrient is selected from the group consisting of a boron (B) source, a chlorine (Cl) source, a cobalt (Co) source, a copper (Cu) source, an iron (Fe) source, a manganese (Mn) source, a molybdenum (Mo) source and a zinc (Zn) source.

5. The granulated agricultural composition of claim 4, wherein the micronutrient is selected from the group consisting of a B source and a Zn source.

6. The granulated agricultural composition of claim 5, wherein the B source is ulexite and the Zn source is zinc oxysulfate.

7. The granulated agricultural composition of claim 1, wherein the micronutrient is in granulated form.

8. The granulated agricultural composition of claim 1, wherein the micronutrient is in powdered form.

9. The granulated agricultural composition of claim 1, wherein the macronutrient and the micronutrient are present in a weight ratio of between 200:1 and 5:1.

10. The granulated agricultural composition of claim 9, wherein the macronutrient and the micronutrient are present in a weight ratio of between 100:1 and 10:1.

11. The granulated agricultural composition of claim 10, wherein the macronutrient and the micronutrient are present in a weight ratio selected from 100:1, 50:1, 40:1, 25:1, 12.5:1 and 10:1.

12. A method for preparing a granulated agricultural composition according to claim 1, comprising:
i) providing the macronutrient to a mixing tank;
ii) adding 50% of the total amount of the homogeneous mixture of coadjuvants;
iii) adding the micronutrient; and
iv) adding the remaining 50% of the homogeneous mixture of coadjuvants.

13. A method to increase the yield of a crop, comprising applying to said crop an effective amount of a granulated agricultural composition according to claim 1.

* * * * *